(12) United States Patent
Kimura

(10) Patent No.: US 7,626,663 B2
(45) Date of Patent: Dec. 1, 2009

(54) LIQUID CRYSTAL DISPLAY DEVICE AND ELECTRONIC APPARATUS

(75) Inventor: Hajime Kimura, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 281 days.

(21) Appl. No.: 11/581,014

(22) Filed: Oct. 16, 2006

(65) Prior Publication Data

US 2007/0085955 A1    Apr. 19, 2007

(30) Foreign Application Priority Data

Oct. 18, 2005   (JP)   ............... 2005-303766

(51) Int. Cl.
    *G02F 1/1337*   (2006.01)
(52) U.S. Cl. ..................................... 349/129
(58) Field of Classification Search .................. None
    See application file for complete search history.

(56) References Cited

U.S. PATENT DOCUMENTS

| | | |
|---|---|---|
| 6,426,787 B1 | 7/2002 | Satake et al. |
| 6,614,496 B1 | 9/2003 | Song et al. |
| 6,707,521 B2 | 3/2004 | Satake et al. |
| 6,717,359 B2 | 4/2004 | Kimura |
| 7,106,405 B2 | 9/2006 | Okumura |
| 7,277,146 B2 | 10/2007 | Maeda |
| 7,362,398 B2 | 4/2008 | Satake et al. |
| 7,427,223 B2 | 9/2008 | Kimura |
| 7,471,363 B2 | 12/2008 | Maeda |
| 2002/0063834 A1 | 5/2002 | Sawasaki et al. |
| 2003/0071952 A1 | 4/2003 | Yoshida et al. |
| 2003/0160928 A1 | 8/2003 | Ozawa et al. |
| 2003/0193625 A1 | 10/2003 | Yoshida et al. |
| 2004/0165129 A1 | 8/2004 | Okumura |

(Continued)

FOREIGN PATENT DOCUMENTS

CN    1510462    7/2004

(Continued)

OTHER PUBLICATIONS

Kim, The World's Largest (82-in.) TFT-LCD, SID 05 Digest, pp. 1842-1847. 2005.

(Continued)

*Primary Examiner*—Sung H Pak
(74) *Attorney, Agent, or Firm*—Eric J. Robinson; Robinson Intellectual Property Law Office, P.C.

(57) ABSTRACT

The present invention provides a liquid crystal display device including a liquid crystal layer disposed between a first substrate and a second substrate, a pixel electrode in a reflection region and a transmission region over the first substrate, a film for adjusting a cell gap in the reflection region over the first substrate, and an opposite electrode in the reflection region and the transmission region over the second substrate. The pixel electrode in the reflection region is provided over the film and reflects light. The pixel electrode in the transmission region transmits light. The pixel electrode in the reflection region and the transmission region includes a slit. The slit is overlapped with at least a part of a step portion which is provided by the film between the reflection region and the transmission region.

35 Claims, 49 Drawing Sheets

U.S. PATENT DOCUMENTS

| | | |
|---|---|---|
| 2005/0030439 A1 | 2/2005 | Lyu |
| 2005/0030453 A1 | 2/2005 | Maeda |
| 2005/0030454 A1 | 2/2005 | Jang et al. |
| 2005/0110928 A1 | 5/2005 | Sonoda et al. |
| 2005/0128371 A1 | 6/2005 | Ueda et al. |
| 2005/0128399 A1 | 6/2005 | Kim et al. |
| 2005/0140876 A1 | 6/2005 | Kubo |
| 2005/0146663 A1 | 7/2005 | Kim et al. |
| 2006/0158589 A1 | 7/2006 | Nishi et al. |
| 2008/0211396 A1 | 9/2008 | Kimura |

FOREIGN PATENT DOCUMENTS

| | | |
|---|---|---|
| CN | 1573429 | 2/2005 |
| JP | 05-119331 | 5/1993 |
| JP | 06-194615 | 7/1994 |
| JP | 2000-075302 | 3/2000 |
| JP | 2004-205902 | 7/2004 |
| JP | 2005-181981 | 7/2005 |

OTHER PUBLICATIONS

Chen et al., Advanced MVA for High Quality LCD-TVs, SID 06 Digest, pp. 1946-1949, 2006.

Search Report (Application No.06021074.7; Dated Dec. 18, 2006).

Okutani et al., "13.4: A 20.8-inch WXGA Full Color AMOLED Display by Integrating Scattering Reflector with Micro-Bumps," SID Digest '07: SID International Symposium Digest of Technical Papers, pp. 173-176.

Office Action (Application No. 200610137403.6) Dated June 19, 2009.

Reflection region | Transmission region

Reflection region | Transmission region

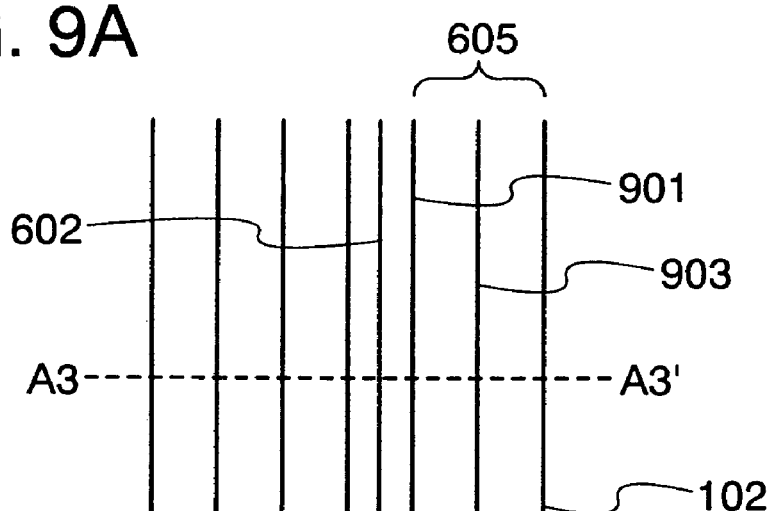
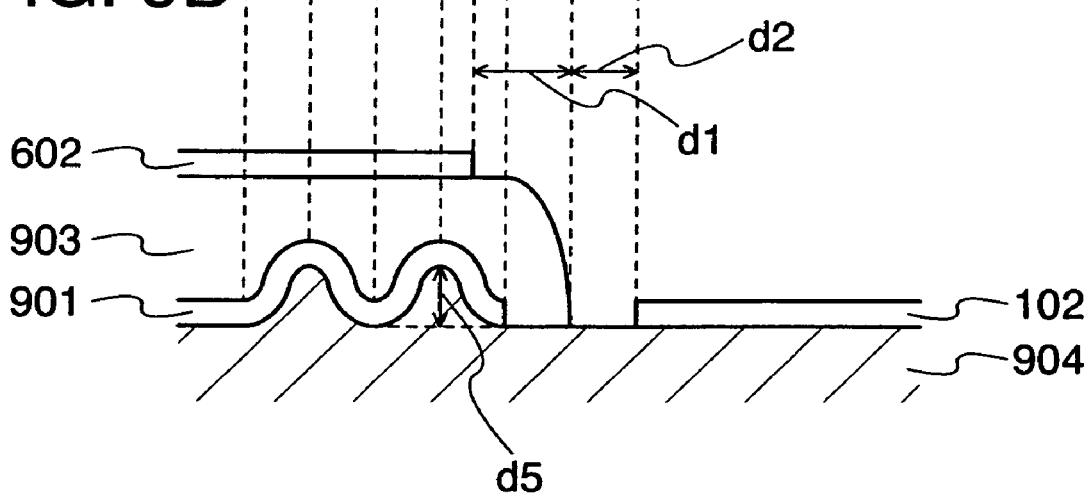

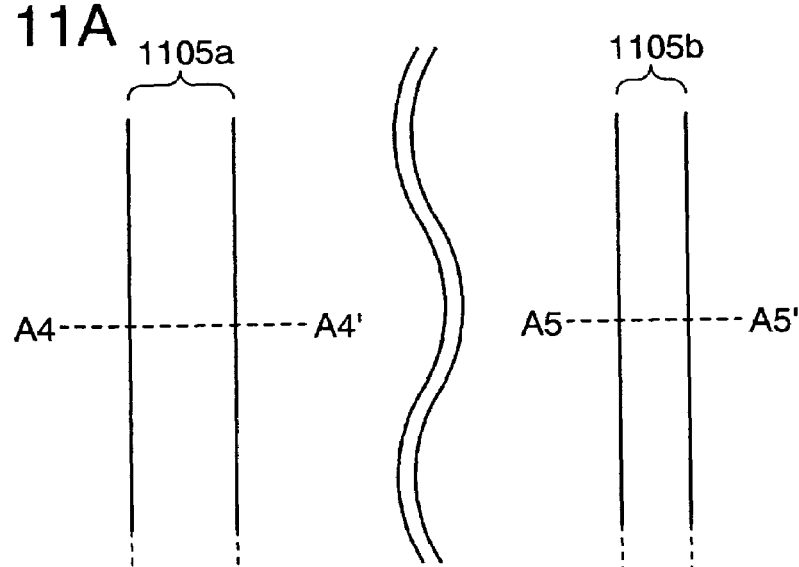
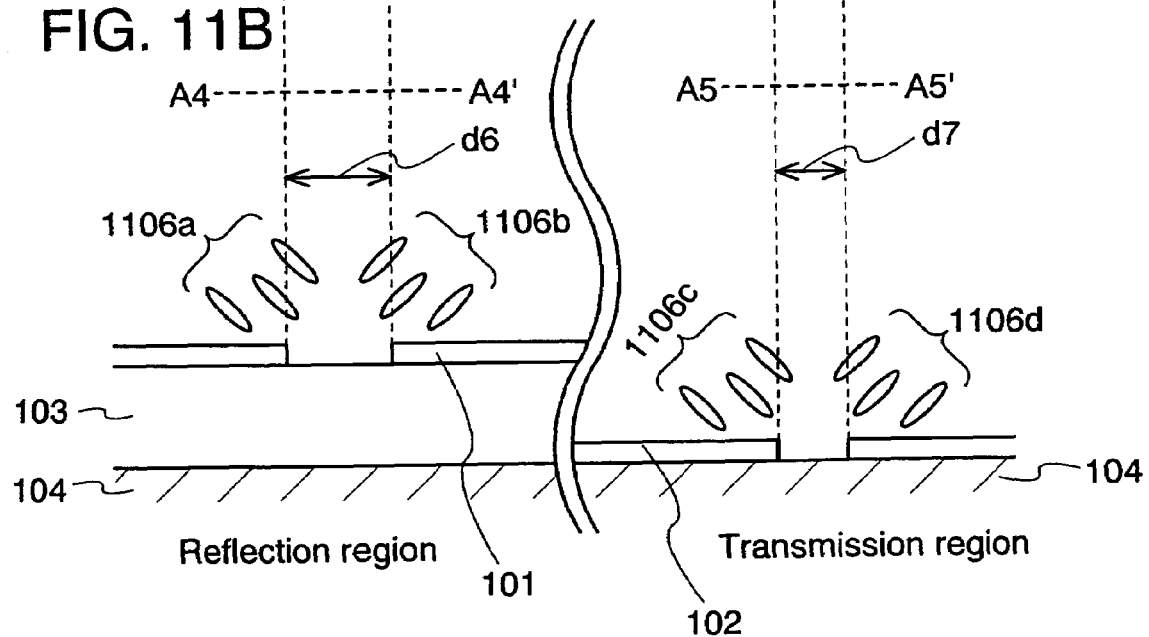

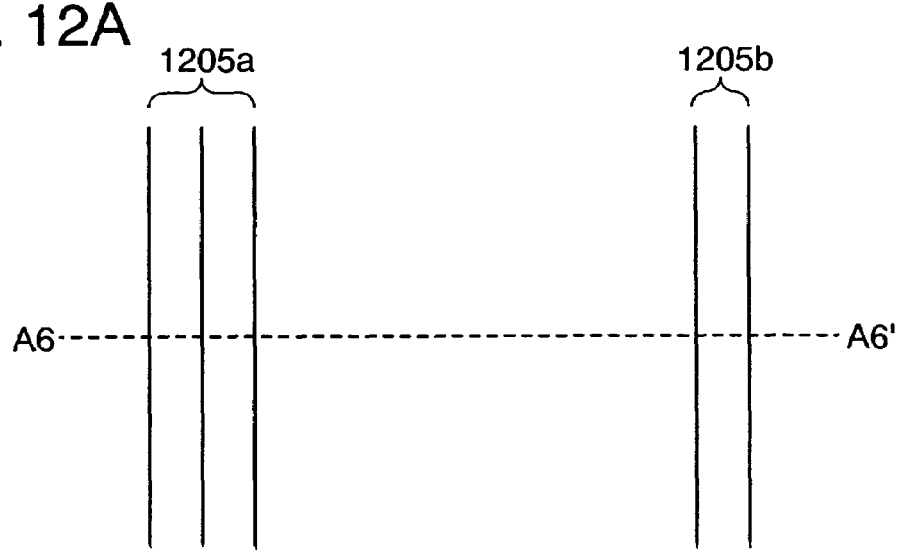
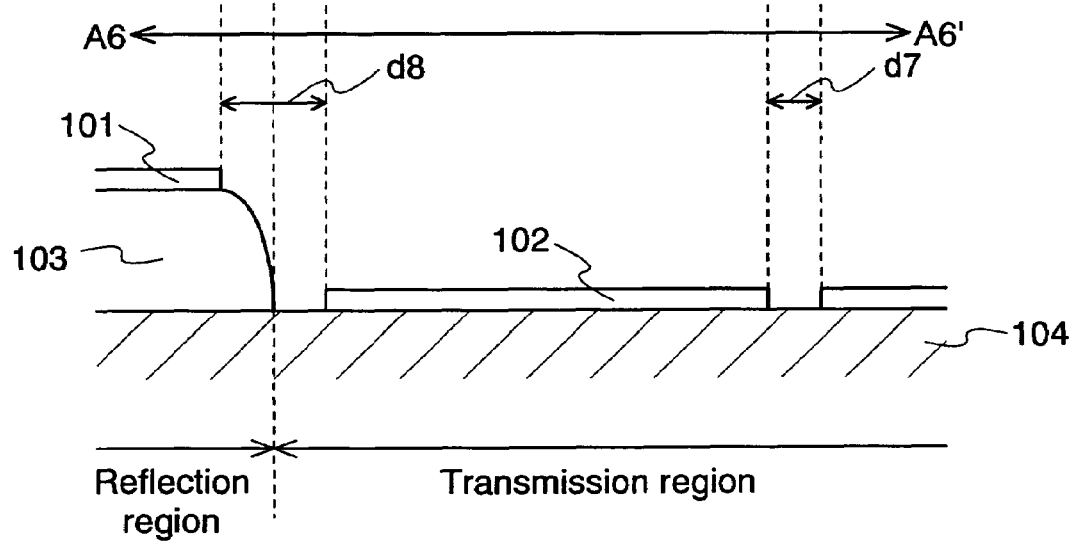

Transmission region | Reflection region

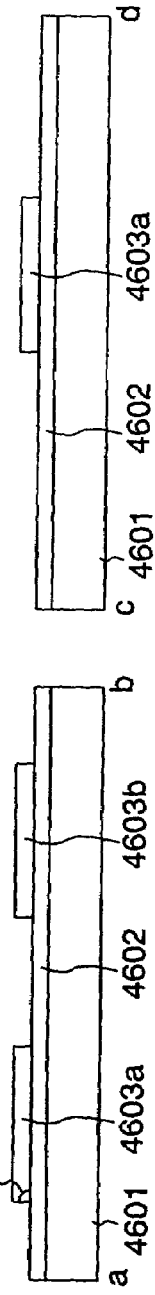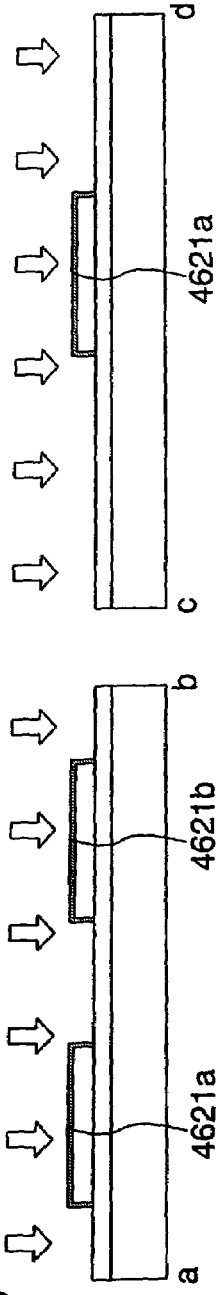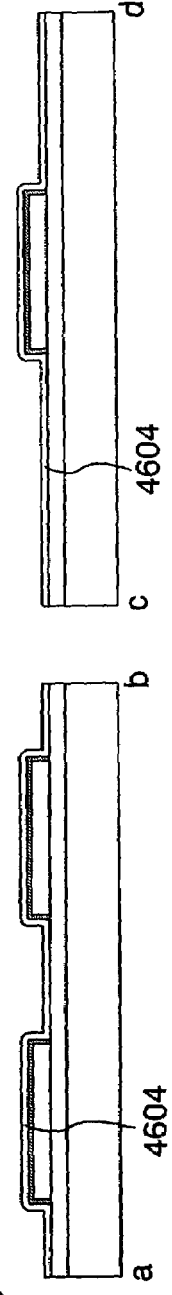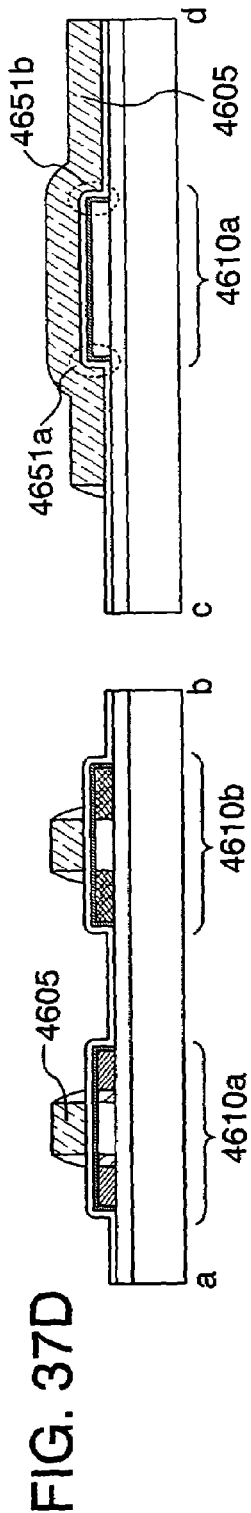
FIG. 37A
FIG. 37B
FIG. 37C
FIG. 37D

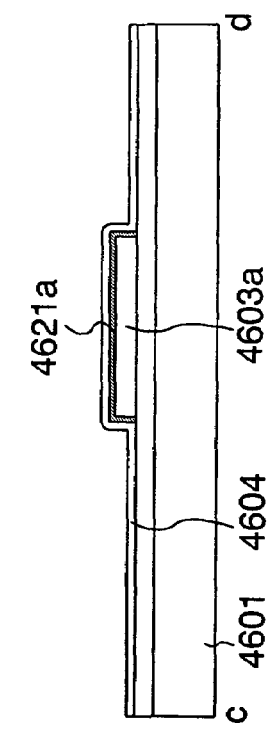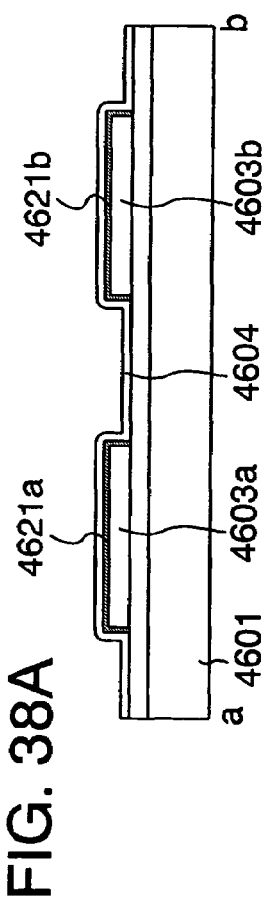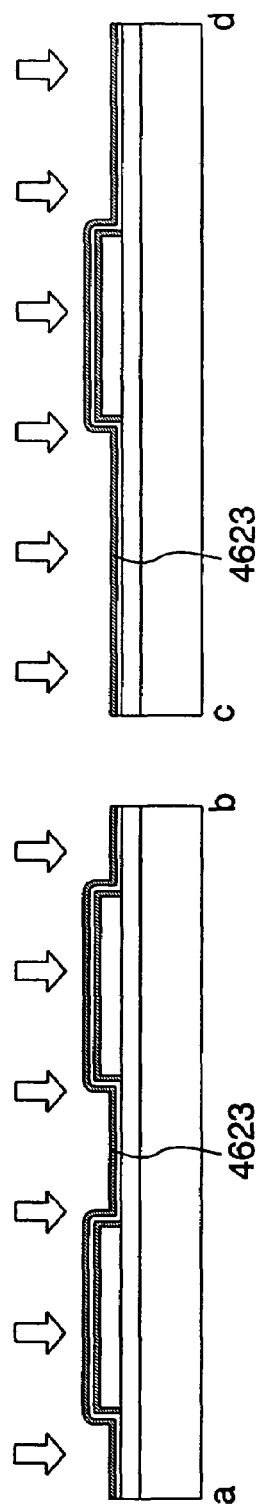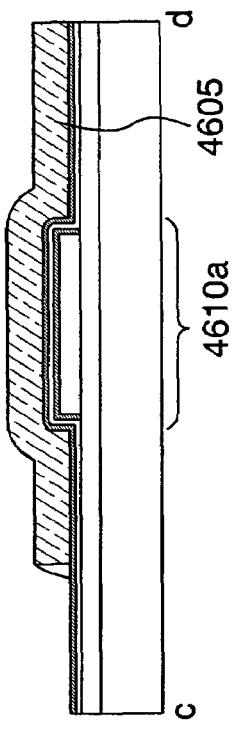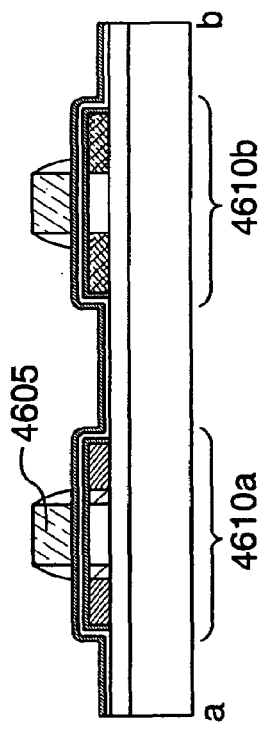
FIG. 38A
FIG. 38B
FIG. 38C

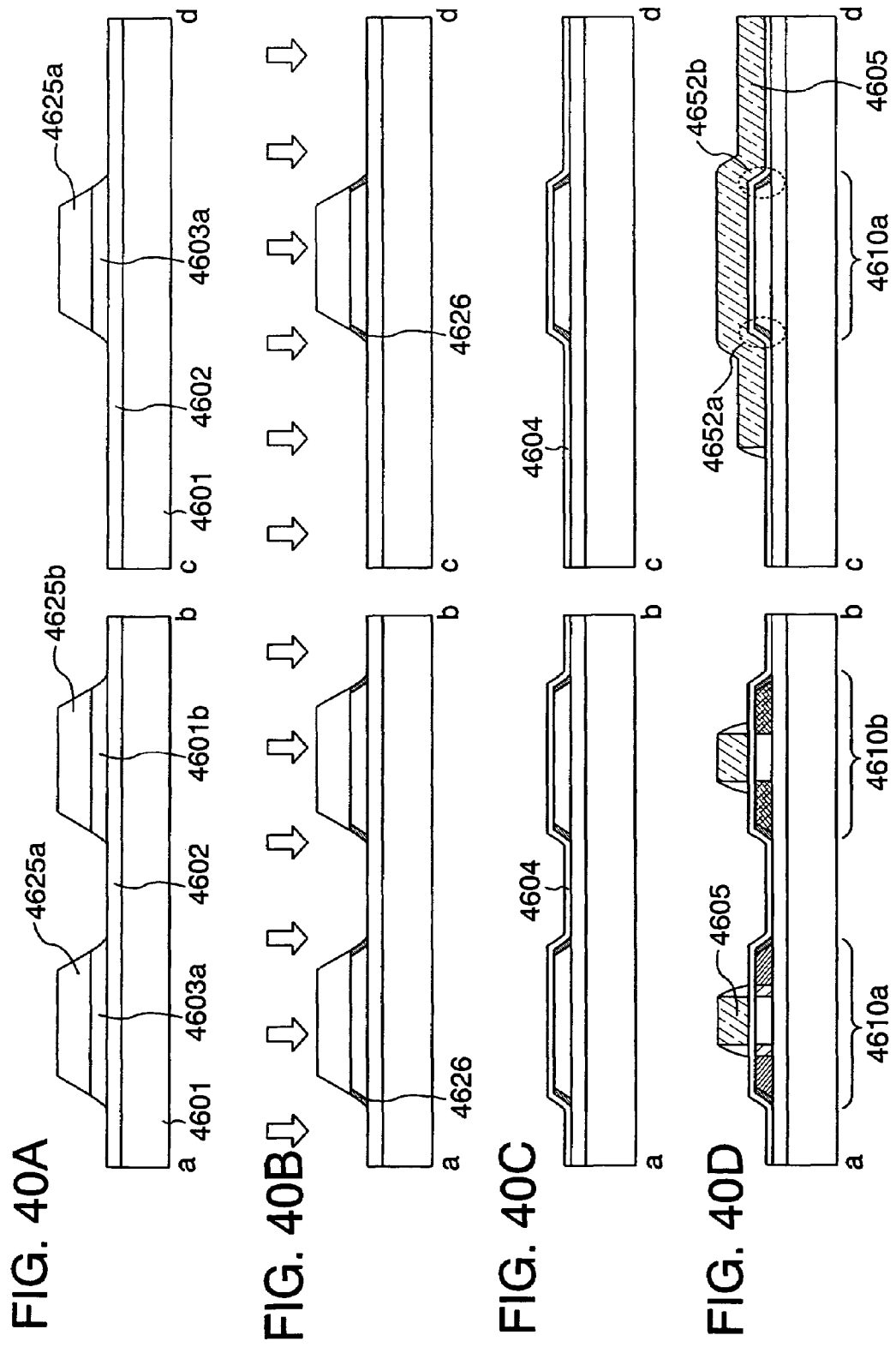

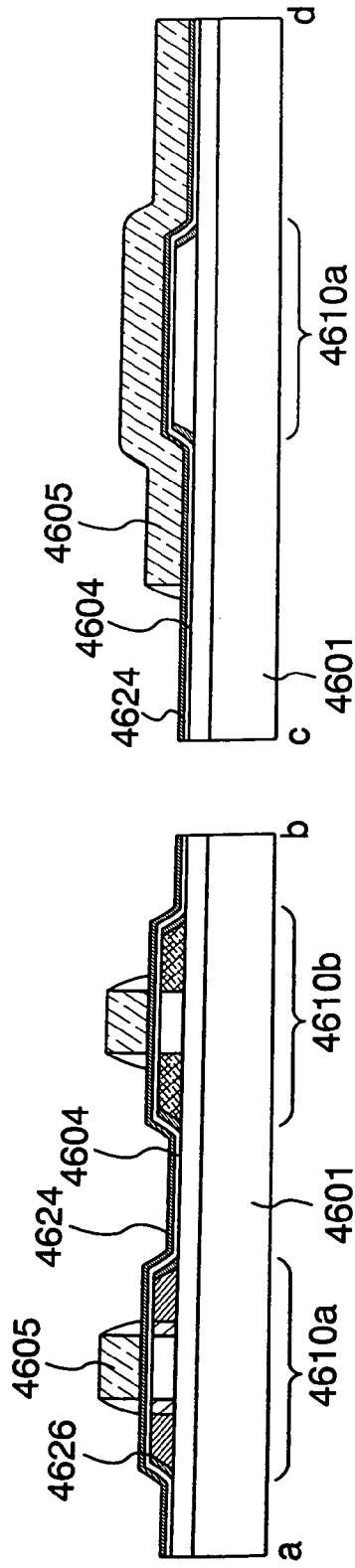
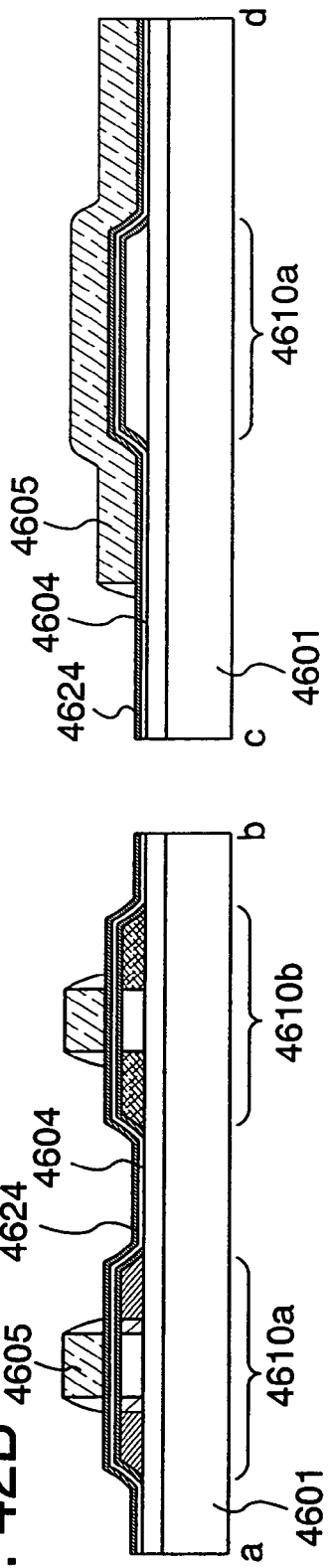
FIG. 42A
FIG. 42B

LIQUID CRYSTAL DISPLAY DEVICE AND ELECTRONIC APPARATUS

BACKGROUND OF THE INVENTION

1. Field of the Invention

The present invention relates to a liquid crystal display device performing a display of reflection type and transmission type, and particularly to a liquid crystal display device performing a display of a multi-domain mode.

2. Description of the Related Art

A liquid crystal display device is used for various electronic products such as a mobile phone, a monitor of navigation system, and a television. Some of these electronic products are used outside as well as inside, and a semi-transmission type liquid crystal display device is known, which includes both features of a transmission mode and a reflection mode in order to ensure a high visibility both outside and inside.

As for a semi-transmission type liquid crystal display device, a display device is known, which includes a pixel including a liquid crystal sandwiched between an active matrix substrate and an opposite substrate, a reflection portion performed a display of a reflecting mode and a transmission portion performed a display of a transmission mode (for example, Reference 1: Japanese Published Patent Application No. 2005-181981).

This liquid crystal display device includes an interlayer insulating film for which a thickness of a liquid crystal layer of the reflection portion is set to be substantially half of a thickness of a liquid crystal layer of the transmission portion. In addition, this liquid crystal display device includes an electrode coating which compensates a difference of work function because of a connection between a reflecting electrode and a transparent electrode as an applied voltage adjusting unit in order to approximate voltages applied to the liquid crystal at the reflection portion and the transmission portion close to each other. Further, the reflecting electrode and transparent electrode are provided with a protruding portion, and the liquid crystal is formed to have radial gradient orientation.

SUMMARY OF THE INVENTION

In the case where a liquid crystal is oriented in a radial gradient manner, there is an advantage that a viewing angle is wide when displaying an image. However, there are a number of places where directions of orientation of liquid crystals are different; there are problems that orientation control of a liquid crystal is difficult, a defect such as a disclination easily occurs, and image quality becomes low. In particular, in the case of a pixel structure combining a reflecting electrode with a transparent electrode such as a conventional semi-transmission type liquid crystal display device, there is a problem that these defects are increased.

Therefore, the present invention provides a semi-transmission type liquid crystal display device with high quality of display by improving a viewing angle when displaying an image and by suppressing deterioration of image quality due to disorder of orientation of the liquid crystal.

One feature of the invention is providing a liquid crystal display device including a liquid crystal layer sandwiched between a pair of substrates, which are arranged to oppose to each other, and formed of a liquid crystal molecule, a reflection region performing a display of a reflecting mode, a transmission region performing a display of a transmission mode which are provided over one of the pair of substrates, and a pixel electrode provided with a slit portion between the reflection region and the transmission region. The liquid crystal display device includes a cell gap adjusting film which is provided in the reflection region so that a thickness of the liquid crystal layer is substantially half of a thickness of a liquid crystal layer in the transmission region. A reflection region of the pixel electrode is formed of a light-reflecting conductive film (reflection electrode) over the cell gap adjusting film, and a transmission region thereof is formed of a transparent conductive film (transparent electrode). The slit portion is formed along a step portion (or a boundary portion) which is formed using by the cell gap adjusting film between the reflection region and the transmission region. Alternatively, the slit portion is extended radially to an oblique direction with respect to one end portion of the pixel electrode, and the step portion (or the boundary portion) which is formed using by the cell gap adjusting film between the reflection region and the transmission region is formed along the slit portion.

Orientation of a liquid crystal of the liquid crystal layer can be controlled by providing the cell gap adjusting film in the reflection region performing a display of a reflecting mode, and overlapping the step portion formed at the boundary portion of the cell gap adjusting film in accordance with the provision thereof with the slit portion of the pixel electrode.

That is, deterioration of image quality due to disorder of orientation of the liquid crystal can be controlled by using the boundary portion of the cell gap adjusting film or the step portion formed accompanying the boundary portion thereof, and the slit portion to control orientation of the liquid crystal and by preventing the control from counteracting and interfering with each other.

In the aforementioned liquid crystal display device, a structure of the slit portion can be allowed some modifications. For example, an end portion on the transmission region side of the slit portion can be provided apart from the step portion. In addition, the end portion on the transmission region side of the slit portion can be located at the inside of a lower edge portion of the step portion. Further, an end portion of the transmission region can be provided below the cell gap adjusting film, the end portion on the transmission region side of the slit portion can be provided at the inside of a lower edge portion of the step portion.

In this manner, even if a structure of the slit portion of the pixel electrode is changed, orientation of the liquid crystal of the liquid crystal layer can be controlled by providing the cell gap adjusting film in the reflection region performed a display of a reflecting mode, and overlapping the step portion formed at the boundary portion of the cell gap adjusting film in accordance with the provision thereof with the slit portion of the pixel electrode.

In addition, an upper surface of the cell gap adjusting film may be an uneven surface, and the light-reflecting conductive film (reflection electrode) of the reflection region may be formed along with the uneven surface. By making a surface of the light-reflecting conductive film (reflection electrode) uneven, incident light is diffused, so that a whole luminance is averaged and a clear image can be obtained in the case of displaying as a reflection type liquid crystal.

Another feature of the invention is providing a liquid crystal display device including a liquid crystal layer which is sandwiched between a pair of substrates, arranged to oppose to each other, and includes a liquid crystal molecule, a reflection region performing a display of a reflecting mode and a transmission region performing a display of a transmission mode which are provided over one of the pair of substrates, and a pixel electrode provided with a slit portion between the reflection region and the transmission region. The liquid crystal display device includes a cell gap adjusting film which is provided in the reflection region so that a thickness of the liquid crystal layer is substantially half of a thickness of the liquid crystal layer in the transmission region. A reflection region of the pixel electrode is formed of a transparent conductive film formed over the cell gap adjusting film and a light-reflecting film formed over a lower layer of the cell gap adjusting film, and a transmission region thereof is formed of a transparent conductive film. The slit portion is formed along a step portion which is formed by using the cell gap adjusting film between the reflection region and the transmission region. Alternatively, the slit portion is extended radially to an oblique direction with respect to one end portion of the pixel electrode, and the step portion which is formed using by the cell gap adjusting film between the reflection region and the transmission region is formed along the slit portion.

Orientation of a liquid crystal of the liquid crystal layer can be controlled by providing the cell gap adjusting film in the reflection region performed a display of a reflecting mode, and forming a reflection portion including the transparent conductive film formed over the cell gap adjusting film and the light-reflecting film formed over the lower layer of the cell gap adjusting film, and overlapping the step portion of the cell gap adjusting film in accordance with the provision thereof and the slit portion of the pixel electrode.

In the aforementioned liquid crystal display device, a structure of the slit portion can be allowed some modifications. For example, an end portion on the transmission region side of the slit portion can be provided apart from the step portion. In addition, the end portion on the transmission region side of the slit portion can be provided at the inside of a lower edge portion of the step portion. Further, the end portion of the transmission region can be provided on a lower layer side of the cell gap adjusting film, and the end portion on the transmission region side of the slit portion can be provided at the inside of a lower edge portion of the step portion.

In this manner, even if a structure of the slit portion of the pixel electrode is changed, orientation of the liquid crystal of the liquid crystal layer can be controlled by providing the cell gap adjusting film in the reflection region performed a display of a reflecting mode, and overlapping the step portion formed at the boundary portion of the cell gap adjusting film in accordance with the provision thereof and the slit portion of the pixel electrode.

In addition, a lower surface of the cell gap adjusting film may be an uneven surface, and a light-reflecting film of the reflection region may be formed along with the uneven surface. By making a surface of the light-reflecting film uneven, an incident light is diffused; therefore, a whole luminance is averaged and a clear image can be obtained in the case of display as a reflection type liquid crystal. In that case, disorder of orientation of the liquid crystal does not happen because an upper surface of the cell gap adjusting film may be even, by which deterioration of image quality due to disorder of orientation of the liquid crystal can be controlled.

In addition, in the invention, a strip-shaped protruding portion in an oblique direction with respect to an edge portion of the pixel electrode is provided with a structure of the aforementioned liquid crystal display device, and a liquid crystal display device of so-called multi-domain vertical alignment (MVA) type can be formed. Such a structure can also be obtained the same operation effect as described above.

In accordance with multi-domain, that is, having a plurality of regions, there is a plurality of directions in which liquid crystal molecules are inclined, and the ways the liquid crystal molecules look are averaged even when seen from any direction; therefore, a characteristic of viewing angle can be improved.

Note that a strip-shaped slit portion may be provided instead of the strip-shaped protruding portion in the oblique direction with respect to the edge portion of the pixel electrode. In addition, the strip-shaped slit portion may be provided over one substrate, and the strip-shaped protruding portion may be provided over the other substrate with the liquid crystal sandwiched therebetween.

Another feature of the invention is providing a liquid crystal display device including a liquid crystal layer disposed between a first substrate and a second substrate, a pixel electrode in a reflection region and a transmission region over the first substrate, a film for adjusting a cell gap in the reflection region over the first substrate, and an opposite electrode in the reflection region and the transmission region over the second substrate. The pixel electrode in the reflection region is provided over the film and reflects light. The pixel electrode in the transmission region transmits light. The pixel electrode in the reflection region and the transmission region includes a slit. The slit is overlapped with at least a part of a step portion which is provided by the film between the reflection region and the transmission region.

Note that in the invention, being connected is synonymous with being electrically connected. Therefore, in addition to a predetermined relation of connection, another element which enables an electrical connection (for example, a switch, a transistor, a capacitor, an inductor, a resistor element, a diode, or the like) may be provided in a structure disclosed by the invention. Components may be provided without through another element as well, and being electrically connected includes the case of being directly connected. Note that an element of various forms may be used as a switch, such as an electrical switch and a mechanical switch. That is, any element which can control a flow of current may be employed, and it is not limited to a specific form of a switch. For example, a transistor, a diode (a PN diode, a PIN diode, a schottky diode, a diode-connected transistor, or the like), or a logic circuit combined therewith may be used. In the case of using a transistor as a switch, a polarity (conductivity type) thereof is not specifically limited since the transistor is operated as a mere switch. However, a transistor with small OFF current is preferably used. As for a transistor with small OFF current, a transistor provided with an LDD region, a transistor with a multi-gate structure, or the like may be used. In addition, it is preferable to use an n-channel transistor when operating in a state where a potential of a source electrode of the transistor, which operates as a switch, is close to a low potential side power source (Vss, GND, 0V or the like), whereas it is preferable to use a p-channel transistor when operating in a state where a potential of a source electrode of the transistor is close to a high potential side power source (Vdd or the like). This is because it is easily operated as a switch since an absolute value of a gate-source voltage thereof can be made to be large. Note that a CMOS type switch may also be applied by using both n-channel and p-channel transistors. In the case where a CMOS type switch is employed the switch can be operated properly since an output voltage is easily controlled with respect to various input voltages.

Note that a transistor is an element having at least three terminals including a gate electrode, a drain region, and a source region. A channel forming region is provided between the drain region and the source region. Here, it is difficult to precisely define the source region and the drain region since they depend on a structure, operating conditions, and the like of the transistor. Therefore, in the case of explaining a relation of connection of a transistor, concerning two terminals of the source region and the drain region, one of electrodes connected to these regions is referred to as a first electrode, and the other electrode is referred to as a second electrode, which may be used for explanation. Note that a transistor may be an element having at least three terminals including a base, an emitter, and a collector. Similarly, in this case, the emitter and the collector may be called a first electrode and a second electrode, respectively.

Noted that a structure of a transistor can have various modes and is not limited to a specific structure. For example, a multi-gate structure where the number of gates is two or more may be employed. With a multi-gate structure, an OFF current can be reduced and reliability can be improved by improving the pressure resistance of a transistor, and a change of current flowing between a drain and a source in accordance with a change of voltage between a drain and a source can be reduced when operating in a saturation region. Further, gate electrodes may be provided over and under a channel. By a structure where gate electrodes are provided over and under a channel, a channel region increases, thereby a current value is increased, and a subthreshold value (S value) can be improved since a depletion layer is easily formed. Further, a gate electrode may be provided over or under the channel. Either a forward staggered structure or an inversely staggered structure may be employed. A channel region may be divided into a plurality of regions, or connected in parallel or in series. Further, a source electrode or a drain electrode may overlap with a channel (or a part thereof), thereby preventing a charge from being accumulated in a part of the channel and operating unstably. Further, an LDD region may be provided. By providing an LDD region, an OFF current can be reduced and reliability can be improved by improving the pressure resistance of a transistor, and a characteristic that a drain-source current does not change much even when a drain-source voltage changes when operating in a saturation region can be obtained.

Note that a gate includes a gate electrode and a gate wire (also referred to as a gate line, a gate signal line, or the like) or a part thereof. Note that a gate electrode corresponds to a part of a conductive film overlapping with a semiconductor, in which a channel region is formed, with a gate insulating film sandwiched therebetween. A gate wire corresponds to a wire for connecting gate electrodes of pixels and for connecting a gate electrode and another wire.

However, there is also a portion which functions both as a gate electrode and as a gate wire. That is, there is a region which cannot be specifically distinguished between a gate electrode and a gate wire. For example, in the case of a channel region overlapping with a gate wire which is extended, the region functions as a gate wire and also as a gate electrode. Therefore, such a region may be referred to as a gate electrode or a gate wire.

In addition, a region which is formed of the same material as a gate electrode and connected to the gate electrode may be called a gate electrode as well. Similarly, a region which is formed of the same material as a gate wire and connected to the gate wire may be called a gate wire. In a strict sense, such a region does not overlap a channel region or does not have a function to connect to another gate electrode in some cases. However, there is a region which is formed of the same material as a gate electrode or a gate wire and connected to the gate electrode or the gate wire due to a manufacturing margin and the like. Therefore, such a region may be called a gate electrode or a gate wire.

In addition, for example, in a multi-gate transistor, a gate electrode of one transistor and a gate electrode of another transistor are often connected with a conductive film formed of the same material as the gate electrode. Such a region may be called a gate wire since it is a region for connecting the gate electrodes, or may be called a gate electrode since a multi-gate transistor can be considered as one transistor. That is, a component which is formed of the same material as a gate electrode or a gate wire and connected to the gate electrode or the gate wire may be called a gate electrode or a gate wire. Further, for example, a part of a conductive film which connects a gate electrode and a gate wire may be called a gate electrode or a gate wire.

Note that a gate terminal corresponds to a part of a region of a gate electrode or a region electrically connected to a gate electrode.

Note that a source corresponds to a source region, a source electrode, and a source wire (also referred to as a source line, a source signal line, or the like), or a part thereof. A source region corresponds to a semiconductor region which contains a large amount of a P-type impurity (boron, gallium, or the like) or an N-type impurity (phosphorus, arsenic, or the like). Therefore, a region containing a small amount of a P-type impurity or an N-type impurity, that is, an LDD (Lightly Doped Drain) region is not included in a source region. A source electrode corresponds to a conductive layer which is formed of a different material from a source region and electrically connected to the source region. However, a source electrode including a source region may be called a source electrode. A source wire corresponds to a wire for connecting source electrodes of pixels and for connecting a source electrode and another wire.

However, there is a part which functions both as a source electrode and as a source wire. That is, there is a region which cannot be specifically distinguished between a source electrode and a source wire. For example, when there is a source region overlapping a source wire which is extended, the region functions both as a source wire and as a source electrode. Therefore, such a region may be called a source electrode or a source wire.

Further, a region which is formed of the same material as a source electrode and connected to the source electrode, or a connecting portion of the source electrodes may be called a source electrode as well. A portion overlapping a source region may be called a source electrode. Similarly, a region which is formed of the same material as a source wire and connected to the source wire may be called a source wire. In a strict sense, such a region does not have a function to connect to another source electrode in some cases. However, there is a region which is formed of the same material as a source electrode or a source wire and connected to a source electrode or a source wire due to a manufacturing margin and the like. Therefore, such a region may also be called a source electrode or a source wire.

In addition, for example, a portion of a conductive film which connects a source electrode and a source wire may be called a source electrode or a source wire.

Note that the same as a source is applied to a drain, and description thereof is omitted.

In the specification, pixels may be arranged in matrix. Here, the case where pixels are arranged in matrix corresponds to the cases where pixels are arranged in a straight line and a jagged line in a longitudinal direction or a lateral direction. Therefore, in the case of performing a full color display with three color elements (for example, RGB), an arrangement of pixels may include the case of arranging in stripes and the case where pixels of the three color elements are arranged in a so-called delta pattern. Further, a Bayer pattern may be included.

Note that in the invention one pixel corresponds to one element which can control brightness. Therefore, for example, one pixel denotes one color element by which brightness is expressed. Accordingly, in the case of a color display device formed of color elements of R (red), G (green), and B (blue), the smallest unit of an image is formed of three pixels of an R pixel, a G pixel, and a B pixel. Note that the number of color of color elements is not limited to three colors and may be formed of more than three colors such as RGBW (W is white) and RGB to which yellow, cyan, and magenta are added.

In addition, as another example, in the case of controlling the brightness of one color element by using a plurality of regions, one of the plurality of regions corresponds to one pixel. However, the case of employing a subpixel is excluded. For example, in the case of performing an area gray scale display, a plurality of regions for controlling the brightness are provided for one color element, which express a gray scale as a whole, and one of the regions for controlling the brightness corresponds to one pixel. Therefore, in this case, one color element is formed of a plurality of pixels. Moreover, in this case, a region which contributes to a display may differ in size depending on pixels. In the plurality of pixels forming one color element, a viewing angle may be expanded by supplying a slightly different signal to each pixel.

Note that in the specification, a semiconductor device corresponds to a device including a circuit which has a semiconductor element (a transistor, a diode, or the like). Further, a semiconductor device may be a general device which can operate by using semiconductor characteristics. A display device corresponds to a device including a display element (a liquid crystal element, a light emitting element, or the like). Note that a display device may be a main body of a display panel in which a plurality of pixels including a display element such as a liquid crystal element or an EL element and a peripheral driver circuit for driving the pixels are formed over a substrate. Further, a display device may include an element (an IC, a resistor, a capacitor, an inductor, a transistor, or the like) which is provided with a flexible printed circuit (FPC) or a printed wiring board (PWB). A display device may include an optical sheet such as a polarizing plate or a retardation film. In addition, a backlight (such as a light conductive plate, a prism sheet, a diffusion sheet, a reflection sheet, a light source (LED, cold-cathode tube, or the like) may be included.

Note that in the display device of the invention various modes and various display elements can be applied. For example, a display medium in which contrast is changed by an electromagnetic effect can be used, such as an EL element (an organic EL element, an inorganic EL element, or an EL element containing an organic material and an inorganic material), an electron-emissive element, electronic ink, a grating light valve (GLV), a plasma display (PDP), a digital micromirror device (DMD), a piezoelectric ceramic display, or a carbon nanotube in addition to a liquid crystal element. Note that a display device using an EL element includes an EL display; a display device using an electron-emissive element includes a field emission display (FED), an SED type flat panel display (Surface-conduction Electron-emitter Display), and the like; a display device using a liquid crystal element includes a liquid crystal display, a transmission type liquid crystal display, a semi-transmission type liquid crystal display, a reflection type liquid crystal display; and a display device using electronic ink includes electronic paper.

Note that in the invention, when it is described that an object is formed on another object, it does not necessarily mean that the object is in direct contact with the another object. The case where two objects are not in direct contact with each other, that is, the case where other object is sandwiched therebetween may also be included. Accordingly, when it is described that a layer B is formed on a layer A, for example, it means either the case where the layer B is formed in direct contact with the layer A, or the case where another layer (such as a layer C or a layer D) is formed in direct contact with the layer A and then the layer B is formed in direct contact with the another layer. In addition, when it is described that an object is formed over or above another object, it is not limited in the case where the object is in direct contact with the another object and still another object may be sandwiched therebetween. Accordingly, when it is described that a layer B is formed over or above a layer A, for example, it means either the case where the layer B is formed in direct contact with the layer A, or the case where another layer (such as a layer C or a layer D) is formed in direct contact with the layer A and then the layer B is formed in direct contact with the another layel Similarly, when it is described that an object is formed below or under another object, it means either the case where the objects are in direct contact with each other or not in contact with each other.

Orientation of a liquid crystal can be controlled by providing a cell gap adjusting film in a reflection region of a pixel electrode, and providing a step portion thereof (a boundary portion of the cell gap adjusting film) so as to overlap in parallel with a slit portion at a boundary portion between a reflection region and a transmission region. Therefore, a semi-transmission type liquid crystal display device with high display quality can be obtained by improving a viewing angle when displaying an image and by suppressing deterioration of image quality due to disorder of orientation of the liquid crystal.

BRIEF DESCRIPTION OF DRAWINGS

FIGS. 9A and 9B are diagrams showing a structure of a display device of the invention.

FIGS. 11A and 11B are diagrams showing a structure of a display device of the invention.

FIGS. 12A and 12B are diagrams showing a structure of a display device of the invention.

FIGS. 37A to 37D are diagrams showing a manufacturing flow of a display device of the invention.

FIGS. 38A to 38C are diagrams showing a manufacturing flow of a display device of the invention.

FIGS. 40A to 40D are diagrams showing a manufacturing flow of a display device of the invention.

FIGS. 42A and 42B are diagrams showing a manufacturing flow of a display device of the invention.

DETAILED DESCRIPTION OF THE INVENTION

Figure 1A:
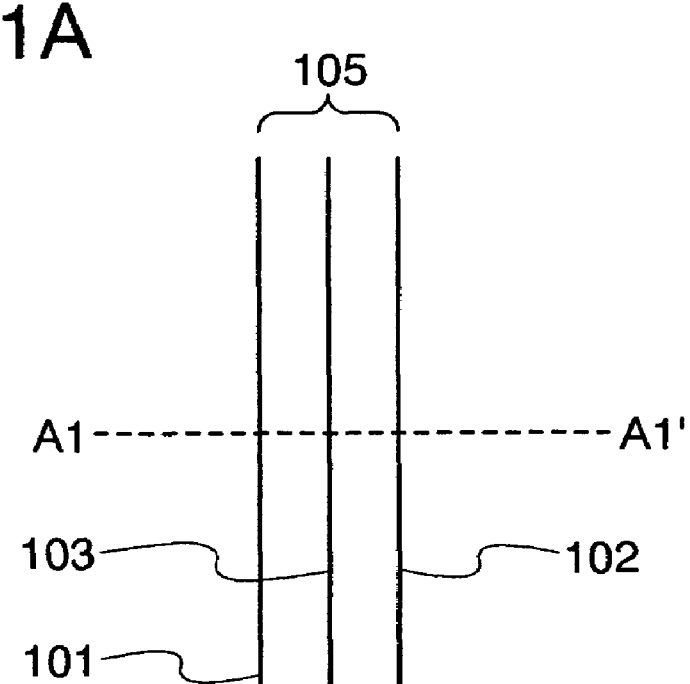
FIGS. 1A and 1B are diagrams showing a structure of a display device of the invention.

Although the invention will be fully described by embodiment modes with reference to the accompanying drawings, it is to be understood that various changes and modifications will be apparent to those skilled in the art. Therefore, unless such changes and modifications depart from the spirit and the scope of the invention, they should be construed as being included therein. Note that in a structure of the invention described below, a reference numeral denoting the same component in a different drawing is used commonly, and description thereof may be omitted.

Embodiment Mode 1

In this embodiment mode, description is made of a structure of a semi-transmission type liquid crystal (which includes a reflection region and a transmission region in one pixel, and can be employed both as a transmission type liquid crystal and a reflection type liquid crystal) employing a vertically aligned liquid crystal, which has different cell gaps (a distance between two electrodes arranged to face each other through a liquid crystal) of a liquid crystal in the transmission region and the reflection region, so that a display can be performed normally. A light entering a liquid crystal is passed through the liquid crystal twice in the reflection region, and a light is passed through the liquid crystal once in the transmission region. Therefore, it is required to perform a similar display in the case of performing a display as the transmission type liquid crystal and in the case of performing a display as the reflection type liquid crystal, and a cell gap in the reflection region is made nearly half of a cell gap in the transmission region so that distances where the light is passed through the liquid crystal are almost the same. As a method for reducing the cell gap in the reflection region, a film is provided as a spacer in the reflection region. Hereinafter, this film is also referred to as a cell gap adjusting film or a film for adjusting a cell gap.

Note that the cell gap in the transmission region corresponds to a distance between a transparent electrode and an electrode on an opposite side across the liquid crystal, while the cell gap in the reflection region corresponds to a distance between an electrode (there are the case of the transparent electrode and the case of an reflection electrode) over the cell gap adjusting film and an electrode of an opposite side across the liquid crystal. In the case where an electrode is uneven, the distance is calculated using an average of a high part and a low part thereof.

In the case of the vertically aligned liquid crystal, liquid crystal molecules stand perpendicularly to a substrate when a voltage is not applied to the liquid crystal, and the liquid crystal molecules are inclined in a parallel direction when a voltage is applied to the liquid crystal. At that time, the way an electric field is applied and a pretilt angle of the liquid crystal molecules are required to be controlled in order to control a direction that the liquid crystal is inclined.

As a method for controlling a direction that the liquid crystal is inclined when a voltage is applied, a gap like a slit is made at an electrode, so that an electric field is supplied in a slightly-curved direction with respect to an up-and-down direction (the same direction as the liquid crystal vertically aligned, and a vertical direction to the substrate and the electrode). For example, in the case where one electrode for applying an electric field to the liquid crystal is provided over a whole region, the electric field is applied in an up-and-down direction appropriately because the electric field is equally applied. However, when an electrode is provided with a gap like a slit and a space, the electric field curves slightly. The liquid crystal molecules are controlled in accordance with an electric field and incline in a parallel direction in accordance with a direction of the electric field. Accordingly, distortion of the electric field is used for controlling a direction that the vertically aligned liquid crystal molecules are inclined when a voltage is applied. Therefore, it can be prevented from a defective display due to an orientation defect caused by the inclination of the liquid crystal molecules in various directions.

As another method for controlling a direction that the liquid crystal molecules are inclined, a projection (a protruding portion) is provided over an electrode portion. The pretilt angle of the liquid crystal molecules changes along with a projection when provided. Accordingly, the liquid crystal molecules incline slightly even in condition that the electric field is not supplied to the liquid crystal; therefore, the direction that the liquid crystal molecules are inclined can be controlled in accordance with a slightly-inclined direction when a voltage is supplied.

Meanwhile, a cell gap adjusting film is provided in the reflection region in order that the transmission region and the reflection region have different cell gaps of the liquid crystal. The cell gap adjusting film is thick, therefore influencing a direction that the vertically aligned liquid crystal molecules are inclined. Therefore, it is required to avoid disordering orientation of the liquid crystal molecules and causing a disclination in a boundary portion between the transmission region and the reflection region (or a step portion formed by the cell gap adjusting film).

Figure 1B:
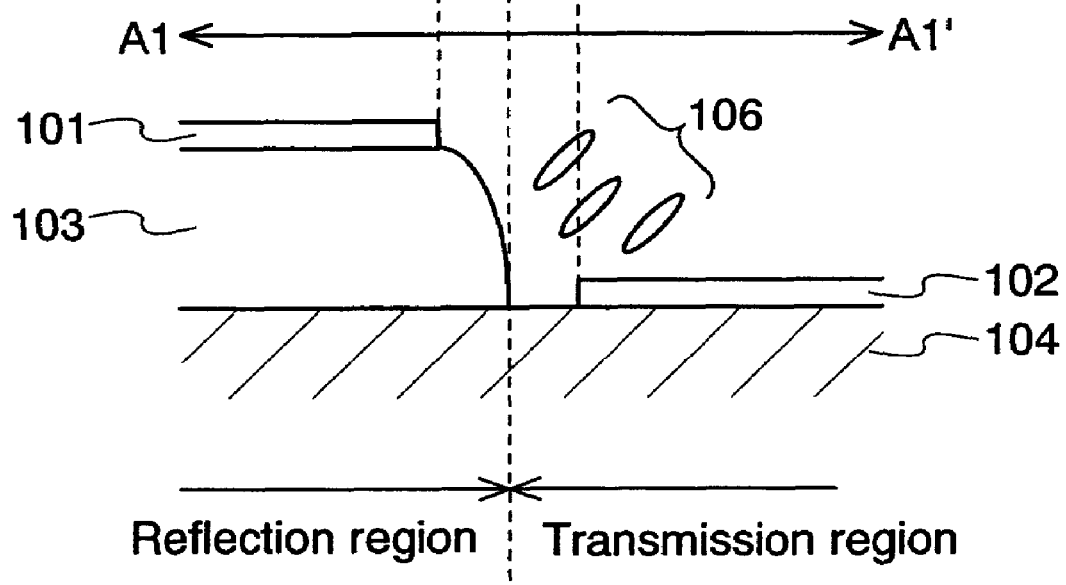

FIGS. 1A and 1B show a relation between a reflection electrode 101, a transparent electrode 102, and a slit 105 (a gap, a space, or the like) of an electrode, and a cell gap adjusting film 103. FIG. 1A is a top plan layout view. FIG. 1B is a cross sectional view taken a line A1-A1' in FIG. 1A. As shown in FIG. 1A, in the case where the reflection electrode 101, the transparent electrode 102, the slit 105 (the gap, the space, or the like) of the electrode are provided, the reflection electrode 101 and the transparent electrode 102 are arranged approximately in parallel. Therefore, the slit 105 (the gap, the space, or the like) of the electrode, which is formed by the reflection electrode 101 and the transparent electrode 102, is also arranged approximately in parallel. The cell gap adjusting film 103 (a boundary portion or a step portion thereof) is provided to be arranged approximately in parallel therewith. The boundary portion (or the step portion) of the cell gap adjusting film 103 is provided between the reflection electrode 101 and the transparent electrode 102. As shown in FIG. 1B, the cell gap adjusting film 103 is formed over a lower layer 104, the reflection electrode 101 is formed over the cell gap adjusting film 103, and the transparent electrode 102 is formed over the lower layer 104.

As shown in FIG. 1B, liquid crystal molecules 106 are oriented by providing the slit 105 (the gap, the space, or the like) of the electrode and a protrusion of the cell gap adjusting film 103. A direction of inclination of the liquid crystal molecules 106 in the case where only the slit 105 (the gap, the space, or the like) of the electrode is provided and a direction of inclination thereof in the case where only the cell gap adjusting film 103 is provided are almost the same. The direction of inclination of the liquid crystal molecules 106 by providing the slit 105 is almost the same as the direction of inclination of the liquid crystal molecules 106 by providing the cell gap adjusting film 103, therefore not disturbing each other. The liquid crystal is oriented appropriately, and disorder of orientation thereof hardly happens.

As shown in FIG. 1A, a direction of the liquid crystal is arranged in one direction by arranging the slit 105 (the gap, the space, or the like) of the electrode and the boundary portion (or the step portion) of the cell gap adjusting film 103 in parallel; therefore, orientation of the liquid crystal molecules 106 is hardly disordered.

In the case where the liquid crystal molecules are inclined and in a radial pattern from one point as a flower blooms, a region in which most of the liquid crystal molecules inclined to various directions is made at a boundary with another adjacent region; therefore, disorder of orientation of the liquid crystal molecules may occur. In addition, in the case where the cell gap adjusting film is provided, orientation of the liquid crystal is affected, so that disorder thereof may be worse. However, in the invention, the liquid crystal is aligned in a region extended in parallel, so that a region in which liquid crystal molecules inclined to various directions gather is hardly made, and disorder of orientation of the liquid crystal molecules hardly occurs.

Note that the lower layer 104 may have various structures. A transistor, an interlayer film, glass, and the like may be provided. A color filter, a black matrix, and the like may be provided. In addition, the lower layer 104 is not required to be even. Further, a transistor may be provided over an opposite substrate but not over the lower layer 104 with the liquid crystal sandwiched between the opposite substrate and the lower layer 104.

The slit 105 (the gap, the space, or the like) of the electrode, the reflection electrode 101, the transparent electrode 102, and the boundary portion (or the step portion) of the cell gap adjusting film 103 is not required to be perfectly parallel as a part thereof or as a whole. A space, a distance and a position thereof may be changed to some extent depending on a place if an operation is not affected.

In the case where the slit 105 (the gap, the space, or the like) of the electrode, the reflection electrode 101, the transparent electrode 102, and the boundary portion (or the step portion) of the cell gap adjusting film 103 are provided in parallel, a length of a part in parallel therewith is not limited as long as it is longer than at least a width of the slit 105 (the gap, the space, or the like) of the electrode. Note that it is preferably provided as long as possible in a pixel pitch.

The reflection electrode 101 is acceptable as long as it reflects light. Therefore, the transparent electrode may be provided above or below the reflection electrode. That is, a stacked structure can be used for an electrode. A stacked structure can be used for a part of the reflection electrode 101 or as a whole.

Figure 2A:
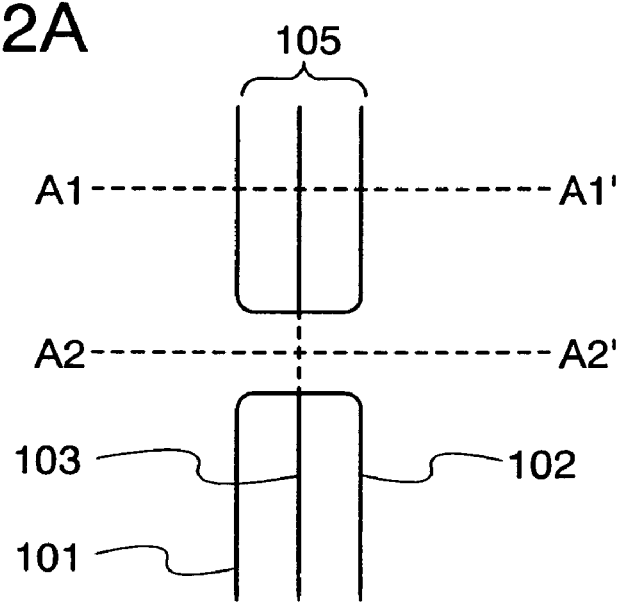
FIGS. 2A to 2C are diagrams showing a structure of a display device of the invention.
Figure 2B:
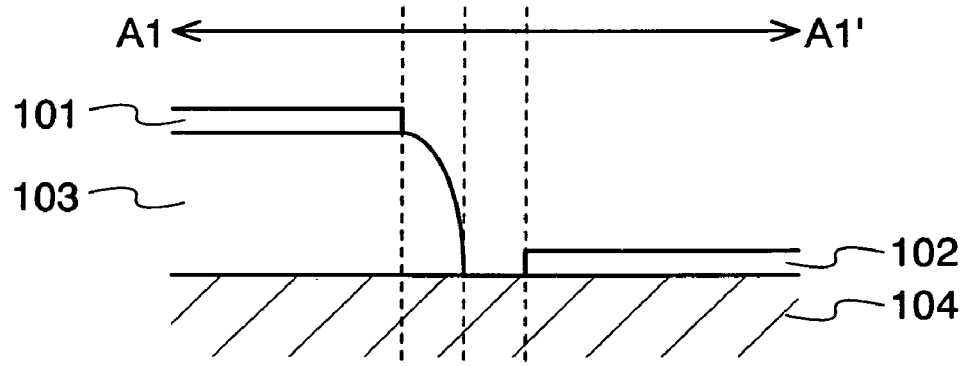
Figure 2C:
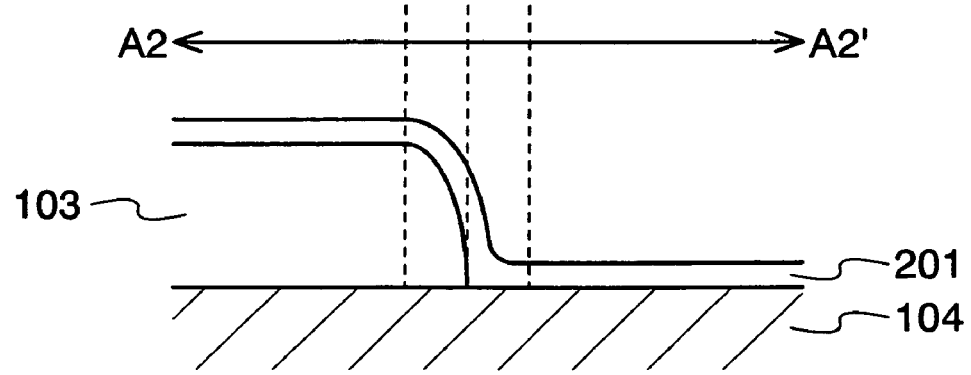

The reflection electrode 101 and the transparent electrode 102 are electrically connected and operated as one electrode for the liquid crystal; therefore, the reflection electrode 101 and the transparent electrode 102 are required to be electrically connected. Accordingly, when the reflection electrode 101 is provided only over the cell gap adjusting film 103 or when the transparent electrode 102 is not provided over the cell gap adjusting film 103, the reflection electrode 101 and the transparent electrode 102 cannot be electrically connected. Thus, as shown in FIGS. 2A to 2C, the reflection electrode 101 may be extended below the cell gap adjusting film 103 or the transparent electrode 102 may be extended above the cell gap adjusting film 103 in order that the reflection electrode 101 and the transparent electrode 102 are electrically connected. FIG. 2A is a top plan layout view. FIG. 2B is a cross sectional view taken a line A1-A1' in FIG. 2A. FIG. 2C is a cross sectional view taken a line A2-A2' in FIG. 2A. As shown in FIG. 2C, an electrode 201 is either the reflection electrode 101 or the transparent electrode 102, and becomes either a transmission electrode or a reflection electrode from a certain region. Therefore, the number of layers may be increased in the middle of a region.

That is, the transparent electrode 102 may be in contact with a part of the reflection electrode 101 or a whole.

Note that in one pixel, it is not preferable that the reflection electrode 101 and the transparent electrode 102 are in a floating state although an electric field is desired to be applied to the liquid crystal. Therefore, as shown in FIGS. 2A and 2C, at least a part of the reflection electrode and at least a part of the transparent electrode may be electrically connected. As shown in FIGS. 2B, 1A and 1B, the reflection electrode 101 and the transparent electrode 102 may be provided separately, and a slit (a gap, a space, or the like of electrodes) may be provided therebetween.

Figure 3A:
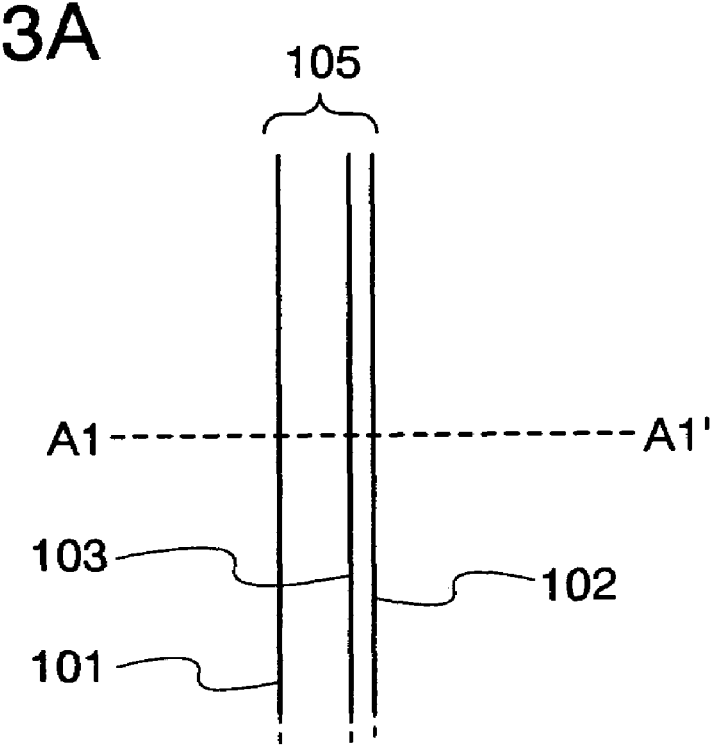
FIGS. 3A and 3B are diagrams showing a structure of a display device of the invention.
Figure 3B:
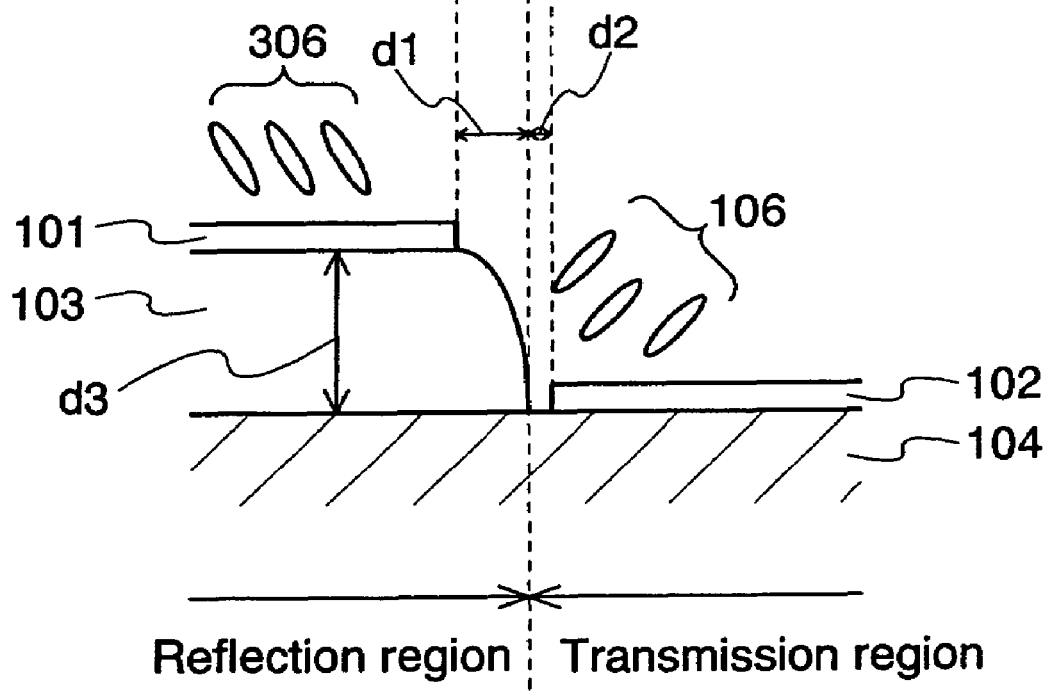

Next, the description is made of a distance between the reflection electrode 101 and the transparent electrode 102, and the boundary portion of the cell gap adjusting film 103. The liquid crystal molecules 106 is controlled by using the transparent electrode 102 of a transmission region. As a method for controlling a direction that the liquid crystal molecules are inclined, both the slit 105 (the gap, the space, or the like) of the electrode and the cell gap adjusting film 103 are used. As shown in FIGS. 3A and 3B, a distance d2 between the boundary portion of the cell gap adjusting film 103 and the transparent electrode 102 may be short.

On the other hand, liquid crystal molecules 306 are controlled by using the reflection electrode 101. As a method for controlling a direction that the liquid crystal molecules 306 are inclined, only the slit 105 (the gap, the space, or the like) of the electrode is used. Therefore, a distance d1 between the boundary portion of the cell gap adjusting film 103 and the reflection electrode 101 is required to be large. In the case where the distance d1 is small, the liquid crystal molecules may be inclined to an undesirable direction since the liquid crystal molecules 306 are not fully controlled by the reflection electrode 101. In view of the above, the distance d1 between the boundary portion of the cell gap adjusting film 103 and the reflection electrode 101 is preferably larger than the distance d2 between the boundary portion of the cell gap adjusting film 103 and the transparent electrode 102.

In addition, as a relation to a thickness d3 of the cell gap adjusting film, the thickness d3 of the cell gap adjusting film is preferably smaller than the distance d1 between the boundary portion of the cell gap adjusting film 103 and the reflection electrode 101. By making the distance d1 between the boundary portion of the cell gap adjusting film 103 and the reflection electrode 101 larger than the thickness d3 of the cell gap adjusting film, an upper surface of the cell gap adjusting film 103 is made to be even, and the liquid crystal molecules 306 can be fully controlled.

Figure 4A:
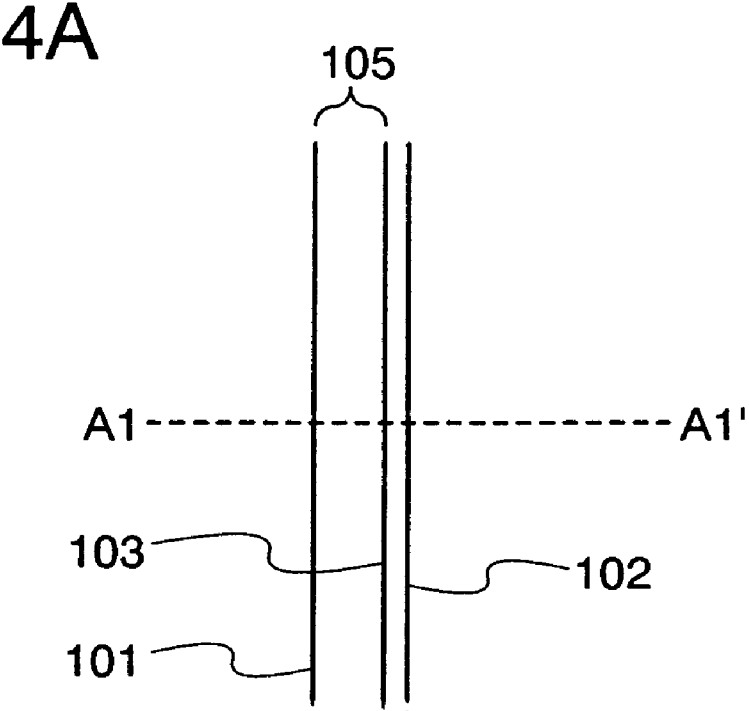
FIGS. 4A and 4B are diagrams showing a structure of a display device of the invention.
Figure 4B:
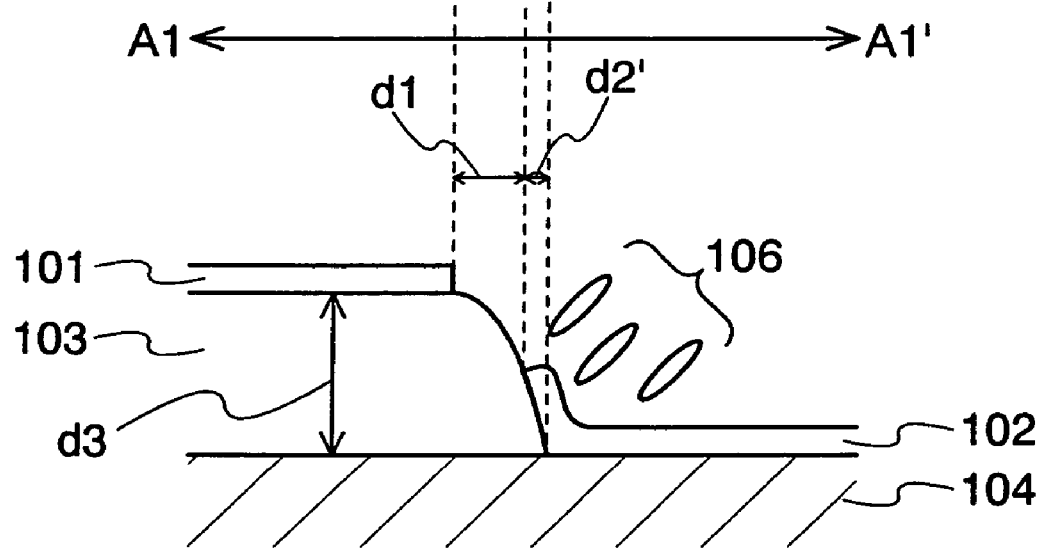

The liquid crystal molecules 106 are controlled by using the transparent electrode 102 of the transmission region. As a method for controlling a direction that the liquid crystal molecules 106 are inclined, both the slit 105 (the gap, the space, or the like) of the electrode and the call gap adjusting film 103 are used. Therefore, the distance d2 between the boundary portion of the cell gap adjusting film 103 and the transparent electrode 102 may be small, or the distance d2 may be zero. In addition, instead of providing the boundary portion of the cell gap adjusting film 103 between the reflection electrode 101 and the transparent electrode 102, the transparent electrode 102 may be provided between the reflection electrode 101 and the boundary portion of the cell gap adjusting film 103 as shown in FIGS. 4A and 4B. Since both the slit 105 (the gap, the space, or the like) of the electrode and the cell gap adjusting film 103 are used as a method for controlling the direction that the liquid crystal molecules 106 are inclined, the liquid crystal molecules 106 are oriented appropriately without any problems even in the case where the transparent electrode 102 is provided between the reflection electrode 101 and the boundary portion of the cell gap adjusting film 103 as shown in FIGS. 4A and 4B.

Figure 5A:
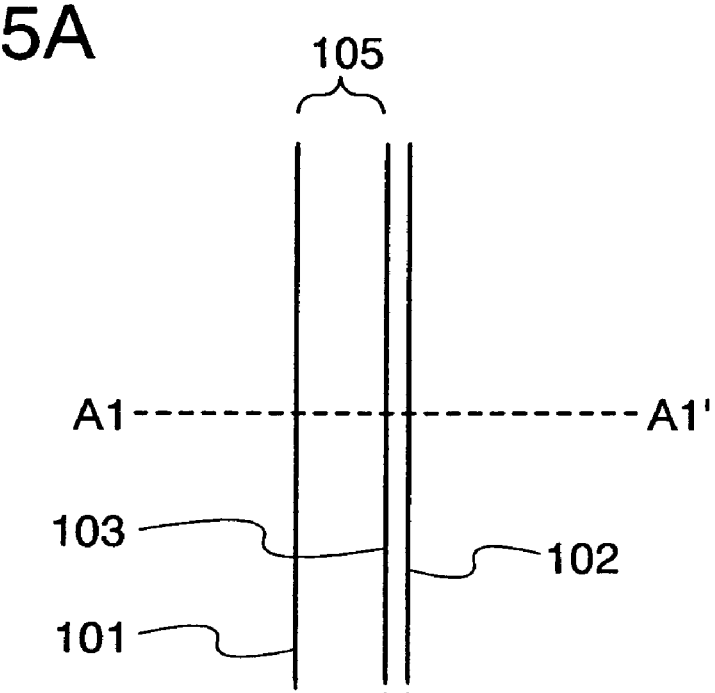
FIGS. 5A and 5B are diagrams showing a structure of a display device of the invention.
Figure 5B:
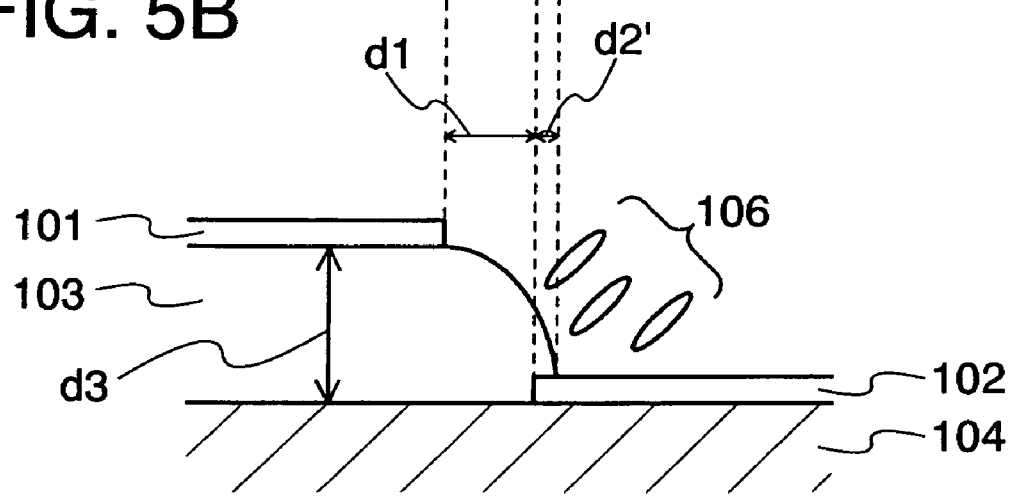

Although FIGS. 4A and 4B are diagrams showing the transparent electrode 102 formed over the cell gap adjusting film 103, a structure is not limited to this. The transparent electrode 102 may be provided below the cell gap adjusting film 103 as shown in FIGS. 5A and 5B. Note that FIGS. 4A and 5A are top plan layout views. FIGS. 4B and 5B are cross sectional views taken a line A1-A1' in FIGS. 4A and 5A, respectively.

A distance d2' between the boundary portion of the cell gap adjusting film 103 and the transparent electrode 102 is preferably smaller than the thickness d3 of the cell gap adjusting film. That is because d2' is included in the reflection region completely when d2' is larger than d3.

The cell gap adjusting film is preferably formed of a material containing an organic material because of need for a certain thickness. The material containing an organic material preferably includes acrylic, polyimide, or polycarbonate, for example. A thickness of the cell gap adjusting film is preferably approximately half the cell gap of the liquid crystal because a distance where light is passed through the liquid crystal portion is preferably the same in the reflection region and the transmission region. Note that it is not required to be the complete half thereof since light often enters obliquely. It is preferably about half the cell gap of the liquid crystal within a range of approximately ±10%. Since the cell gap of the liquid crystal is 3 to 6 μm, the thickness d3 of the cell gap adjusting film is preferably 1.1 to 3.3 μm. However, the thickness of the cell gap adjusting film is not limited to this, and the cell gap adjusting film may have a thickness which can provide a similar effect.

The transparent electrode 102 is preferably formed of a conductive material with high transmissivity because it is required to transmit light. Indium oxide-tin oxide (ITO, Indium Tin Oxide), indium oxide-zinc oxide (IZO), or polysilicon is preferably used, for example. The reflection electrode 101 is preferably formed of a conductive material with high reflectivity because it is required to reflect light. Al, Ti, or Mo is preferably used, for example. The distance d2 between the boundary portion of the cell gap adjusting film 103 and the transparent electrode 102 is preferably 0 to 1.1 μm. The distance d2' between the boundary portion of the cell gap adjusting film 103 and the transparent electrode 102 is preferably 0 to 1.1 μm. The distance d1 between the boundary portion of the cell gap adjusting film 103 and the reflection electrode 101 is preferably 1.1 to 6 μm since most of the reflection electrode 101 is preferably formed over the cell gap adjusting film 103. However, it is not limited to this.

Embodiment Mode 2

This embodiment mode describes an example other than the case where the reflection electrode 101 is formed over the cell gap adjusting film 103 described in Embodiment mode 1.

Figure 6A:
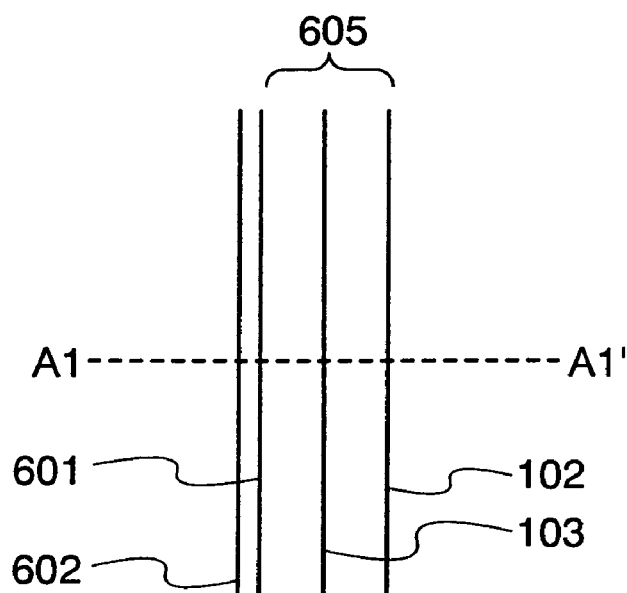
FIGS. 6A and 6B are diagrams showing a structure of a display device of the invention.
Figure 6B:
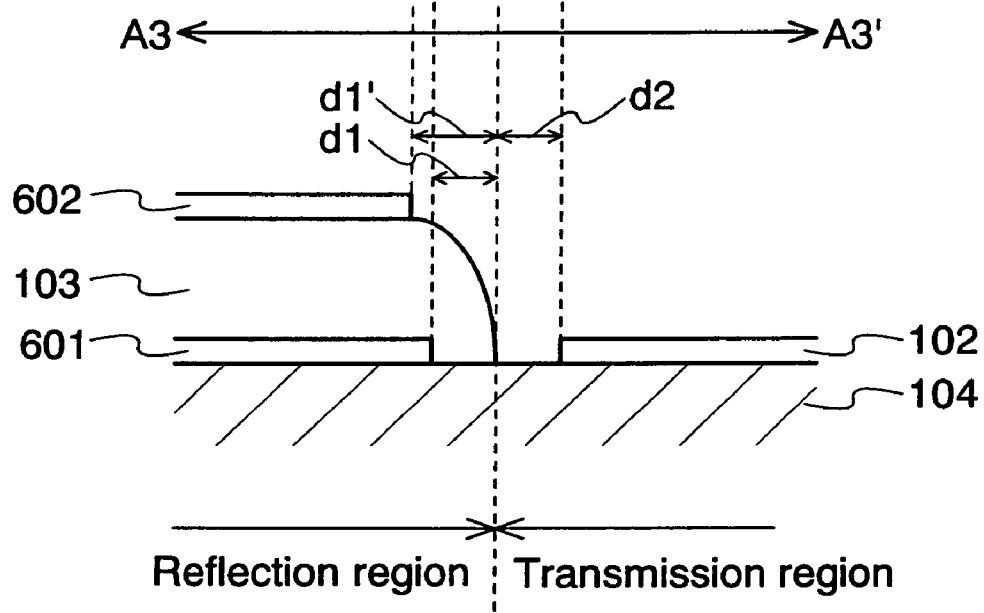

FIG. 6A is a top plan layout view. FIG. 6B is a cross sectional view of FIG. 6A. As shown in FIG. 6A, in the case where a reflection electrode 601, a transparent electrode 602, a transparent electrode 102, a slit 605 (a gap, a space, or the like) of an electrode are provided, the reflection electrode 601, the transparent electrode 602 and the transparent electrode 102 are arranged approximately in parallel, and the slit 605 (the gap, the space, or the like) of the electrode is also arranged in parallel. A cell gap adjusting film (a boundary portion thereof) 103 is arranged approximately in parallel therewith. The boundary portion of the cell gap adjusting film 103 is provided between the reflection electrode 601 and the transparent electrode 102. As shown in FIG. 6B, the reflection electrode 601 is formed over a lower layer 104, over which the cell gap adjusting film 103 is formed. The transparent electrode 602 is formed over the lower layer 104.

Light is reflected by the reflection electrode 601 in a reflection region, therefore light passes through the cell gap adjusting film 103. However, in view of a refractive index, a polarization state of light is not changed because the cell gap adjusting film 103 is made of an isotropic material. Therefore, light is hardly affected even when passing through the cell gap adjusting film 103. A liquid crystal is controlled by using the transparent electrode 602 over the cell gap adjusting film 103.

The transparent electrode 602 and the transparent electrode 102 are preferably electrically connected so as to function as one pixel electrode and to supply an electric field to the liquid crystal. On the other hand, the reflection electrode 601 is not required to be electrically connected to the transparent electrode 602 and the transparent electrode 102 because it is provided for reflecting light. However, in the case where the reflection electrode 601 is used as an electrode for a storage capacitor, the reflection electrode 601 may be electrically connected to the transparent electrode 602 and the transparent electrode 102.

A distance d1' between the boundary portion of the cell gap adjusting film 103 and the transparent electrode 602 is preferably approximately the same as a distance d1 between the boundary portion of the cell gap adjusting film 103 and the reflection electrode 601. Note that it is preferable that the reflection electrode 601 is larger than the transparent electrode 602 which controls liquid crystal molecules because it can reflect more light. The distance d1' between the boundary portion of the cell gap adjusting film 103 and the transparent electrode 602 is preferably larger than the distance d1 between the boundary portion of the cell gap adjusting film 103 and the reflection electrode 601. The distance d1' between the boundary portion of the cell gap adjusting film 103 and the transparent electrode 602 is preferably 1.1 to 7 μm. However, it is not limited to this.

Note that the reflection electrode 601 is not required to be provided over the lower layer 104. The reflection electrode 601 in the reflection region is provided only for reflecting light; therefore, it may be provided in or below the lower layer 104.

In addition, a plurality of the reflection electrodes 601 may be provided. For example, a part of the reflection electrodes 601 may be provided over the lower layer 104, and another part of the reflection electrodes 601 may be provided in the lower layer 104.

The reflection electrode may be used also as an electrode which is used for another purpose. For example, the reflection electrode may be used also as an electrode for forming a storage capacitor.

Note that description in this embodiment mode is the description in Embodiment Mode 1 a part of which is changed. Therefore, the description in Embodiment Mode 1 can be applied to the description in this embodiment mode.

Embodiment Mode 3

Although description is made of the case where the reflection electrode is even in Embodiment Modes 1 and 2, it is not limited to this. When the reflection electrode is uneven, light is diffused; therefore, a whole luminance is averaged and a clear image can be obtained in the case of performing a display of reflecting mode.

Figure 7A:
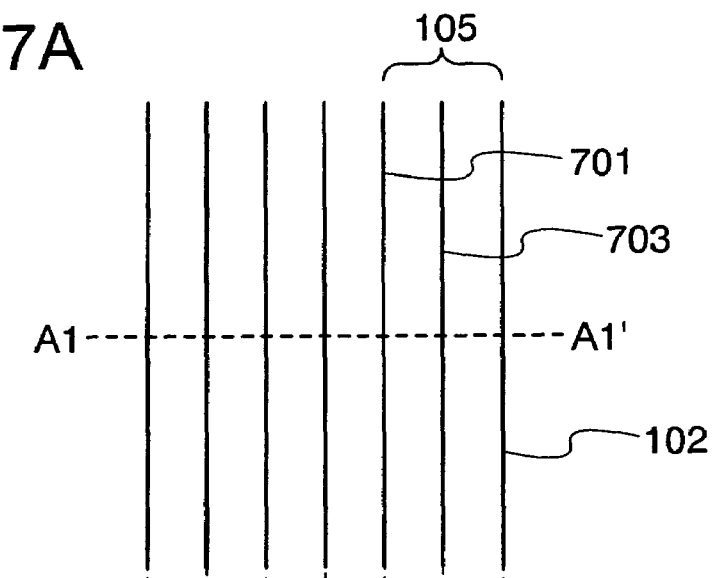
FIGS. 7A and 7B are diagrams showing a structure of a display device of the invention.
Figure 7B:
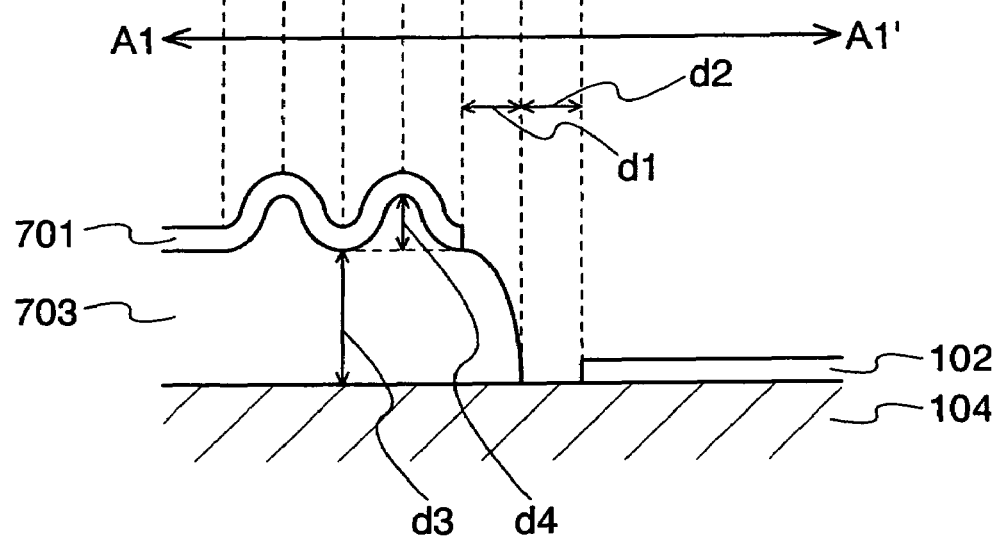

FIGS. 7A and 7B show an example of the case where the reflection electrode has an uneven portion. An upper surface of a cell gap adjusting film 703 has an uneven portion. As a result, a reflection electrode 701 which is formed over the cell gap adjusting film 703 has an uneven portion. Note that it is not preferable that the uneven portion be too large because a large uneven portion affects a direction that the liquid crystal is inclined. Therefore, a thickness d4 of a projecting portion of the cell gap adjusting film 703 is preferably smaller than the thickness d3 of the cell gap adjusting film 703. For example, the thickness d4 of the projecting portion of the cell gap adjusting film 703 is preferably 0.5 μm or less. However, it is not limited to this.

In addition, the projecting portion of the cell gap adjusting film 703 is preferably arranged approximately in parallel with the slit 105 (the gap, the space, or the like) of the electrode, the transparent electrode 102, and the reflection electrode 701 as shown in FIG. 7A. By being arranged approximately in parallel, disorder of orientation of the liquid crystal can be reduced, and light can be diffused.

Figure 8A:
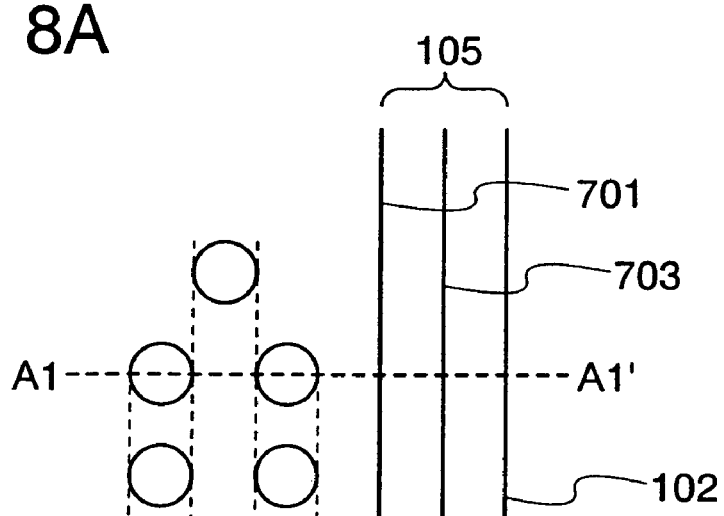
FIGS. 8A and 8B are diagrams showing a structure of a display device of the invention.
Figure 8B:
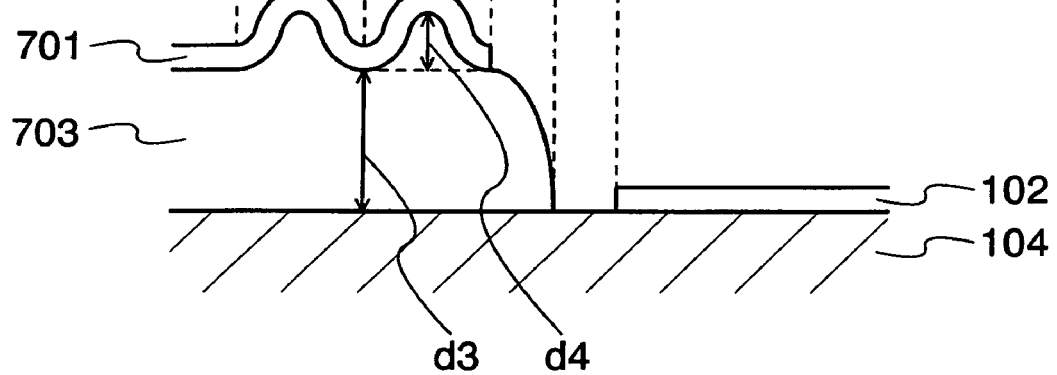

Note that in the case where the thickness d4 of the projecting portion of the cell gap adjusting film 703 is small, the projecting portion of the cell gap adjusting film 703 may be arranged in random as shown in FIG. 8A. FIG. 8B is a cross sectional view taken a line A1-A1' in FIG. 8A.

The cell gap adjusting film 703 may have a stacked-layer structure. For example, the cell gap adjusting film 703 is formed by forming a flat portion, and an uneven portion over the flat portion.

Unevenness may be formed by forming an object over the cell gap adjusting film 703, and forming the reflection electrode 701 thereover. The object is not the cell gap adjusting film 703. For example, an uneven portion may be formed by forming the transparent electrode in accordance with unevenness, and forming the reflection electrode 701 thereover.

As shown in FIGS. 6A and 6B, in the case where the reflection electrode is formed below the cell gap adjusting film, light can be diffused by making a surface of the reflection electrode uneven. This case is shown in FIGS. 9A and 9B. A lower layer 904 is provided with an uneven portion, over which a reflection electrode 901 is formed, over which a cell gap adjusting film 903 is formed. The transparent electrode 602 is formed over the cell gap adjusting film 903. The transparent electrode 602 is flat, so that orientation of the liquid crystal thereover is not disturbed. By using this structure, light can be diffused without disturbing orientation of the liquid crystal molecules.

For example, a thickness d5 of a projecting portion of the lower layer 904 is preferably 1.0 μm or less. Therefore, light can be sufficiently diffused. However, it is not limited to this.

Figure 10A:
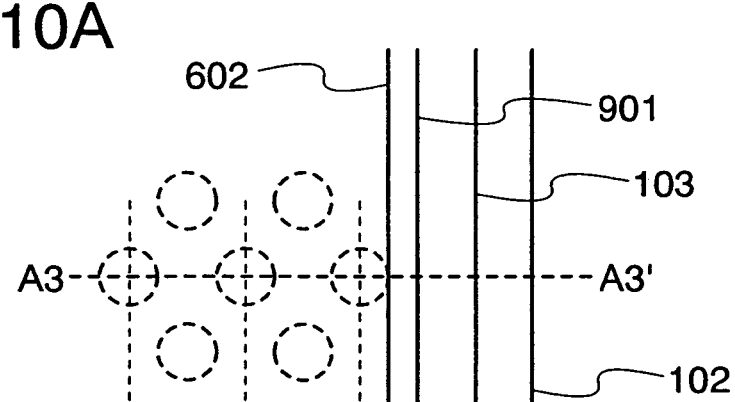
FIG. 10A and 10B are diagrams showing a structure of a display device of the invention.
Figure 10B:
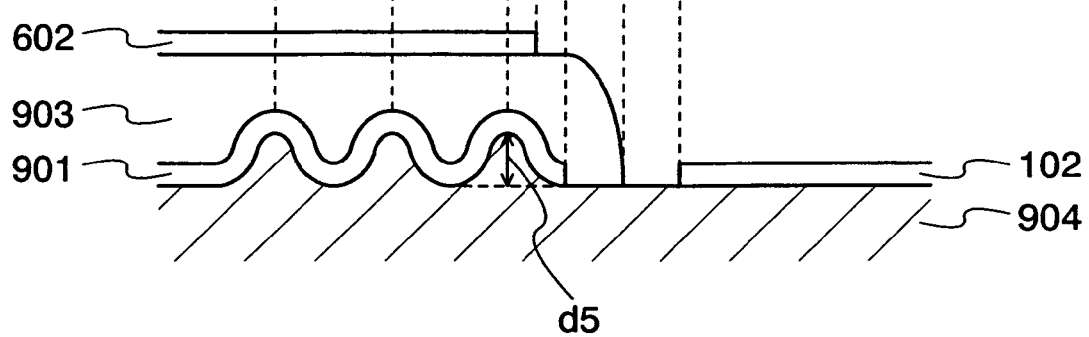

In FIG. 9A, although a projecting portion of the lower layer 904 is arranged approximately in parallel with the slit 605 (the gap, the space, or the like) of the electrode, the transparent electrode 102, the reflection electrode 901, and the transparent electrode 602, it is not limited to this. The projecting portion of the reflection electrode 901 may be arranged in random as shown in FIG. 10A. It is preferable to be arranged in random because a profound effect on light diffusion can be obtained. Note that FIGS. 9B and 10B are cross sectional views taken a line A3-A3' in FIGS. 9A and 10B, respectively.

In the case where the lower layer 904 is provided with the uneven portion as in FIGS. 9A, 9B, 10A, and 10B, the projecting portion may be formed of a material containing an organic material. The material containing an organic material preferably includes acrylic, polyimide, or polycarbonate, for example. Alternatively, a wire, an electrode, or the like may be formed in accordance with the uneven portion, over which an interlayer film may be formed by using a film with poor planarity. For example, a film containing silicon oxide or silicon nitride is provided over a wire or an electrode, thereby the uneven portion of the lower layer 904 may be formed.

Note that description in this embodiment mode is the description in Embodiment Modes 1 and 2 a part of which are changed or improved. Therefore, the description in Embodiment Modes 1 and 2 can be applied to the description in this embodiment mode.

Embodiment Mode 4

The boundary portion between the reflection region and the transmission region is described in the aforementioned embodiment modes. In this embodiment mode, each of the reflection region and the transmission region and the like are also described.

FIG. 11A is a top plan layout view. FIG. 11B is a cross sectional view taken along lines A4-A4' and A5-A5' in FIG. 11A. As shown in FIGS. 11A and 11B, a slit (a gap, a space, or the like) of an electrode is formed in the reflection region and the transmission region. When a slit 1105a (a gap, a space, or the like) of an electrode in the reflection region is compared with a slit 1105b (a gap, a space, or the like) of an electrode in the transmission region, a width d6 of the slit 1105a (the gap, the space, or the like) of the electrode in the reflection region is preferably larger than a width d7 of the slit 1105b (the gap, the space, or the like) of the electrode in the transmission region. As shown in FIG. 11B, liquid crystal molecules 1106a and 1106b are controlled by using the slit 1105a (the gap, the space, or the like) of the electrode in the reflection region, while liquid crystal molecules 1106c and 1106d are controlled by using the slit 1105b (the gap, the space, or the like) of the electrode in the transmission region. In this case, in the reflection region, a cell gap of the liquid crystal is smaller than that in the transmission region because of having the cell gap adjusting film 103; therefore, distortion of the electric field is not enough unless the slit 1105a (the gap, the space, or the like) of the electrode is made to be large. In addition, an electrode on an opposite side across the liquid crystal molecules is provided with an orientation film, thereby orientation of the liquid crystal molecules is controlled. When the cell gap of the liquid crystal is small, it becomes difficult to move the liquid crystal molecules by supplying the electric field because an effect of the orientation film of an electrode of an opposite side is large. For the aforementioned reasons, the width d6 of the slit 1105a (the gap, the space, or the like) of the electrode in the reflection region is preferably larger than the width d7 of the slit 1105b (the gap, the space, or the like) of the electrode in the transmission region.

As shown in FIGS. 12A and 12B, when a width d8 of a slit 1205a (a gap, a space, or the like) of an electrode in the boundary portion between the reflection region and the transmission region is compared with the width d7 of the slit 1105b (the gap, the space, or the like) of the electrode in the transmission region, the width d8 is preferably larger than the width d7. This is because the width d8 includes a function of controlling the liquid crystal in the reflection region. The width d8 is required to be large in order to control the liquid crystal sufficiently. Note that FIG. 12A is a top plan layout view. FIG. 12B is a cross sectional view taken a line A6-A6' in FIG. 12A.

Figure 13A:
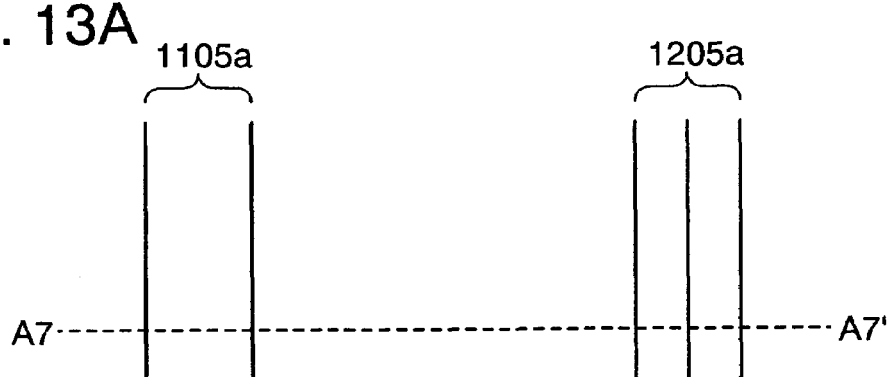
FIGS. 13A and 13B are diagrams showing a structure of a display device of the invention.
Figure 13B:
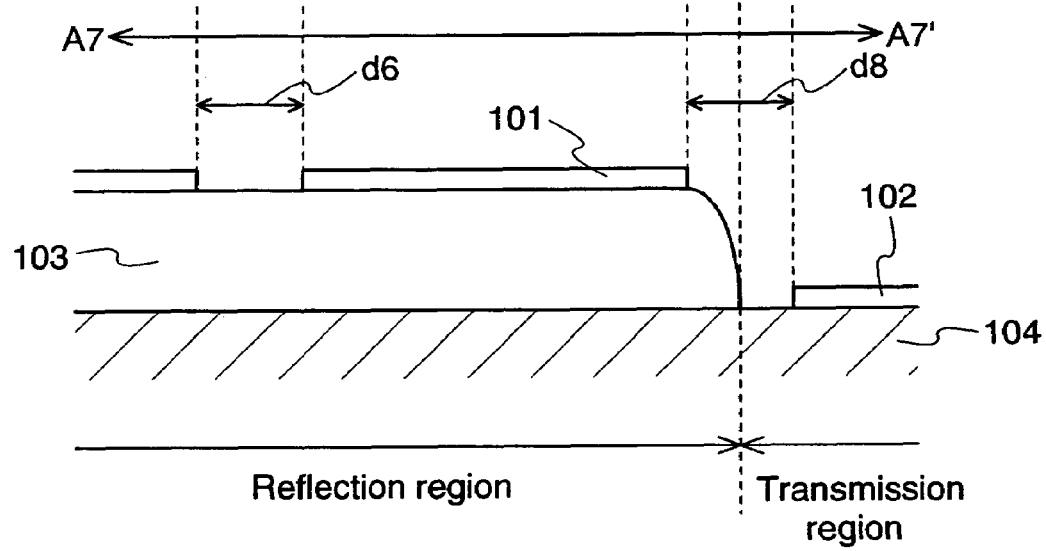

As shown in FIGS. 13A and 13B, when the width d8 of the slit 1205a (the gap, the space, or the like) of the electrode in the boundary portion between the reflection region and the transmission region is compared with the width d6 of the slit 1105a (the gap, the space, or the like) of the electrode in the transmission region, the width d8 is preferably almost equal to the width d6. This is because both of the widths include control of the liquid crystal in the reflection region. Note that FIG. 13A is a top plan layout view. FIG. 13B is a cross sectional view taken a line A7-A7' in FIG. 13A.

For example, the width d8 of the slit 1205a (the gap, the space, or the like) of the electrode in the boundary portion between the reflection region and the transmission region is preferably 1.1 to 10.0 µm. The width d6 of the slit 1105a (the gap, the space, or the like) of the electrode in the reflection region is preferably 1.1 to 10.0 µm. The width d7 of the slit 1105b (the gap, the space, or the like) of the electrode in the transmission region is preferably 1.0 to 9.0 µm. However, they are not limited to these.

Note that description in this embodiment mode is the description in Embodiment Modes 1 to 3 a part of which are changed, improved or detailed. Therefore, the description in Embodiment Modes 1 to 3 can be applied to the description in this embodiment mode.

Embodiment Mode 5

The liquid crystal molecules 106 described in FIGS. 1A and 1B are inclined in one direction. However, in the case where the liquid crystal molecules in one pixel are inclined only in one direction, a viewing angle is narrow. That is, the way the liquid crystal looks is changed when seen from a certain direction because the direction that the liquid crystal molecules are inclined looks different depending on a viewpoint.

The liquid crystal molecules are not preferably inclined in only one direction, but they are preferably inclined in various directions. That is, it is preferable to employ a multi-domain structure and have a plurality of regions so as to provide a plurality of directions that the liquid crystal molecules are inclined. For example, in the case where the liquid crystal is inclined in a certain direction, a region where the liquid crystal is inclined in an opposite direction is preferably formed.

A projection (a protruding portion) or a slit (a gap, a space, or the like) can be provided on an electrode portion so that the liquid crystal is inclined in the opposite direction.

Figure 14A:
FIGS. 14A and 14B are diagrams showing a structure of a display device of the invention.
Figure 14B:
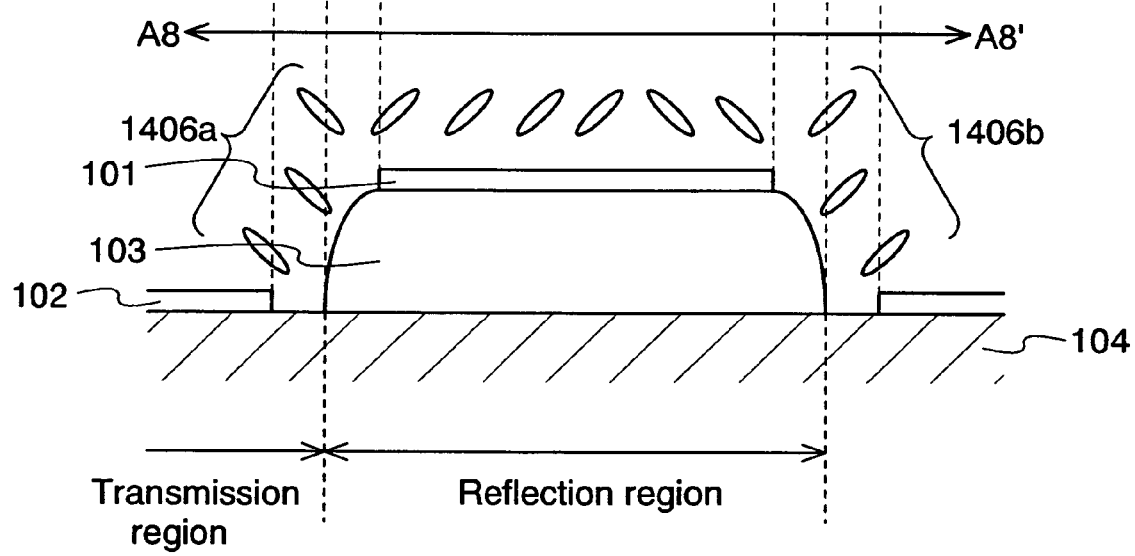

FIGS. 14A and 14B are configuration diagrams in the case where the liquid crystal is inclined in right side and in the case where the liquid crystal is inclined in left side in portions adjacent to the cell gap adjusting film 103. Note that FIG. 14A is a top plan layout view. FIG. 14B is a cross sectional view taken a line A8-A8' in FIG. 14A. By providing slits 1405a and 1405b (a gap, a space, or the like) of an electrode in parallel on both sides of the reflection electrode 101, each liquid crystal molecules are inclined in opposite directions each other like the liquid crystal molecules 1406a and 1406b. Consequently, the ways the liquid crystal molecules look can be averaged; therefore, a viewing angle can be increased.

Figure 15A:
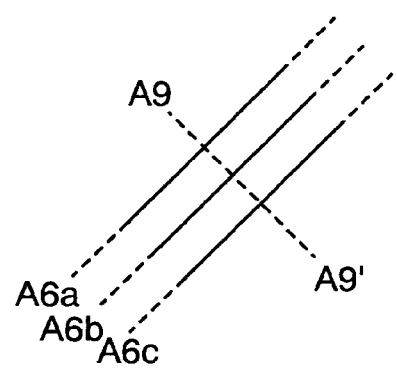
FIGS. 15A to 15D are diagrams showing a structure of a display device of the invention.
Figure 15B:
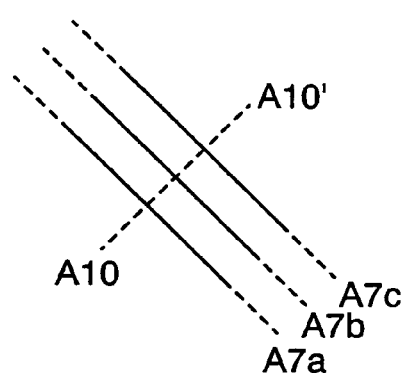
Figure 15C:
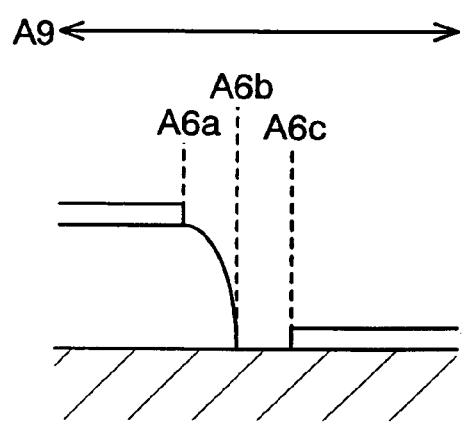
Figure 15D:
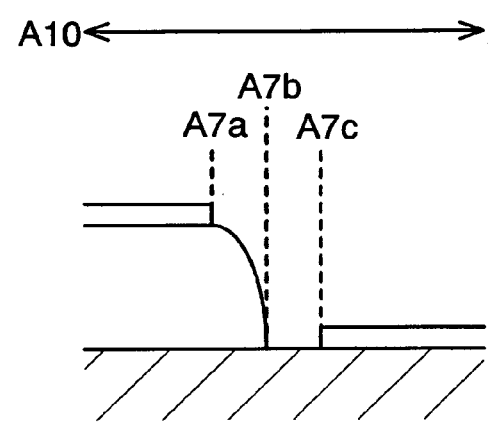

Note that in FIGS. 14A and 14B, although a plane on which the liquid crystal is inclined is on the same plane as A8-A8', it is not limited to this. As shown in FIGS. 15A, 15B, 15C and 15D, a cross section A9-A9' and a cross section A10-A10' may be arranged perpendicular to each other, which can increase a viewing angle. Note that FIGS. 15A and 15B are top plan layout views. FIG. 15C is a cross sectional view taken a line A9-A9' in FIG. 15A. FIG. 15D is a cross sectional view taken a line A10-A10' in FIG. 15C.

In addition, FIGS. 15A, 15B, 15C and 15D and FIGS. 14A and 14B may be combined. That is, the liquid crystal molecules may be set to move on different planes like the cross section A9-A9' and the cross section A10-A10', and the liquid crystal molecules on the same plane may be set to be inclined in various directions like a cross section A8-A8'.

In the case where the liquid crystal molecules are inclined and in a radial pattern from one point as a flower blooms, a region in which most of the liquid crystal molecules inclined to various directions is made at a boundary with another adjacent region; therefore, disorder of orientation of the liquid crystal molecules may occur. However, in the invention, the liquid crystal is aligned in a region extended in parallel; therefore, disorder of orientation of the liquid crystal molecules hardly occurs.

Note that description in this embodiment mode is the description in Embodiment Modes 1 to 4 a part of which are changed, improved or detailed. Therefore, the description in Embodiment Modes 1 to 4 can be applied to the description in this embodiment mode.

Embodiment Mode 6

An electrode on one side is described in the aforementioned embodiment modes. Actually, an electrode and a substrate are provided on an opposite side, across the liquid crystal. A projection on an electrode portion, a slit (a gap, a space, or the like) of an electrode, and the like are required to be provided on this opposite substrate in order that the liquid crystal molecules are easily inclined.

Figures 16A, 16B:
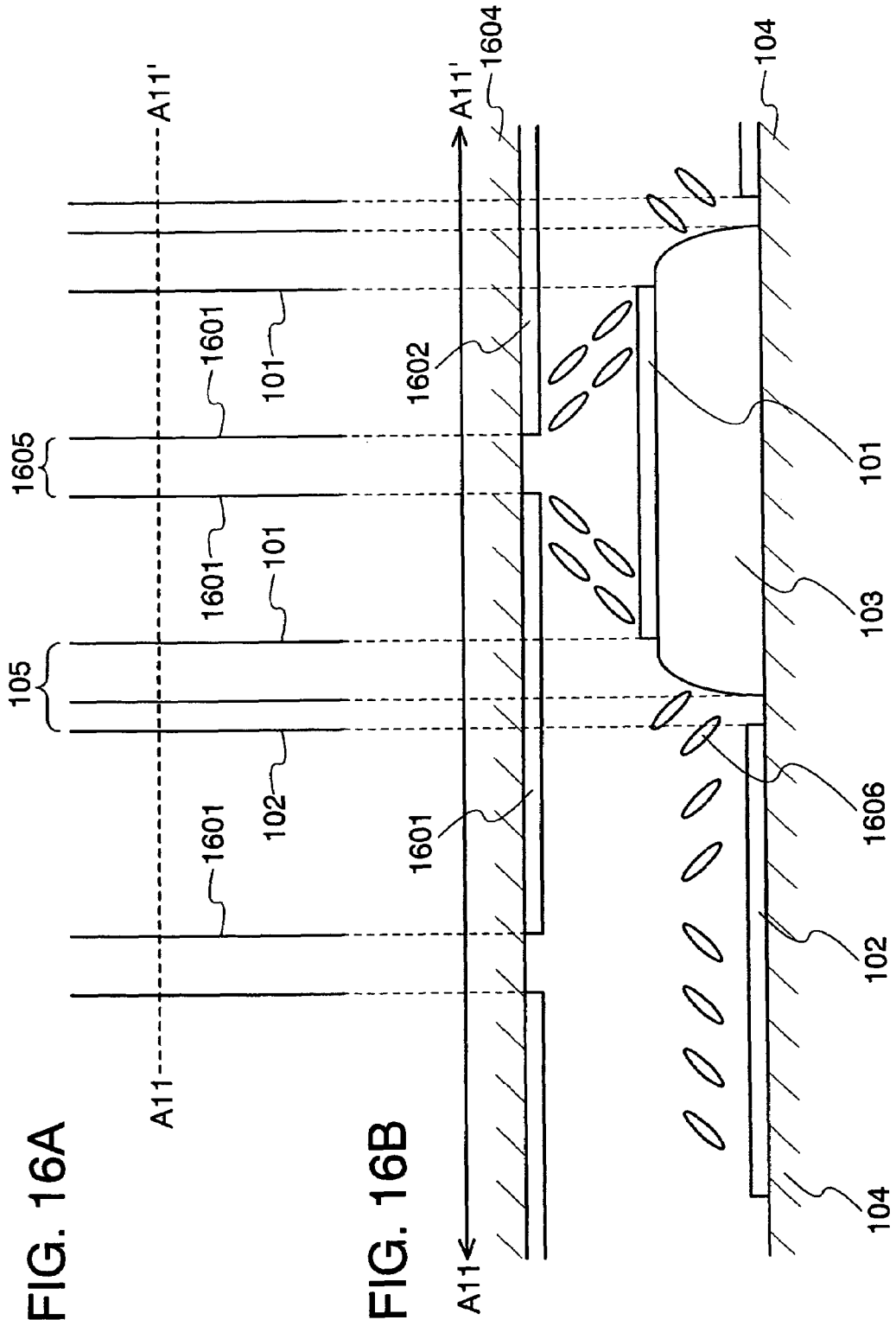
FIGS. 16A and 16B are diagrams showing a structure of a display device of the invention.

FIGS. 16A and 16B show an example in which a slit 1605 (a gap, a space, or the like) of an electrode is provided over an opposite substrate 1604. FIG. 16A is a top plan layout view. FIG. 16B is a cross sectional view taken a line A11-A11' in FIG. 16A. As shown in FIG. 16B, transparent electrodes 1601 and 1602 and the like are provided over the opposite substrate 1604, which is not required to reflect light. The slit 1605 (the gap, the space, or the like) of the electrode on the opposite substrate 1604 is preferably arranged approximately in the middle of the reflection electrode 101 and the transparent electrodes. Therefore, liquid crystal molecules 1606 which are inclined in each direction are arranged evenly.

In addition, as shown in FIG. 16A that is a plan view, the slit 1605 (the gap, the space, or the like) of the electrode on the opposite substrate 1604 and the transparent electrodes 1601 and 1602 on the opposite substrate are arranged approximately in parallel with the slit 105 (the gap, the space, or the like) of the electrode, the transparent electrode 102, and the reflection electrode 101. Therefore, disorder of orientation of the liquid crystal can be reduced because the direction that the liquid crystal is inclined can be controlled appropriately by both substrates between which the liquid crystal is sandwiched.

Figures 17A, 17B:
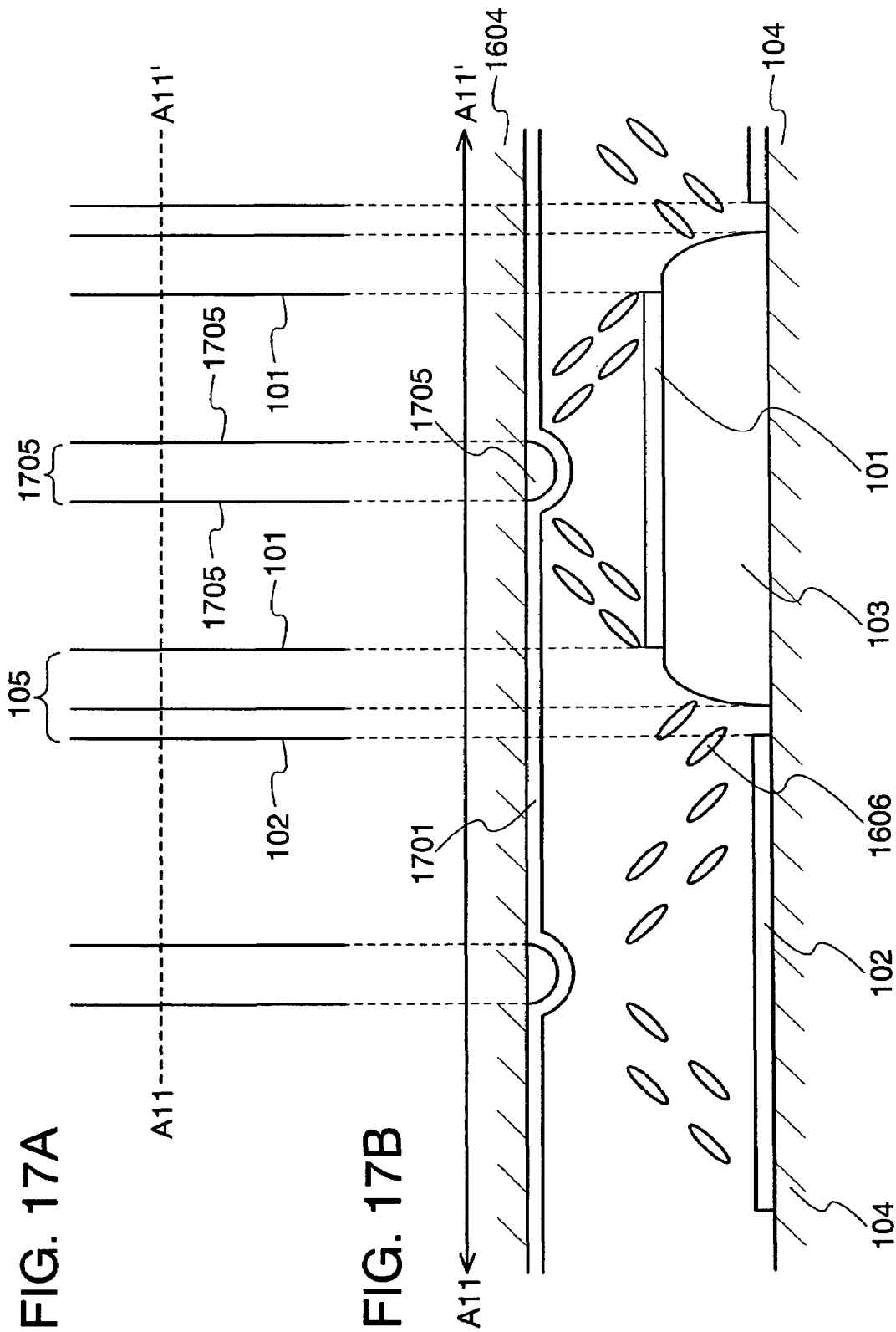
FIGS. 17A and 17B are diagrams showing a structure of a display device of the invention.

Next, FIGS. 17A and 17B show the case where a projection 1705 is provided on the opposite substrate 1604. FIG. 17A is a top plan layout view. FIG. 17B is a cross sectional view taken a line A11-A11' in FIG. 17A. As shown in FIG. 17B that is a cross sectional view, a transparent electrode 1701 is provided to cover the projection 1705. However, it is not limited to this. The transparent electrode may be provided between the projection 1705 and the opposite substrate 1604. An orientation film is provided at a portion in contact with the liquid crystal molecules. Therefore, in the case of FIG. 17B, the orientation film is provided to cover the transparent electrode 1701. The projection 1705 on the opposite substrate 1604 is preferably arranged approximately in the middle of the reflection electrode 101 and the transparent electrodes. Therefore, liquid crystal molecules 1706 which are inclined in each direction are arranged evenly.

In addition, as shown in FIG. 17A that is a plan view, the projection 1705 over the opposite substrate 1604 is arranged approximately in parallel with the slit 105 (the gap, the space, or the like) of the electrode, the transparent electrode 102, and the reflection electrode 101. Therefore, disorder of orientation of the liquid crystal can be reduced because the direction that the liquid crystal is inclined can be controlled appropriately by both substrates between which the liquid crystal is sandwiched.

Figure 18:
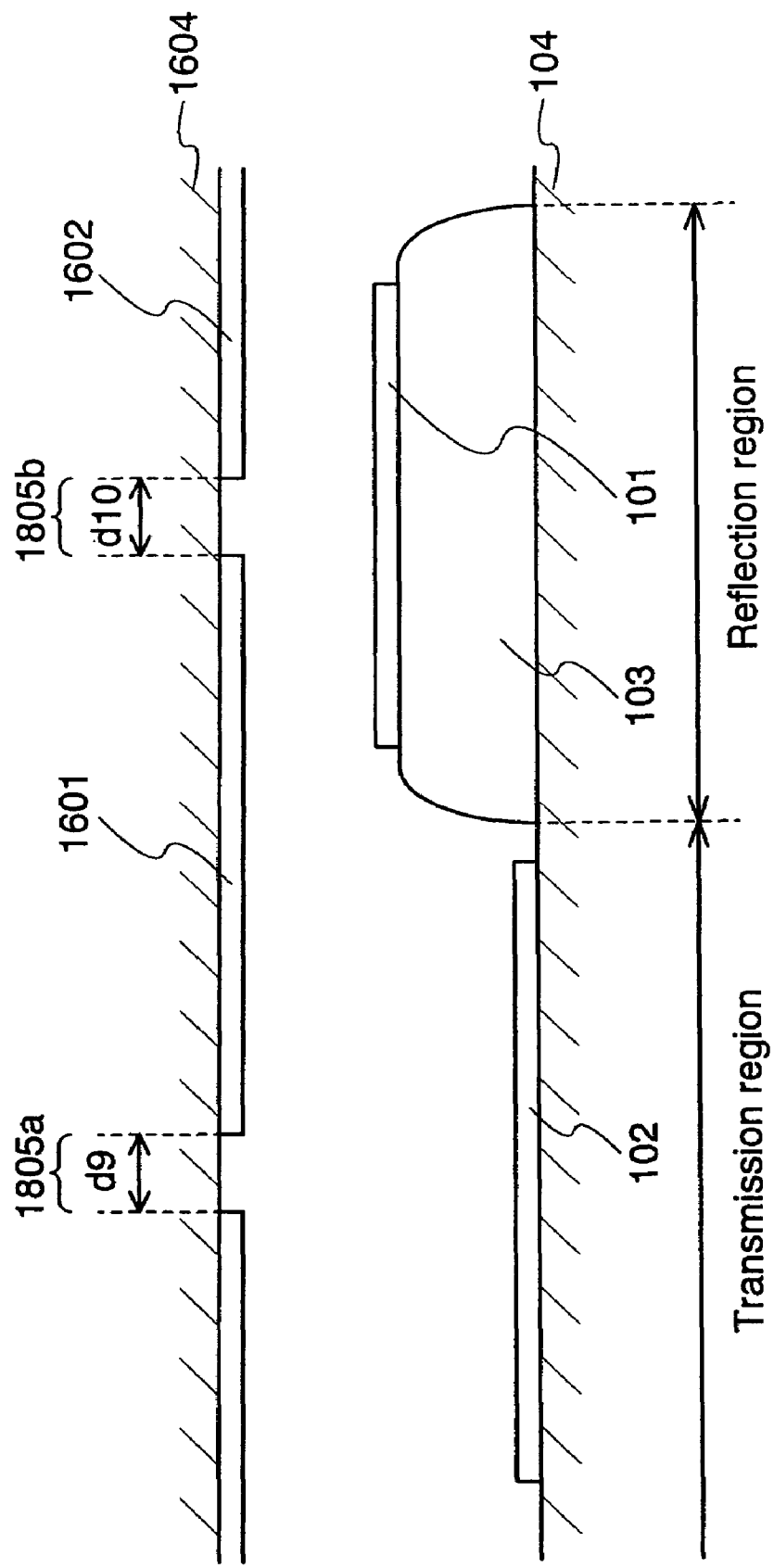
FIG. 18 is a diagram showing a structure of a display device of the invention.

Next, description is made of a width of the slit (the gap, the space, or the like) of the electrode with reference to a cross sectional view shown in FIG. 18. In FIG. 18, when a width d10 of a slit 1805b (a gap, a space, or the like) of the transparent electrode on the opposite substrate 1604 in the reflection region is compared with a width d9 of a slit 1805a (a gap, a space, or the like) of the transparent electrode on the opposite substrate 1604 in the transmission region, the width d9 is preferably smaller than the width d10. The relation between the width d9 and the width d10 is similar to the relation between the width d6 of the slit 1105a (the gap, the space, or the like) of the electrode in the reflection region and the width d7 of the slit 1105b (the gap, the space, or the like) of the electrode in the transmission region.

A cell gap of the liquid crystal in the reflection region is smaller than that in the transmission region because of having the cell gap adjusting film 103; therefore, distortion of the electric field is not enough unless the slit 1805b (the gap, the space, or the like) of the electrode is made to be large. Consequently, the width d10 of the slit 1805b (the gap, the space, or the like) of the electrode in the reflection region is preferably larger than the width d9 of the slit 1805a (the gap, the space, or the like) of the electrode in the transmission region.

In addition, the width d6 of the slit 1105a (the gap, the space, or the like) of the electrode in the reflection region shown in FIGS. 13A and 13B is preferably approximately equal to the width d10 of the slit 1805b (the gap, the space, or the like) of the electrode on the opposite substrate 1604 in the reflection region shown in FIG. 18. This is because if the width d6 and the width d10 are the same, a symmetry property is improved and the liquid crystal is arranged evenly; therefore, an orientation defect of the liquid crystal can be reduced.

Similarly, the width d7 of the slit 1205b (the gap, the space, or the like) of the electrode in the transmission region shown in FIGS. 12A and 12B is preferably approximately equal to the width d9 of the slit 1805a (the gap, the space, or the like) of the electrode in the transmission region shown in FIG. 18. This is because if the width d6 and the width d9 are the same, a symmetry property is improved and the liquid crystal is arranged evenly; therefore, an orientation defect of the liquid crystal can be reduced.

Figure 19:
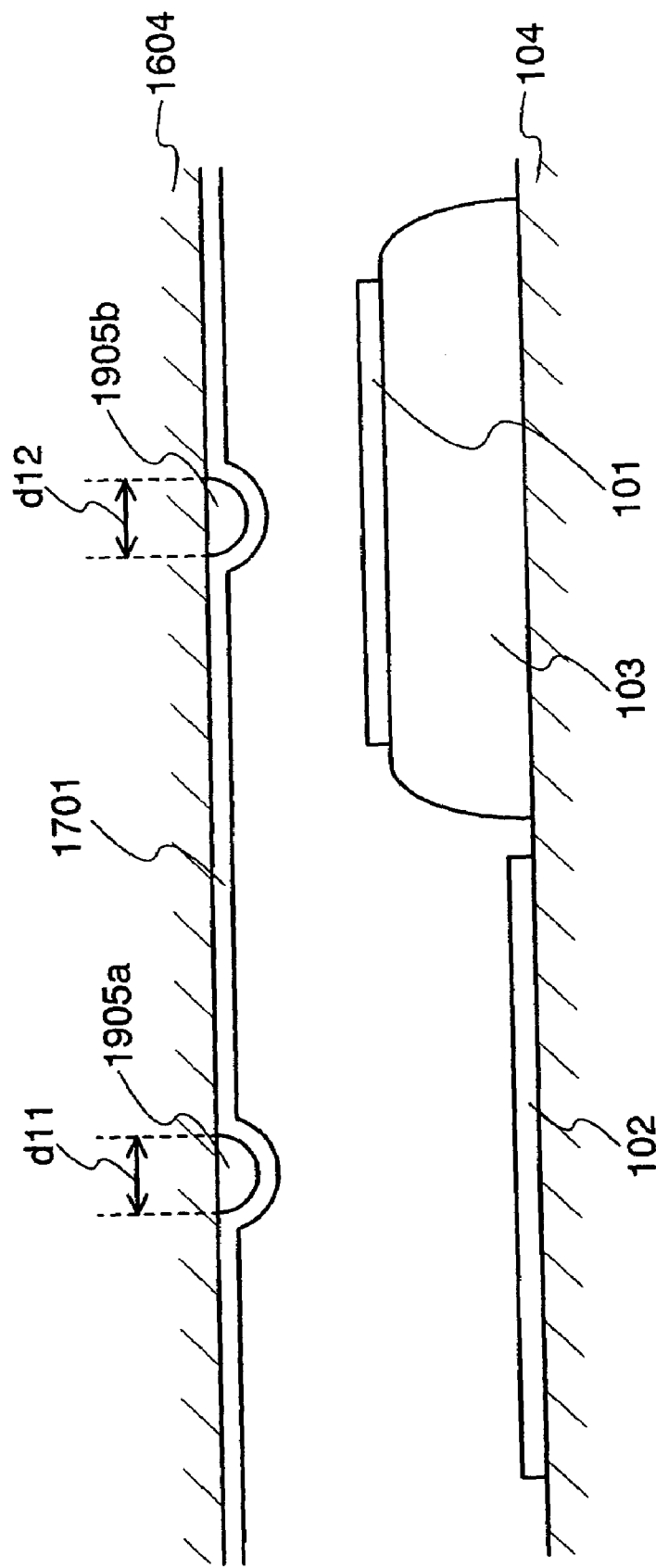
FIG. 19 is a diagram showing a structure of a display device of the invention.

Next, description is made of a width of a projection of an electrode portion with reference to a cross sectional view shown in FIG. 19. In FIG. 19, when a width d12 of a projection 1905b on the opposite substrate 1604 in the reflection region is compared with a width d11 of a projection 1905a on the opposite substrate 1604 in the transmission region, the width d11 is preferably smaller than the width d12. The relation between the width d11 and the width d12 is similar to the relation between the width d6 of the slit 1105a (the gap, the space, or the like) of the electrode in the reflection region and the width d7 of the slit 1105b (the gap, the space, or the like) of the electrode in the transmission region.

A cell gap of the liquid crystal in the reflection region is smaller than that in the transmission region because of having the cell gap adjusting film 103; therefore, distortion of the electric field is not enough unless the projection 1905b is made to be larger. Consequently, the width d12 of the projection 1905b in the reflection region is preferably larger than the width d11 of the projection 1905a in the transmission region.

In addition, the width d6 of the slit 1105a (the gap, the space, or the like) of the electrode in the reflection region shown in FIGS. 13A and 13B is preferably approximately the same as the width d12 of the projection 1905b on the opposite substrate 1604 in the reflection region. This is because if the width d6 and the width d12 are the same, a symmetry property is improved and the liquid crystal is arranged evenly; therefore, an orientation defect of the liquid crystal can be reduced.

Similarly, the width d7 of the slit 1205b (the gap, the space, or the like) of the electrode in the reflection region shown in FIGS. 12A and 12B is preferably approximately equal to the width d11 of the projection 1905a on the opposite substrate 1604 in the transmission region shown in FIG. 18. This is because if the width d7 and the width d11 are the same, a symmetry property is improved and the liquid crystal is arranged evenly; therefore, an orientation defect of the liquid crystal can be reduced.

In addition, the opposite substrate 1604 may have unevenness. Light is reflected diffusely by the unevenness; therefore, whole luminance is averaged and a clear image can be obtained. That is, a liquid crystal display device with certain brightness can be obtained when seen from any direction. As a result, light reaches a viewer of a display well, and luminance is increased substantially.

In addition, the opposite substrate 1604 is provided with the cell gap adjusting film. A film thickness can be adjusted easily by providing the cell gap adjusting films on both sides between which the liquid crystal is sandwiched in order to make a thickness of the cell gap adjusting film thicker. Note that the cell gap adjusting film which is provided over the opposite substrate 1604 can have unevenness as shown in Embodiment Mode 3.

Note that description in this embodiment mode can commonly used for the description in Embodiment Modes 1 to 5. Therefore, the description in Embodiment Modes 1 to 5 can be combined with the description in this embodiment mode.

Embodiment Mode 7

Figure 20:
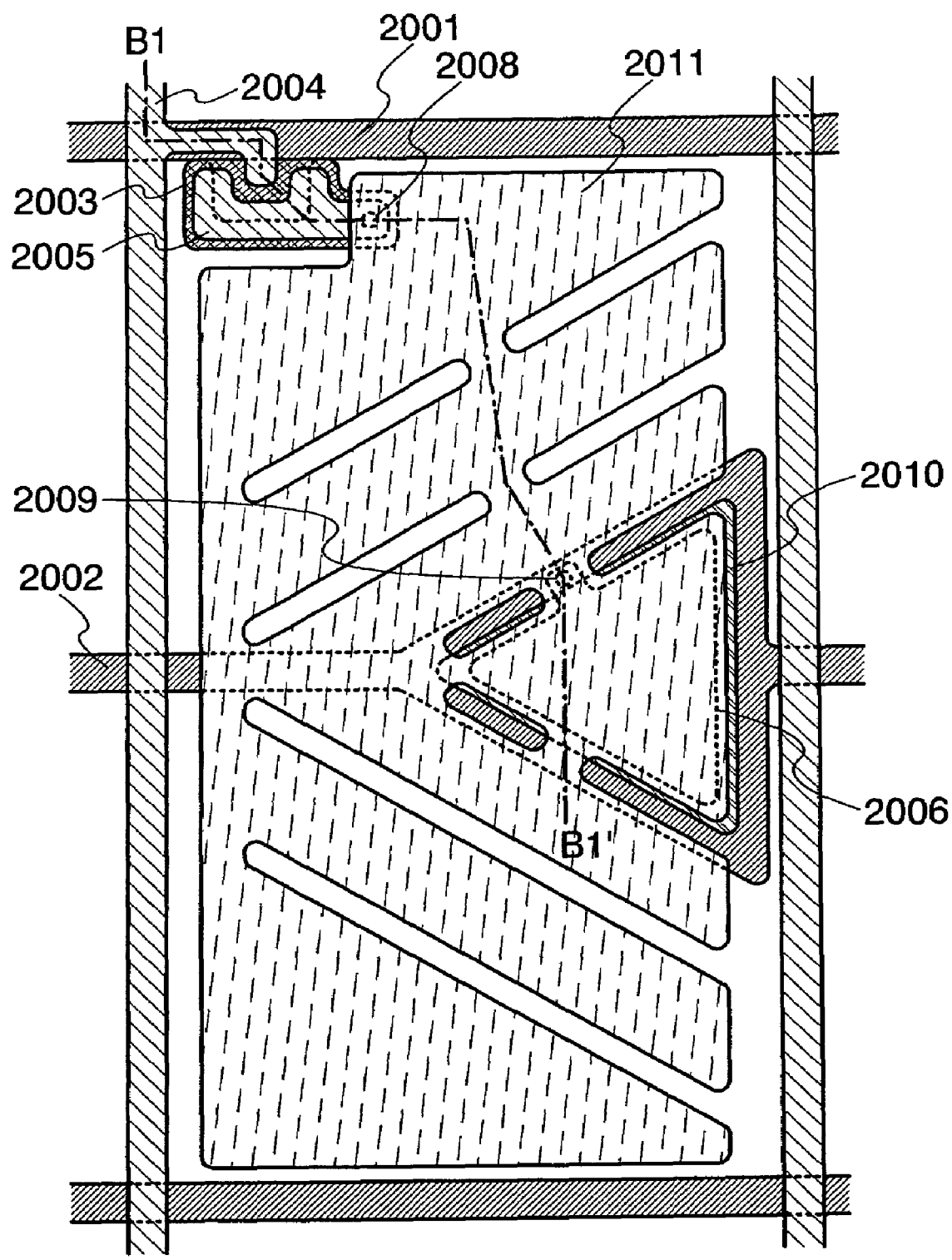
FIG. 20 is a plan layout view showing a display device of the invention.

FIG. 20 shows a top plan layout view in the case where a transistor and various wires are provided over the above-described lower layer 104. Note that FIG. 20 shows the case where a bottom gate transistor is employed as a transistor. A gate signal line 2001 and a capacitor line 2002 which are formed of the same material in the same layer are provided in a lateral direction. A part of the gate signal line 2001 functions as a gate electrode of the transistor. A part of the capacitor line 2002 functions as an electrode of a storage capacitor. A gate insulating film is formed to cover a whole area. Note that the gate insulating film is not shown in FIG. 20 because FIG. 20 is a plan layout view.

Silicon 2003 is formed over the gate insulating film. This portion functions as a transistor, over which a source signal line 2004, a drain electrode 2005 and a reflection electrode 2006 which are formed of the same material in the same layer are provided. A storage capacitor is formed between the reflection electrode 2006 and the capacitor line 2002. Note that as an electrode of the storage capacitor, a pixel electrode 2007 may be employed instead of the reflection electrode 2006. An interlayer insulating film is formed to cover a whole area over the source signal line 2004, the drain signal line 2005 and the reflection electrode 2006. The interlayer insulating film is not described in FIG. 20 because FIG. 20 is a top plan layout view. Contact holes 2008 and 2009 are provided in the interlayer insulating film. A cell gap adjusting film 2010 is formed over the interlayer insulating film in the reflection region, over which a transparent conductive film 2011 is formed.

In the layout view shown in FIG. 20, the cell gap adjusting film 2010 is formed over the reflection electrode 2006; therefore, the case of FIGS. 6A and 6B is used here. In addition, the storage capacitor is provided in the reflection region; therefore, an area of the transmission region can be made large.

As shown in the layout view of FIG. 20, a region where a slit (a gap, a space, or the like) of an electrode and a boundary of the cell gap adjusting film 2010 are provided in parallel is formed; therefore, orientation of the liquid crystal is performed appropriately. In addition, a region where the transparent conductive film 2011 and the boundary of the cell gap adjusting film 2010 are provided in parallel is formed; therefore, orientation of the liquid crystal is performed appropriately.

The cell gap adjusting film 2010, the electrode, the slit, and the like are provided similarly to those shown in FIGS. 14A, 14B, 15A, 15B, 15C and 15D; therefore, a viewing angle can be increased.

Figure 21:
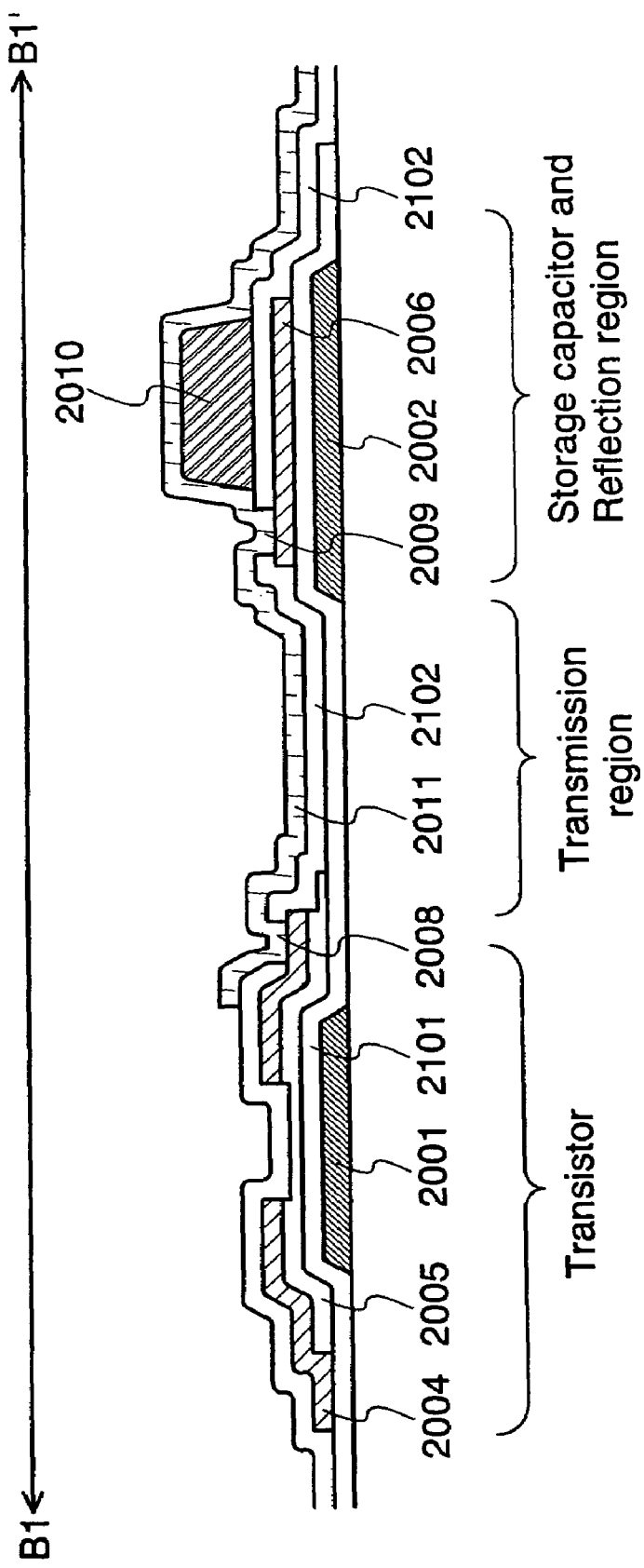
FIG. 21 is a cross sectional view showing a display device of the invention.

FIG. 21 shows a cross sectional view taken a line B1-B1' in FIG. 20. The storage capacitor is provided in the reflection region as shown in FIG. 21. Two electrodes of the storage capacitor are used also as the reflection electrode. Note that the gate insulating film and the interlayer insulating film, which are not shown in FIG. 20, are described as a gate insulating film 2101 and an interlayer insulating film 2102 in FIG. 21.

Figure 22:
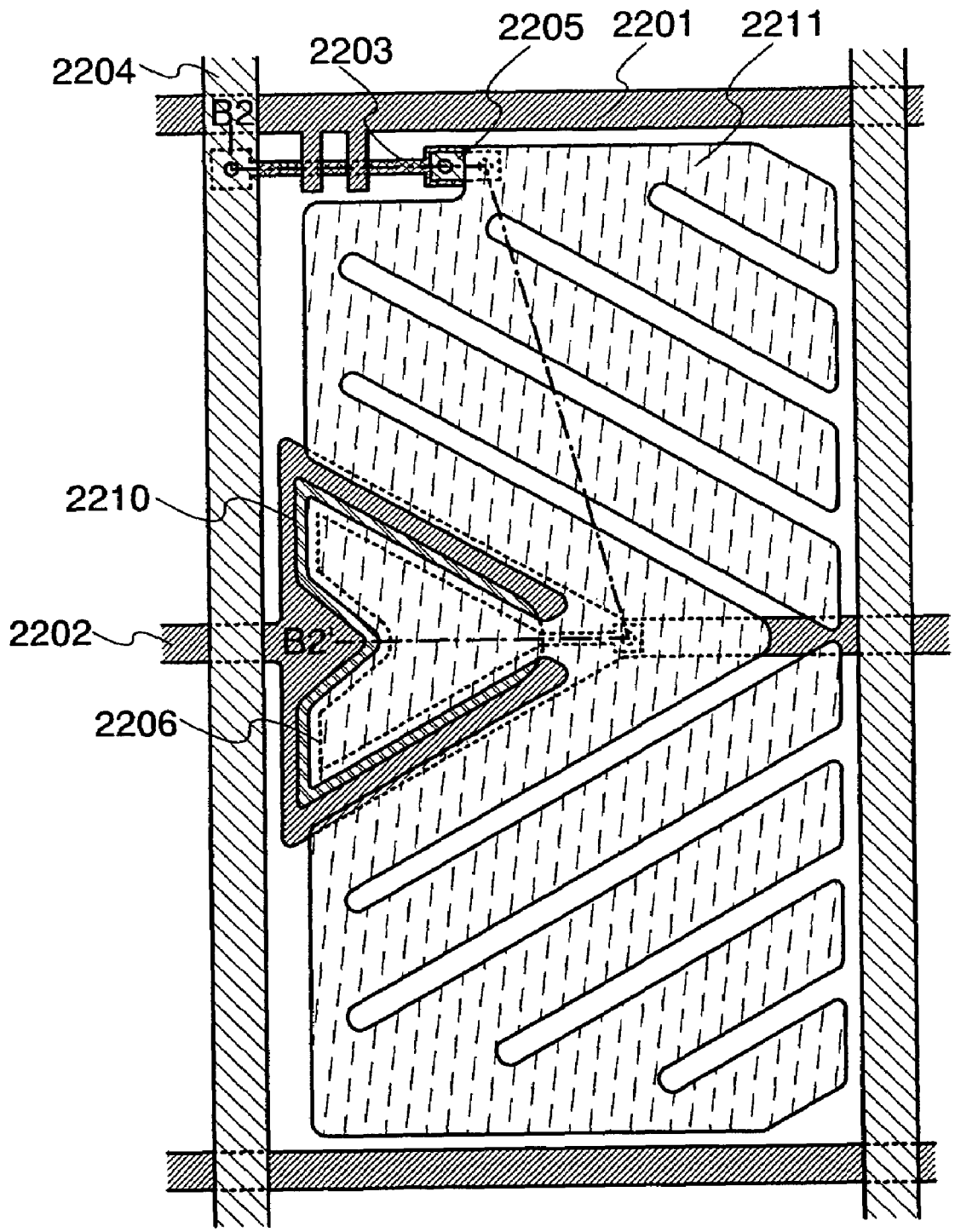
FIG. 22 is a plan layout view showing a display device of the invention.

Next, FIG. 22 shows a layout view in the case of a top gate transistor. Silicon 2203 is provided, over which a gate insulating film 2301 is formed to cover a whole area. The gate insulating film 2301 is not described in FIG. 22 because FIG. 22 is a top plan layout view. A gate signal line 2201 and a capacitor line 2202 which are formed of the same material in the same layer are provided in a lateral direction over the gate insulating film 2301. A part of the gate signal line 2201 which is formed over the silicon 2203 functions as a gate electrode of the transistor. A part of the capacitor line 2202 functions as an electrode of the storage capacitor. An interlayer insulating film 2302 is formed thereover to cover a whole area. The interlayer insulating film 2302 is not described in FIG. 22 because FIG. 22 is a plan layout view. A source signal line 2204, a drain signal line 2205 and a reflection electrode 2206 which are formed of the same material in the same layer are formed over the interlayer insulating film 2302. The storage capacitor is formed between the reflection electrode 2206 and the capacitor line 2202. Note that as the electrode of the storage capacitor, an electrode in the same layer as the silicon 2203 may be used, and the storage capacitor may be formed between the electrode and the capacitor line 2002. An interlayer insulating film 2303 is formed thereover to cover a whole area. The interlayer insulating film 2303 is not described in FIG. 22 because FIG. 22 is a top plan layout view. A cell gap adjusting film 2210 is formed over the interlayer insulating film 2303 in the reflection region, over which a transparent conductive film 2211 is formed.

In the layout view shown in FIG. 22, the cell gap adjusting film 2210 is formed over the reflection electrode 2206; therefore, the case of FIG. 6A and 6B is used here.

In addition, the storage capacitor is provided in the reflection region; therefore, an area of the transmission region can be made large. As shown in this layout view, a region where a slit (a gap, a space, or the like) of an electrode and a boundary of the cell gap adjusting film 2210 are provided in parallel is provided; therefore, orientation of the liquid crystal is performed appropriately. In addition, a region where the transparent conductive film 2211 and the boundary of the cell gap adjusting film 2210 are provided in parallel is provided; therefore, orientation of the liquid crystal is performed appropriately.

The cell gap adjusting film, the electrode, the slit, and the like are provided similarly to those shown in FIGS. 14A, 14B, 15A, 15B, 15C and 15D; therefore, a viewing angle can be increased.

Figure 23:
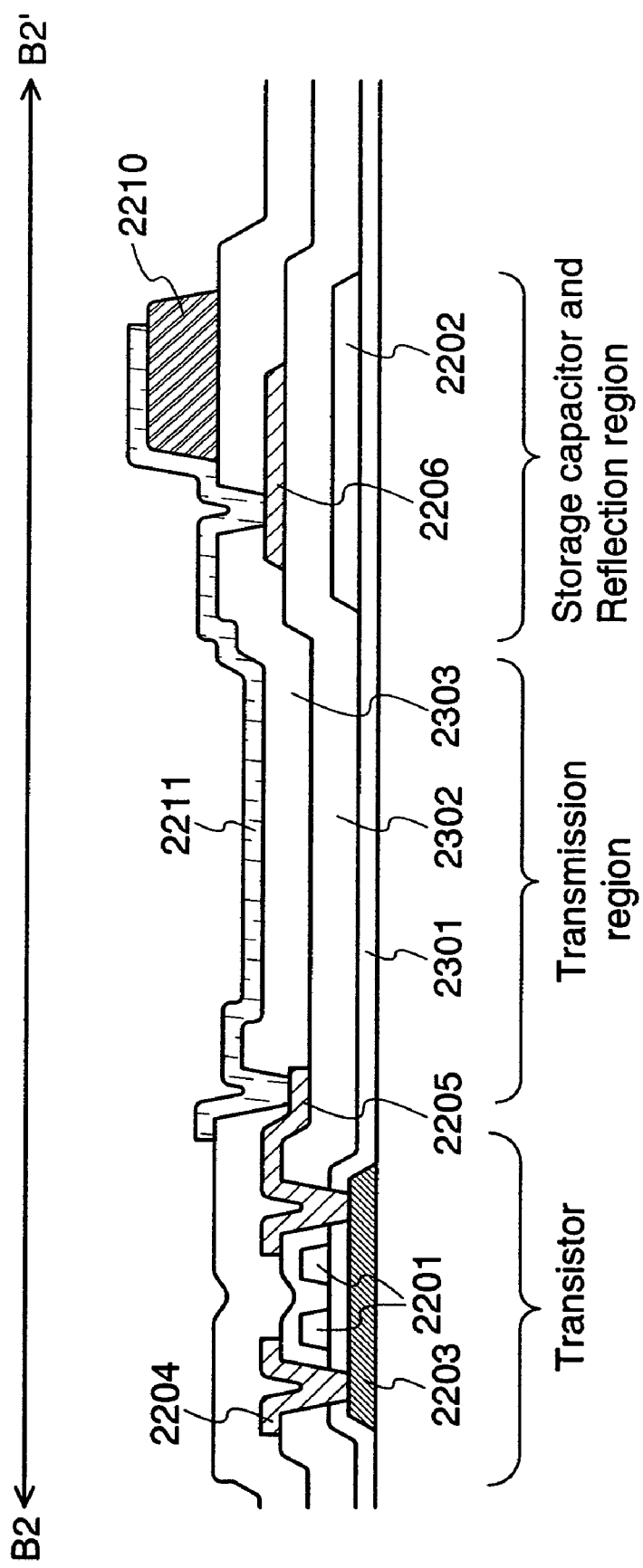
FIG. 23 is a cross sectional view showing a display device of the invention.

FIG. 23 shows a cross sectional view taken a line B2-B2' in FIG. 22. The storage capacitor is provided in the reflection region as shown in FIG. 23. Two electrodes of the storage capacitor are used also as the reflection electrode.

Note that description in this embodiment mode can commonly used for the description in Embodiment Modes 1 to 6. Therefore, the description in Embodiment Modes 1 to 6 can be combined with the description in this embodiment mode.

Embodiment Mode 8

FIGS. 20 and 22 show examples of the layout views of the transparent electrode and the reflection electrode. Next, some examples of the electrode is described.

Figure 24:
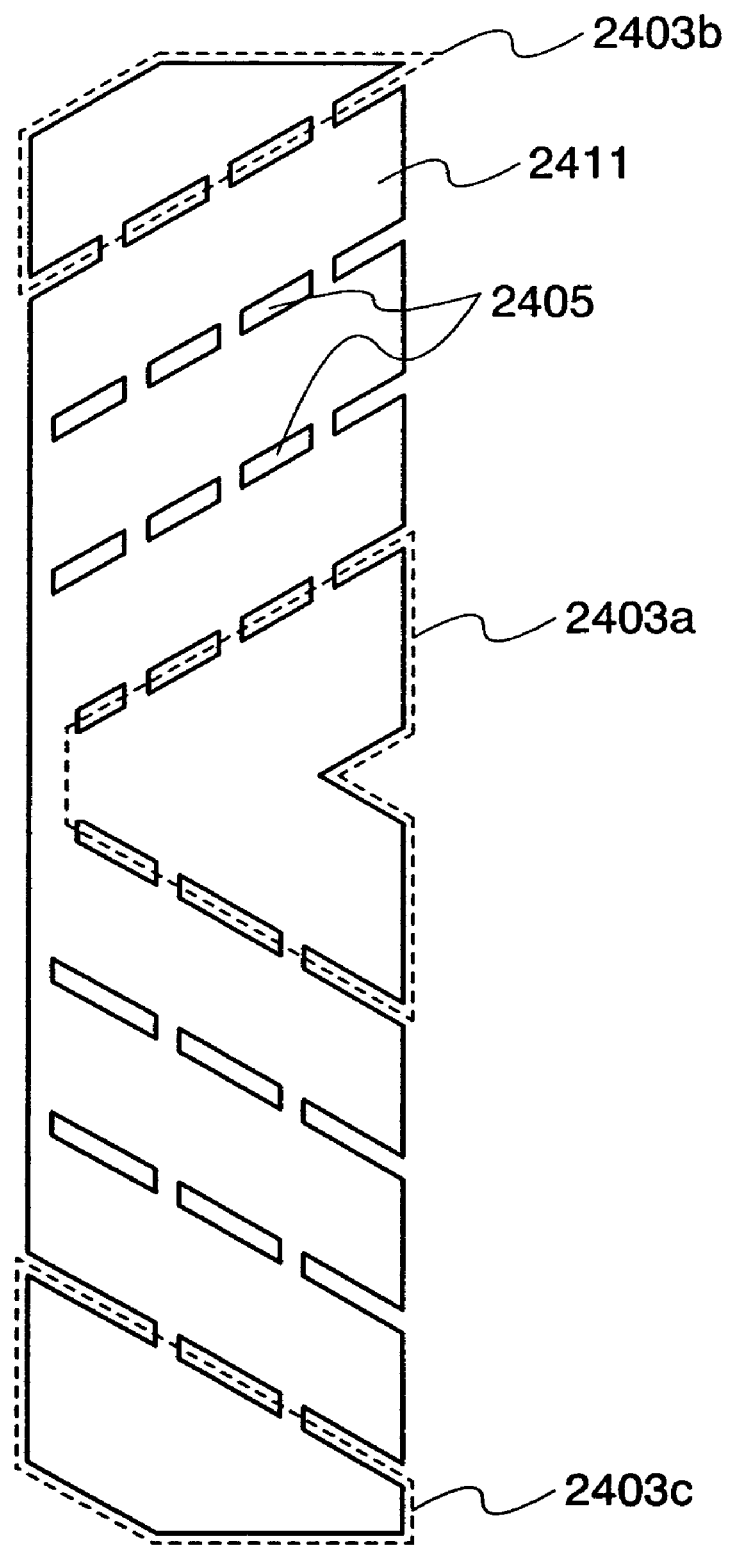
FIG. 24 is a plan layout view showing a display device of the invention.

FIG. 24 shows an example of a layout view of an electrode. In over an electrode 2411, slits 2405 (a gap, a space, or the like) of an electrode are provided in two oblique directions. Reference numerals 2403a, 2403b, and 2403c correspond to boundary portions of the cell gap adjusting films. The cell gap adjusting film is provided in a portion enclosed by a dotted line. A large part of this boundary is arranged approximately in parallel with the slits 2405 (the gap, the space, or the like) of the electrode. Therefore, an orientation defect of the liquid crystal can be reduced.

One or a plurality of the cell gap adjusting films can be provided. That is, only the cell gap adjusting film 2403a may be provided, or two films of the cell gap adjusting film 2403b and the cell gap adjusting film 2403c may be provided. Alternatively, all of the cell gap adjusting films 2403a, 2403b, and 2403c may be provided. The cell gap adjusting film 2403a has two directions of slits, which are an obliquely upper right direction and an obliquely upper left direction. Therefore, a viewing angle can be increased due to a plurality of directions that the liquid crystal molecules are inclined. Similarly, when two films of the cell gap adjusting film 2403b and the cell gap adjusting film 2403c are employed, a viewing angle can be increased because of a plurality of directions that the liquid crystal molecules are inclined.

A portion where the cell gap adjusting film exists serves as the reflection region, and the reflection electrode is formed in the reflection region. An electrode 2411 in the portion where the cell gap adjusting film exists may become the reflection electrode. Alternatively, the reflection electrode may be provided below the cell gap adjusting film as shown in FIGS. 21 and 23. A portion where the cell gap adjusting film does not exist becomes the transmission region. The reflection electrode and the transparent electrode are both in the case where they are electrically connected as one electrode as shown in FIGS. 2A to 2C and in the case where they are different electrodes as shown in FIGS. 6A and 6B.

Figure 25:
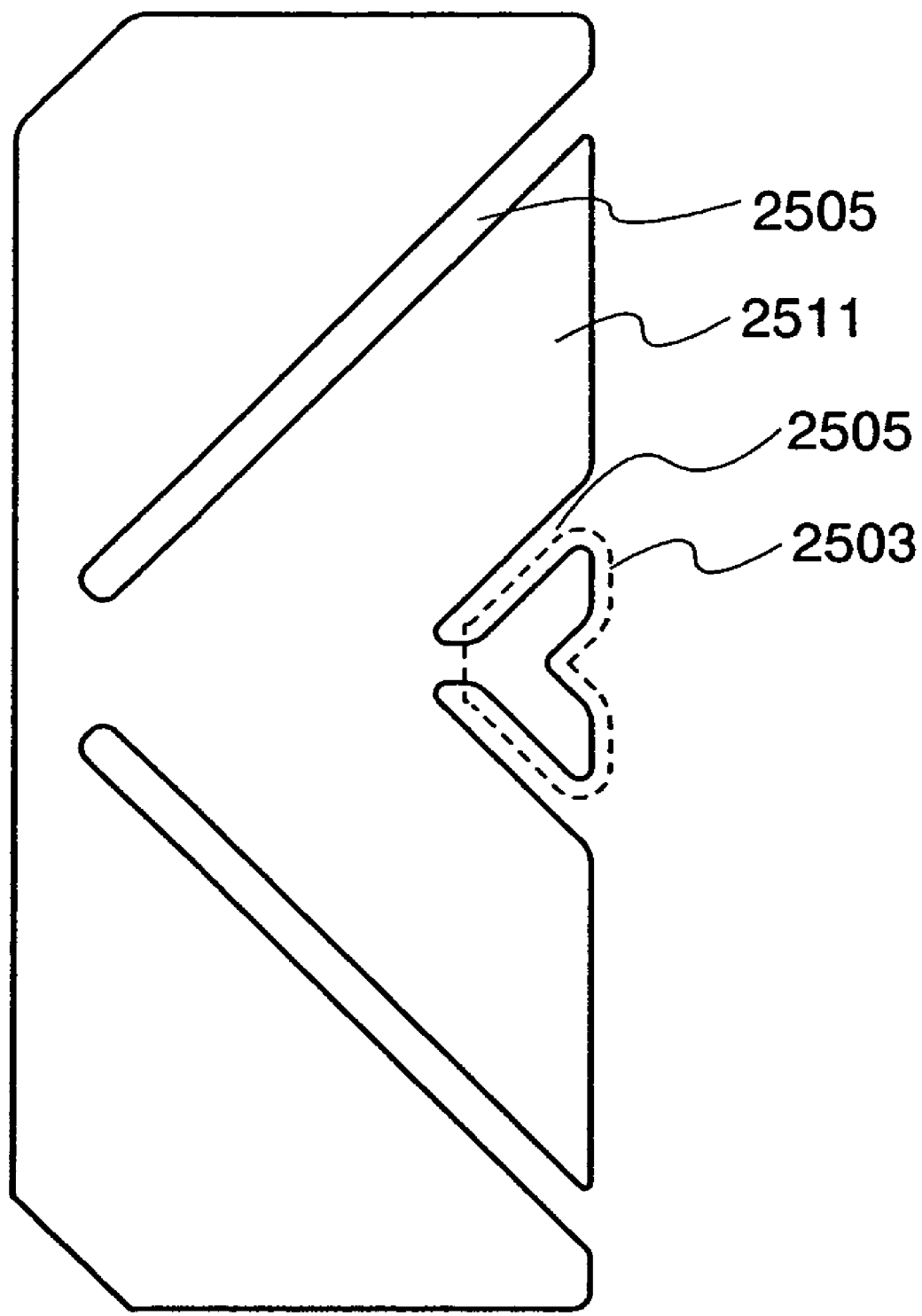
FIG. 25 is a plan layout view showing a display device of the invention.

Another example of the electrode is shown in FIG. 25. In an electrode 2511, slits 2505 (a gap, a space, or the like) of an electrode is provided in two oblique directions. A reference numeral 2503 corresponds to the boundary portion of the cell gap adjusting film. The cell gap adjusting film is provided in a portion enclosed by a dotted line. A large part of this boundary is arranged approximately in parallel with the slits 2505 (the gap, the space, or the like) of the electrode. Therefore, an orientation defect of the liquid crystal can be reduced.

In addition, the slits 2505 (the gap, the space, or the like) of the electrode is long and not being cut as shown in FIG. 24. Therefore, an orientation defect of the liquid crystal can be reduced.

Note that a portion where the cell gap adjusting film exists serves as the reflection region, and the reflection electrode is formed in the reflection region. The electrode 2511 in the portion where the cell gap adjusting film exists may serve as the reflection electrode. Alternatively, the reflection electrode may be provided below the cell gap adjusting film as shown in FIGS. 21 and 23. A portion where the cell gap adjusting film does not exist becomes the transmission region. The reflection electrode and the transparent electrode are both in the case where they are electrically connected as one electrode as shown in FIGS. 2A to 2C and in the case where they are different electrodes as shown in FIGS. 6A and 6B.

Figure 26:
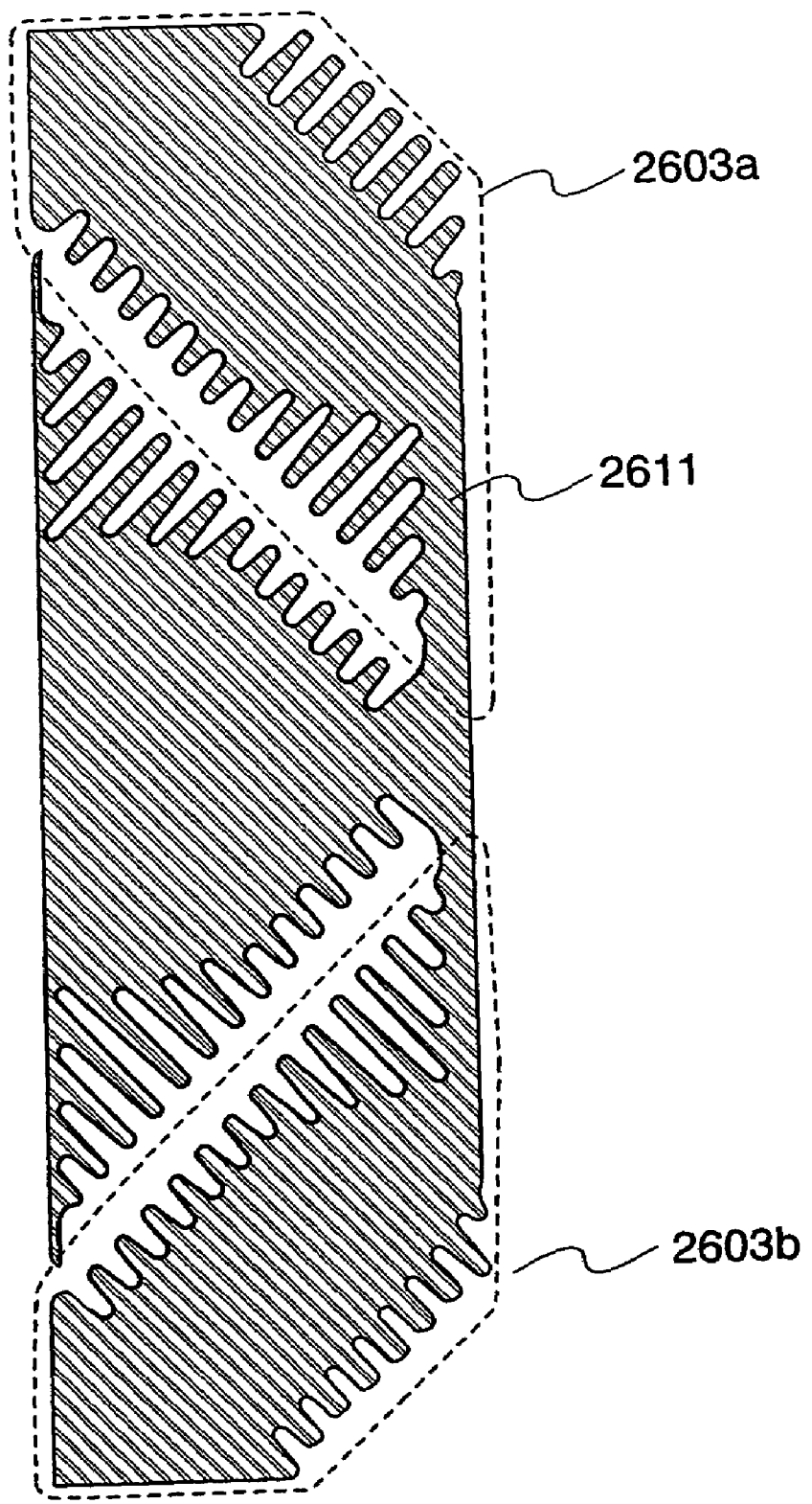
FIG. 26 is a plan layout view showing a display device of the invention.

Another example of the electrode is shown in FIG. 26. A slit 2605 (a gap, a space, or the like) of an electrode is provided at an electrode 2611. The slit has a shape of teeth of a comb. Cell gap adjusting films 2603a and 2603b may be provided along an envelope like passing a tip of the shape of teeth of a comb. Note that the cell gap adjusting films 2603a and 2603b may be provided along the shape of teeth of a comb. The cell gap adjusting film is provided in a portion enclosed by a dotted line of the cell gap adjusting films 2603a and 2603b. A large part of this boundary is arranged approximately in parallel with the slit 2605 (the gap, the space, or the like) of the electrode or the envelope. Therefore, an orientation defect of the liquid crystal can be reduced.

A portion where the cell gap adjusting film exists becomes the reflection region, and the reflection electrode is formed in the reflection region. An electrode 2611 in the portion where the cell gap adjusting film exists may become the reflection electrode. Alternatively, the reflection electrode may be provided below the cell gap adjusting film as shown in FIGS. 21 and 23. A portion where the cell gap adjusting film does not exist becomes the transmission region. The reflection electrode and the transparent electrode are both in the case where they are electrically connected as one electrode as shown in FIGS. 2A to 2C and in the case where they are different electrodes as shown in FIGS. 6A and 6B.

Figure 27:
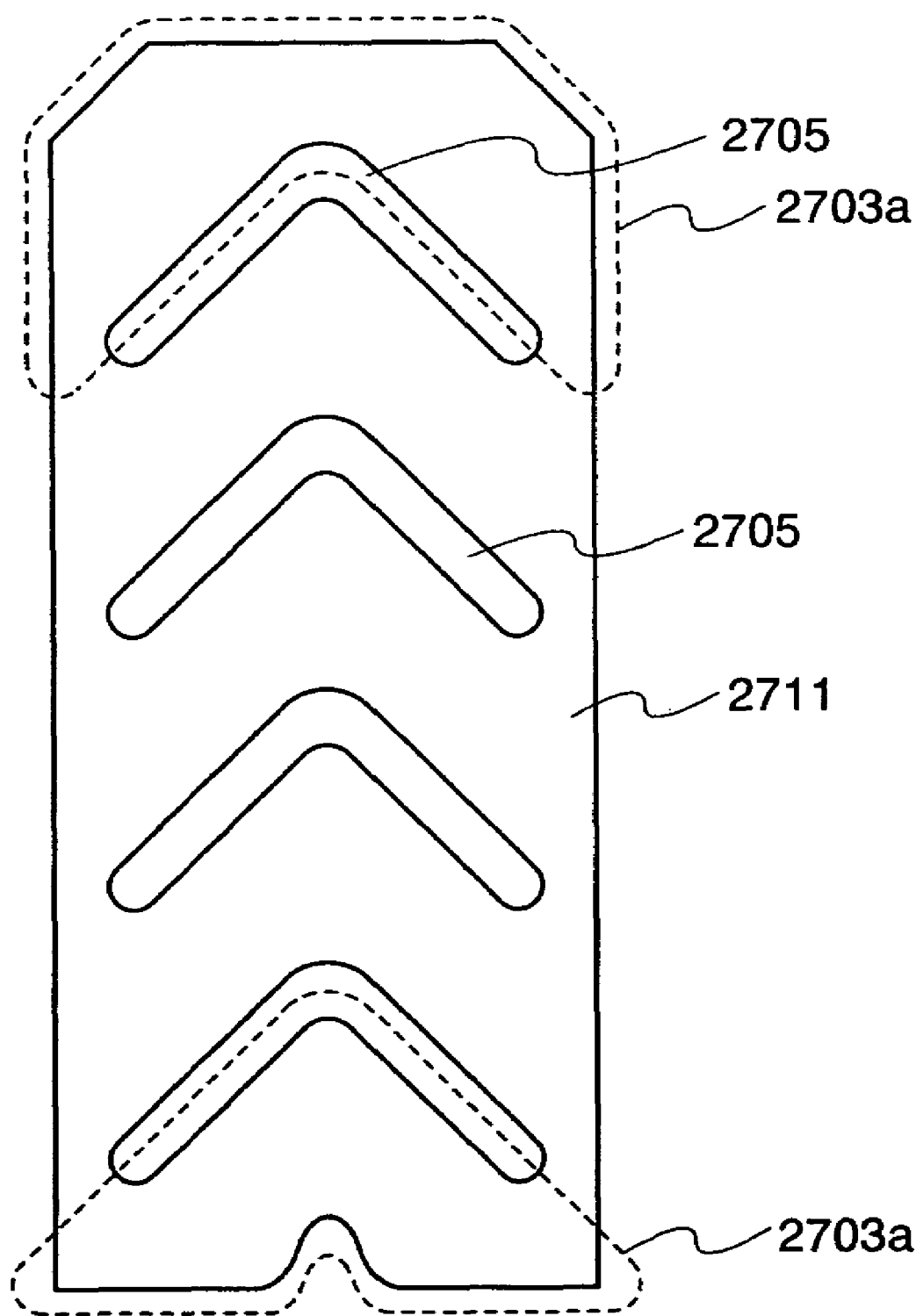
FIG. 27 is a plan layout view showing a display device of the invention.

Another example of the electrode is shown in FIG. 27. In an electrode 2711, slits 2705 (a gap, a space, or the like) of an electrode has a dogleg shape and is provided in two oblique directions. Reference numerals 2703a and 2703b correspond to the boundary portions of the cell gap adjusting film. The cell gap adjusting film is provided in a portion enclosed by a dotted line. A large part of this boundary is arranged approximately in parallel with the slits 2705 (the gap, the space, or the like) of the electrode. Therefore, an orientation defect of the liquid crystal can be reduced.

One or a plurality of the cell gap adjusting films can be provided. That is, only the cell gap adjusting film 2703a or the cell gap adjusting film 2703b may be provided, or two films of the cell gap adjusting film 2703a and the cell gap adjusting film 2703b may be provided. When the cell gap adjusting film 2703a and the cell gap adjusting film 2703b are employed, a viewing angle can be increased because of a plurality of directions that the liquid crystal molecules are inclined.

A portion where the cell gap adjusting film exists serves as the reflection region, and the reflection electrode is formed in the reflection region. The electrode 2711 in the portion where the cell gap adjusting film exists may serve as the reflection electrode. Alternatively, the reflection electrode may be provided below the cell gap adjusting film as shown in FIGS. 21 and 23. A portion where the cell gap adjusting film does not exist becomes the transmission region. The reflection electrode and the transparent electrode are both in the case where they are electrically connected as one electrode as shown in FIGS. 2A to 2C and in the case where they are different electrodes as shown in FIGS. 6A and 6B.

Figure 28:
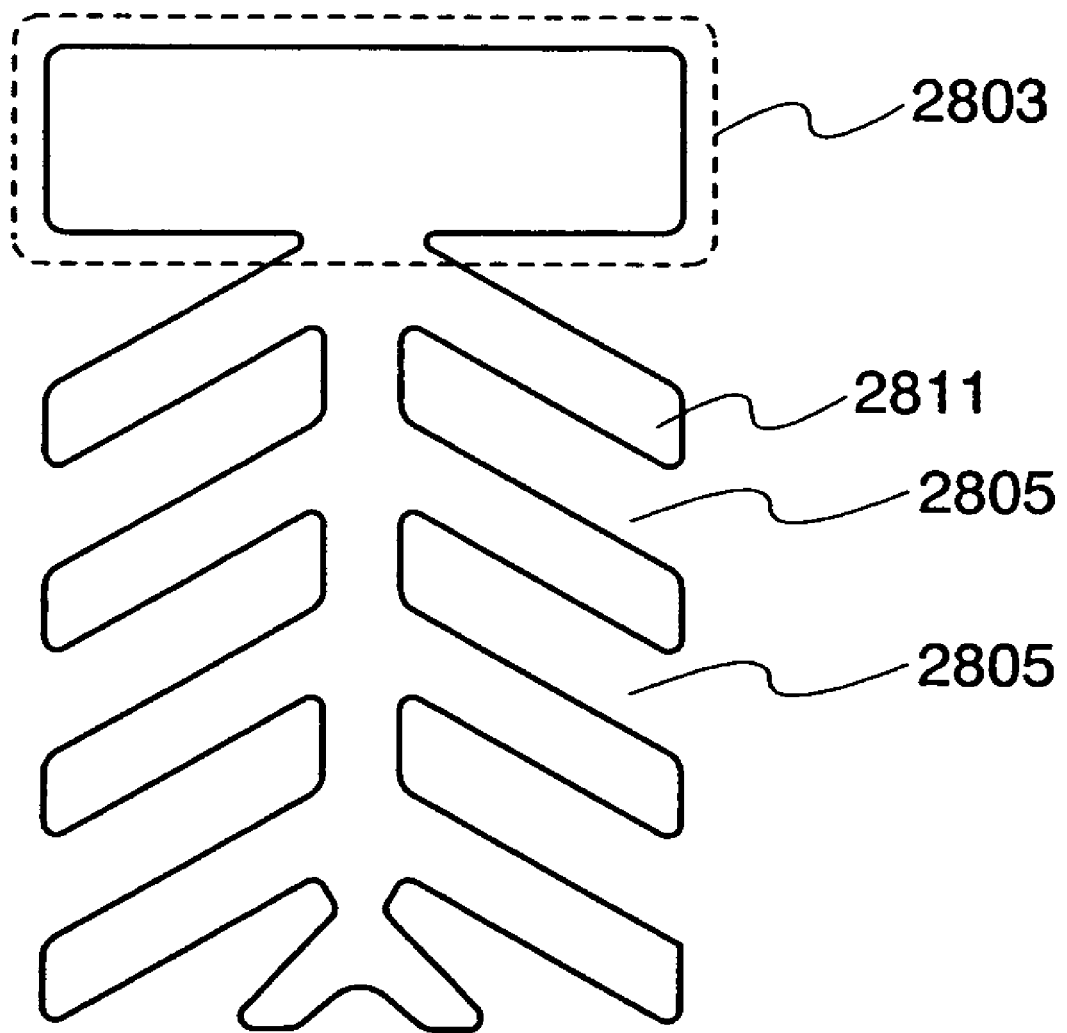
FIG. 28 is a plan layout view showing a display device of the invention.

Another example of the electrode is shown in FIG. 28. In an electrode 2811, slits 2805 (a gap, a space, or the like) of an electrode is provided in two oblique directions. The electrode 2811 is provided like a branch growing from a trunk. A reference numeral 2803 corresponds to the boundary portion of the cell gap adjusting film. The cell gap adjusting film is provided in a portion enclosed by a dotted line. A large part of this boundary is arranged approximately in parallel with the electrode 2811. Therefore, an orientation defect of the liquid crystal can be reduced.

A portion where the cell gap adjusting film exists serves as the reflection region, and the reflection electrode is formed in the reflection region. The electrode 2811 in the portion where the cell gap adjusting film exists may serve as the reflection electrode. Alternatively, the reflection electrode may be provided below the cell gap adjusting film as shown in FIGS. 21 and 23. A portion where the cell gap adjusting film does not exist becomes the transmission region. The reflection electrode and the transparent electrode are both in the case where they are electrically connected as one electrode as shown in FIGS. 2A to 2C and in the case where they are different electrodes as shown in FIGS. 6A and 6B.

Note that a layout view of the electrode is not limited to those described in this embodiment mode.

Note that description in this embodiment mode can commonly used for the description in Embodiment Modes 1 to 7. Therefore, the description in Embodiment Modes 1 to 7 can be combined with the description in this embodiment mode.

Embodiment Mode 9

FIGS. 21 and 23 show cross-sectional structural views in the case of employing the bottom gate transistor and the case of employing the top gate transistor. In this embodiment mode, another cross-sectional structural view is described. Note that a cross-sectional structure is not limited to those described in this embodiment mode.

Figure 29:
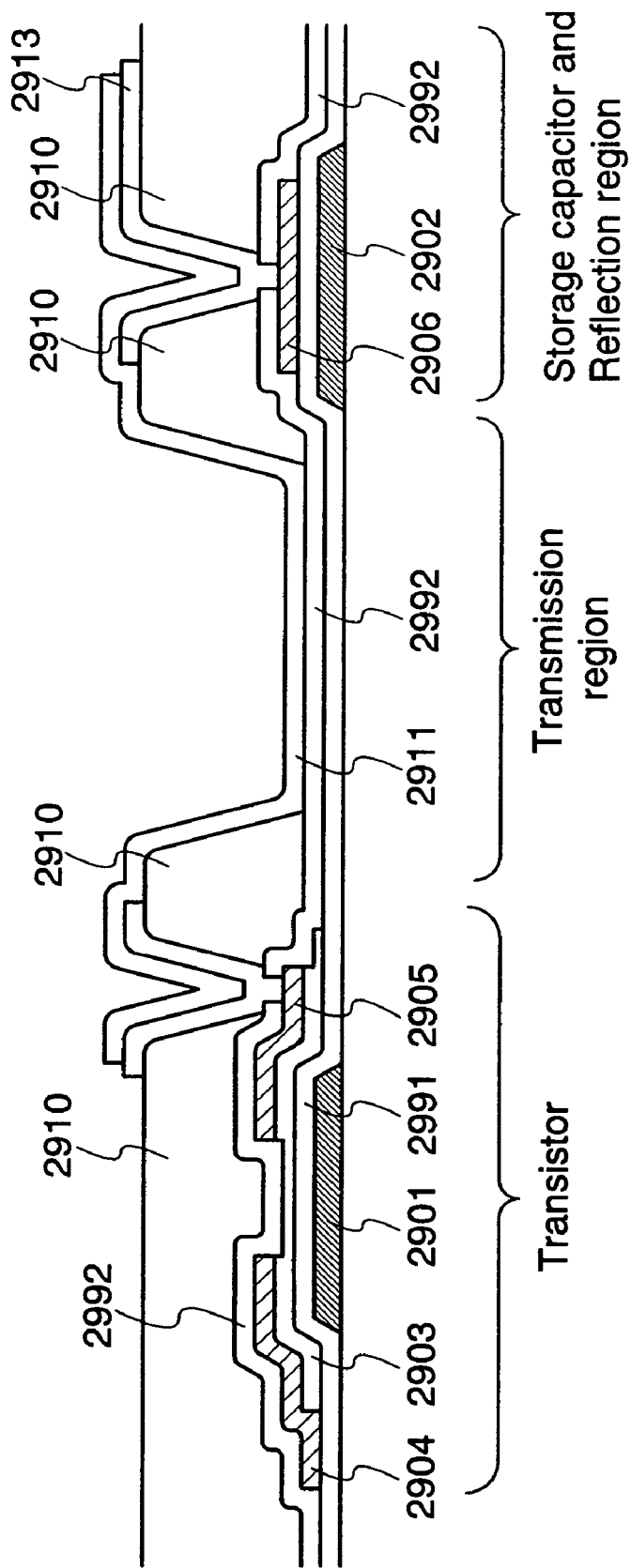
FIG. 29 is a cross sectional view showing a display device of the invention.

FIG. 29 shows an example of a cross sectional view in the case of employing the bottom gate transistor. A gate signal line 2901 and a capacitor line 2902 are formed of the same material in the same layer. A part of the gate signal line 2901 functions as a gate electrode of the transistor. A part of the capacitor line 2902 functions as an electrode of the storage capacitor. A gate insulating film 2991 is formed thereover. Silicon 2903 is formed over the gate insulating film 2991. This portion functions as the transistor. A source signal line 2904 and a drain signal line 2905 are formed over the silicon 2903. A capacitor electrode 2906 is formed of the same material in the same layer as the source signal line 2904 and the drain signal line 2905. The storage capacitor is formed between the capacitor electrode 2906 and the capacitor line 2902. An interlayer insulating film 2992 is formed over the source signal line 2904, the drain signal line 2905, and the capacitor electrode 2906, over which a cell gap adjusting film 2910 is formed.

In the structure shown in FIG. 29, the cell gap adjusting film 2910 is eliminated at least from the transmission region. The cell gap adjusting film 2910 may be eliminated from a region other than the reflection region. A reflection electrode 2913 is formed over the cell gap adjusting film 2910. Note that a contact electrode 2912 is not required to be provided. A transparent electrode 2911 is formed over the reflection electrode 2913. By providing the transparent electrode 2911 over the reflection electrode 2913, the transparent electrode 2911 and the reflection electrode 2913 are electrically connected.

As the electrode of the storage capacitor, the transparent electrode 2911 and the reflection electrode 2913 may be employed instead of the capacitor electrode 2906. At that time, a thick material is preferably eliminated because an insulating film between the electrodes is preferably as thin as possible in order to make a capacitance value large.

In FIG. 29, although the transparent electrode 2911 is formed over the reflection electrode 2913, it is not limited to this. The reflection electrode 2913 may be formed over the transmission region 2911.

Although the interlayer insulating film 2992 is formed over the source signal line 2904, the drain signal line 2905, and the capacitor electrode 2906, it is not limited to this. If circumstances require, the interlayer insulating film 2992 is provided.

Note that in FIG. 29, although the reflection electrode 2913 is provided, it is not limited to this. The reflection electrode may be formed by sharing the drain electrode 2905, an electrode or a wire in the same layer thereof, the capacitor line 2902, or an electrode or a wire in the same layer thereof, or by forming a new electrode.

Figure 30:
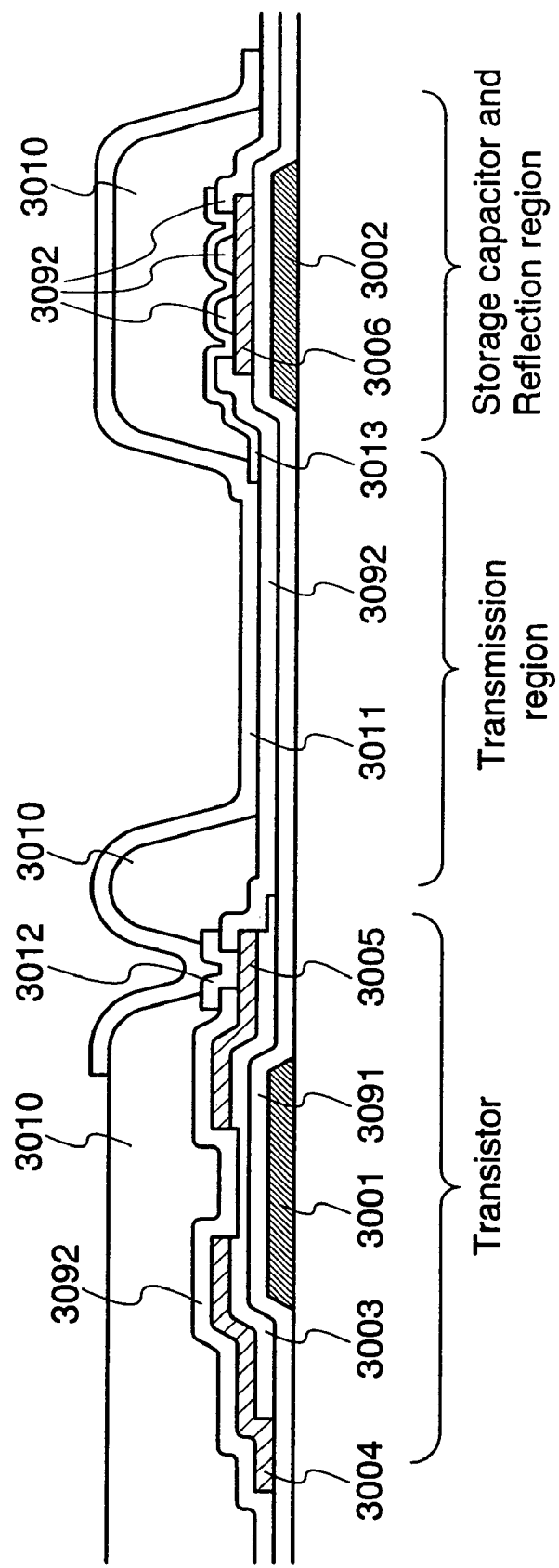
FIG. 30 is a cross sectional view showing a display device of the invention.

Next, in the case where the reflection electrode with unevenness is formed below the cell gap adjusting film as shown in FIGS. 9A and 9B, FIG. 30 shows an example of a cross sectional view in the case of employing the bottom gate transistor. A gate signal line 3001 and a capacitor line 3002 are formed of the same material in the same layer. A part of the gate signal line 3001 functions as a gate electrode of the transistor. A part of the capacitor line 3002 functions as an electrode of the storage capacitor. A gate insulating film 3091 is formed thereover. Silicon 3003 is formed over the gate insulating film 3091. This portion functions as the transistor. A source signal line 3004 and a drain signal line 3005 are formed over the silicon 3003. A capacitor electrode 3006 is formed of the same material in the same layer as the source signal line 3004 and the drain signal line 3005. The storage capacitor is formed between the capacitor electrode 3006 and the capacitor line 3002. An interlayer insulating film 3092 is formed over the source signal line 3004, the drain signal line 3005, and the capacitor electrode 3006.

A plurality of contact holes are provided in the interlayer insulating film 3092. A reflection electrode 3013 can have unevenness by using the contact holes. The reflection electrode 3013 and a connection electrode 3012 are formed over the interlayer insulating film 3092 having the contact holes.

A cell gap adjusting film 3010 is formed over the reflection electrode 3013 and the connection electrode 3012. Note that the cell gap adjusting film 3010 is eliminated at least from the transmission region. The cell gap adjusting film 3010 may be eliminated from a region other than the reflection region. A transparent electrode 3011 is formed over the cell gap adjusting film 3010. In order to be electrically connected to the transparent electrode 3011, a part of the reflection electrode 3013 is formed outside of the cell gap adjusting film 3010, at which it is connected to the transparent electrode 3011.

As the electrode of the storage capacitor, the transparent electrode 3011 and the reflection electrode 3013 may be employed instead of the capacitor electrode 3006. At that time, a thick material is preferably eliminated because an insulating film between the electrodes is preferably as thin as possible in order to make a capacitance value large.

In FIG. 30, although the reflection electrode 3013 is provided, it is not limited to this. The reflection electrode may be formed by sharing the drain electrode 3005, an electrode or a wire in the same layer thereof, the capacitor line 3002, or an electrode or a wire in the same layer thereof, or by forming a new electrode.

Figure 31:
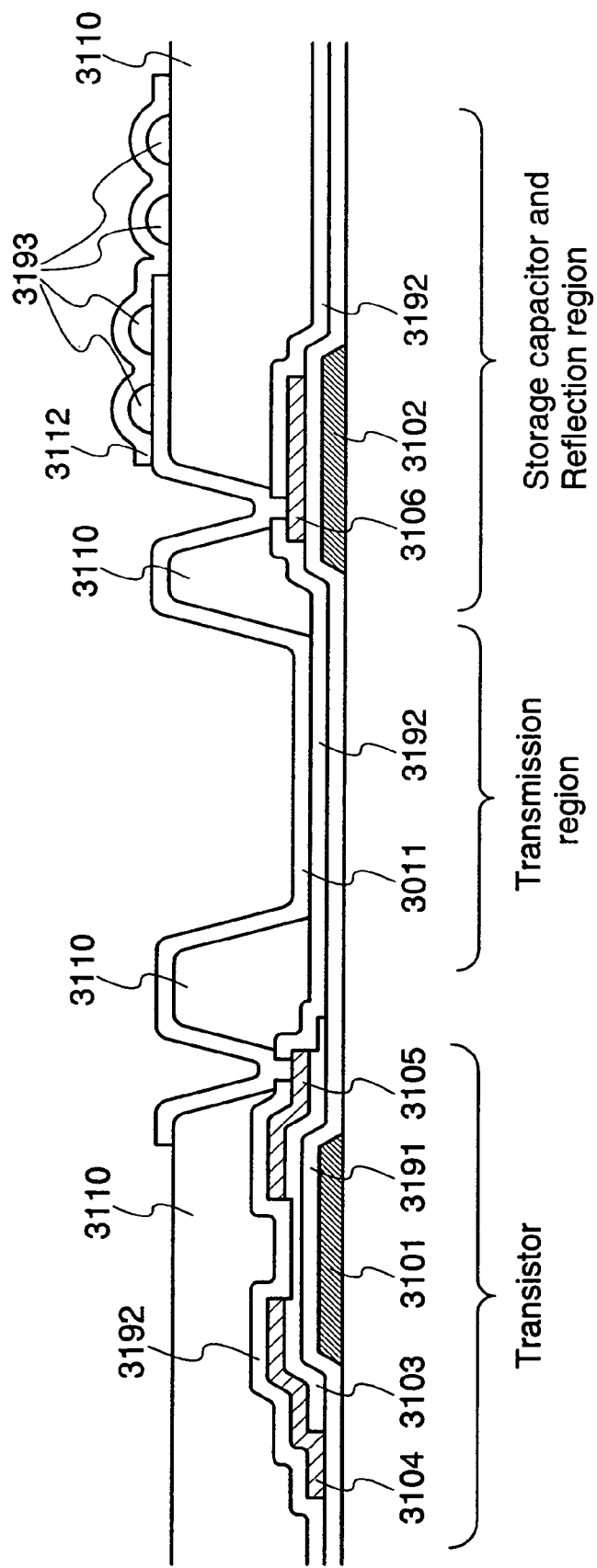
FIG. 31 is a cross sectional view showing a display device of the invention.

Next, in the case where the reflection electrode with unevenness is formed over the cell gap adjusting film as shown in FIGS. 7A and 7B, FIG. 31 shows an example of a cross sectional view in the case of employing the bottom gate transistor.

A gate signal line 3101 and a capacitor line 3102 are formed of the same material in the same layer. A part of the gate signal line 3101 functions as a gate electrode of the transistor. A part of the capacitor line 3102 functions as an electrode of the storage capacitor. A gate insulating film 3191 is formed thereover. Silicon 3103 is formed over the gate insulating film 3191. This portion functions as the transistor.

A source signal line 3104 and a drain signal line 3105 are formed over the silicon 3103. A capacitor electrode 3106 is formed of the same material in the same layer as the source signal line 3104 and the drain signal line 3105. The storage capacitor is formed between the capacitor electrode 3106 and the capacitor line 3102. An interlayer insulating film 3192 is formed over the source signal line 3104, the drain signal line 3105, and the capacitor electrode 3106, over which a cell gap adjusting film 3110 is formed. Note that the cell gap adjusting film 3110 is eliminated at least from the transmission region. Note that the cell gap adjusting film 3110 may be eliminated from a region other than the reflection region.

A transparent electrode 3011 is formed over the cell gap adjusting film 3110. The transparent electrode 3011 is formed in the reflection region in order to be electrically connected to a reflection electrode 3112. A projection portion 3193 is formed thereover. Note that the projection portion 3193 may be formed below the transparent electrode 3011. The reflection electrode 3112 is formed subsequently.

A transparent electrode 3011 is provided below a reflection electrode 3112, thereby being electrically connected to the reflection electrode 3112.

As the electrode of the storage capacitor, the transparent electrode 3011 and the reflection electrode 3112 may be employed instead of the capacitor electrode 3106. At that time, a thick material is preferably eliminated because an insulating film between the electrodes is preferably as thin as possible in order to make a capacitance value large.

In FIG. 31, although the reflection electrode 3112 is formed over the transparent electrode 3011, it is not limited to this. The transparent electrode 3011 may be formed over the reflection electrode 3112.

Although the interlayer insulating film 3192 is formed over the source signal line 3104, the drain signal line 3105, and the capacitor electrode 3106, it is not limited to this. If circumstances require, the interlayer insulating film 3192 is provided.

Note that in this embodiment mode, although description is made of a channel etch type transistor as the bottom gate transistor, it is not limited to this. A channel protective type (channel stop type) transistor of which a protective film is formed at an upper portion of a channel may be employed.

Figure 32:
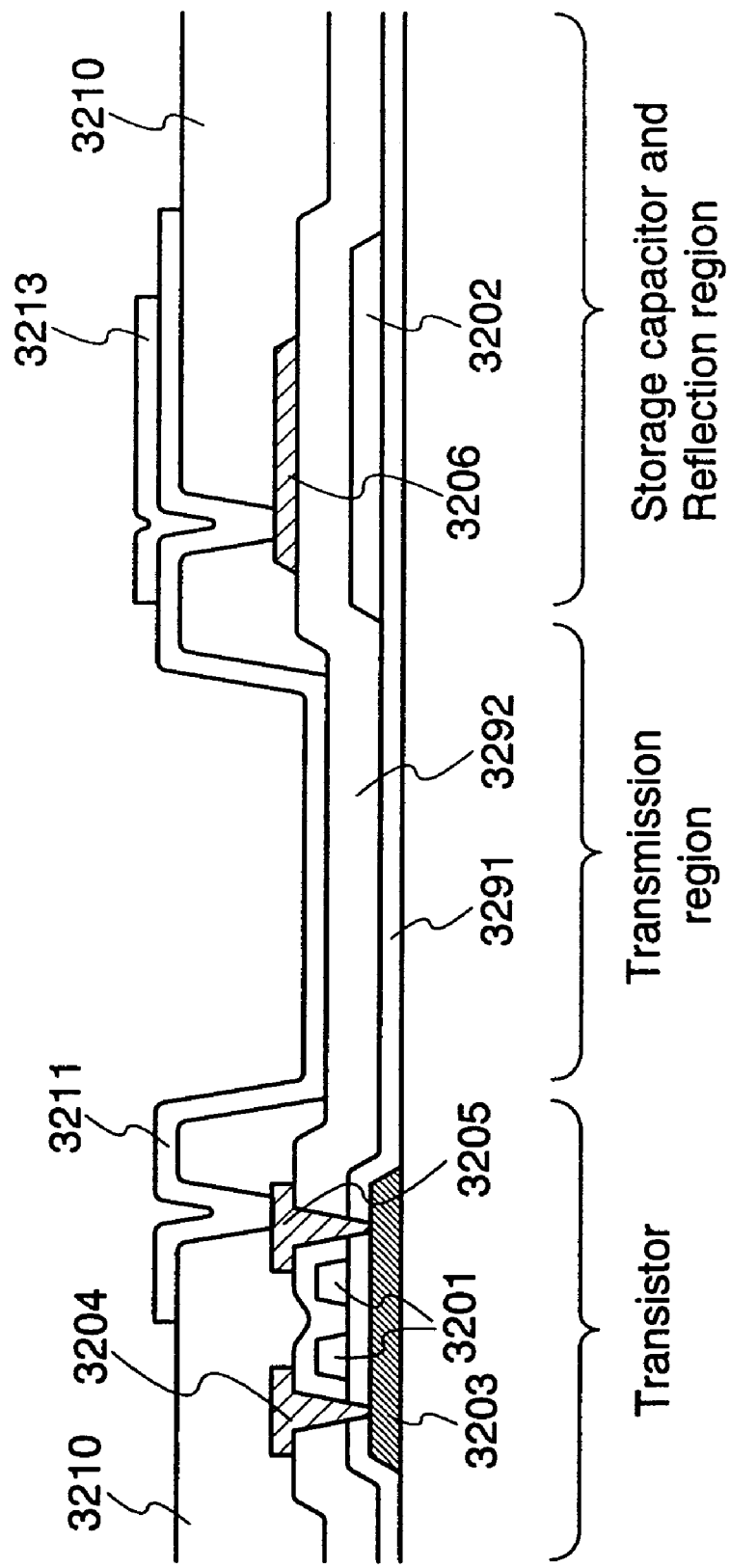
FIG. 32 is a cross sectional view showing a display device of the invention.

Next, FIG. 32 shows an example of a cross sectional view in the case of employing the top gate transistor.

Silicon 3203 is provided, over which a gate insulating film 3291 is formed. A gate signal line 3201 and a capacitor line 3202 are formed of the same material in the same layer over the gate insulating film 3291. A part of the gate signal line 3201 provided over the silicon 3203 functions as a gate electrode of the transistor. A part of the capacitor line 3202 functions as an electrode of the storage capacitor. An interlayer insulating film 3292 is formed thereover. A source signal line 3204, a drain signal line 3205, and a capacitor electrode 3206 are formed of the same material in the same layer over the interlayer insulating film 3292. The storage capacitor is formed between the capacitor electrode 3206 and the capacitor line 3202. Note that as the electrode of the storage capacitor, an electrode in the same layer as the silicon 3203 may be used, and the storage capacitor may be formed between the electrode and the capacitor line 3202. A cell gap adjusting film 3210 is formed thereover. Note that the cell gap adjusting film 3210 is eliminated at least from the transmission region. The cell gap adjusting film 3210 may be eliminated from a region other than the reflection region.

A transparent electrode 3211 is formed over the cell gap adjusting film 3210. The transparent electrode 3211 is formed in the reflection region in order to be electrically connected to a reflection electrode 3213. The reflection electrode 3213 is formed over the transparent electrode 3211.

The transparent electrode 3211 is provided below the reflection electrode 3213, thereby being electrically connected to the reflection electrode 3113.

As the electrode of the storage capacitor, the transparent electrode 3211 and the reflection electrode 3213 may be employed instead of the capacitor electrode 3206. At that time, a thick material is preferably eliminated because an insulating film between the electrodes is preferably as thin as possible in order to make a capacitance value large.

Note that in FIG. 32, although the reflection electrode 3213 is formed over the transparent electrode 3211, it is not limited to this. The transparent electrode 3211 may be formed over the reflection electrode 3213.

Figure 33:
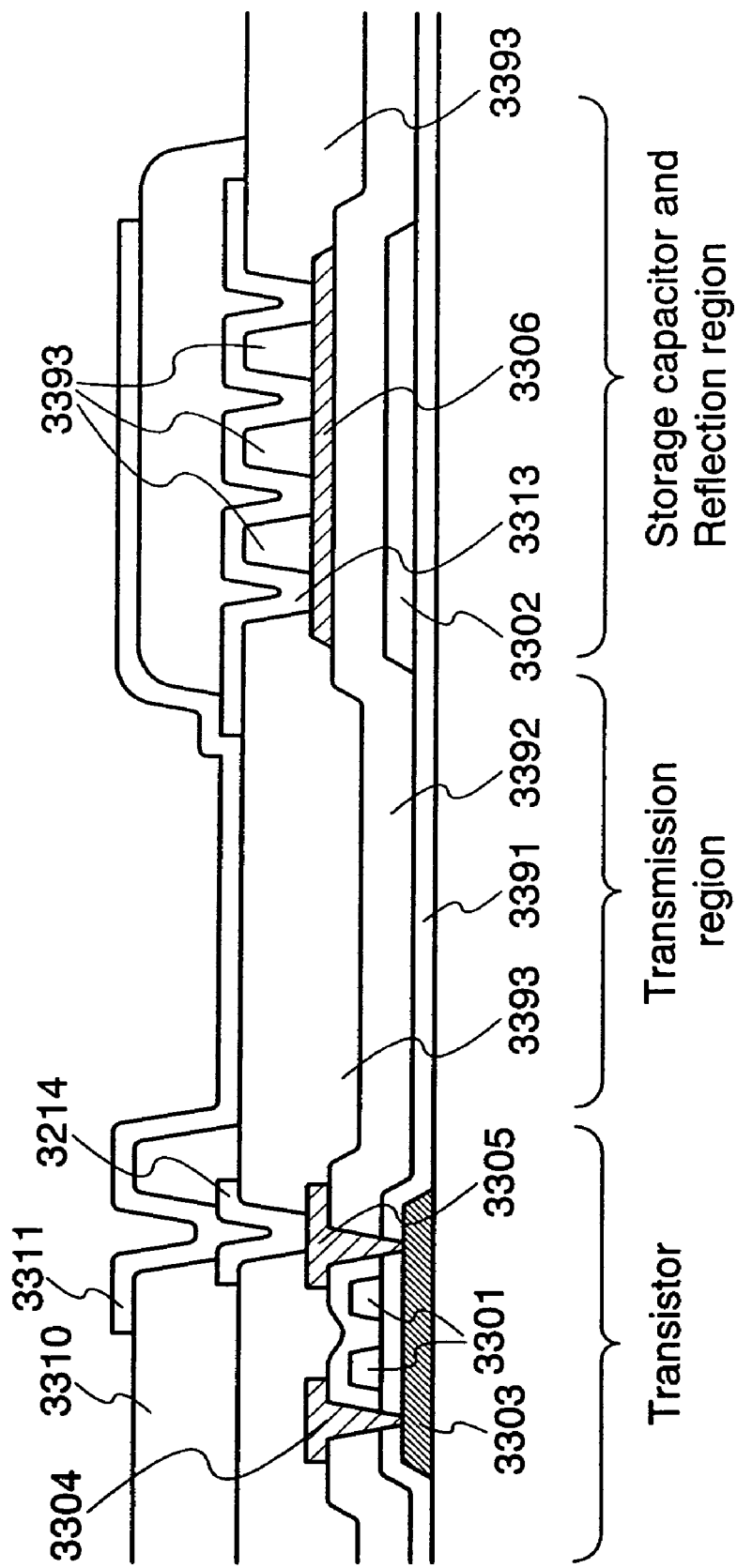
FIG. 33 is a cross sectional view showing a display device of the invention.

Next, in the case where the reflection electrode with unevenness is formed below the cell gap adjusting film as shown in FIGS. 9A and 9B, FIG. 33 shows an example of a cross sectional view in the case of employing the top gate transistor.

Silicon 3303 is provided, over which a gate insulating film 3391 is formed. A gate signal line 3301 and a capacitor line 3302 are formed of the same material in the same layer over the gate insulating film 3391. A part of the gate signal line 3301, which is provided over the silicon 3303, functions as a gate electrode of the transistor. A part of the capacitor line 3302 functions as an electrode of the storage capacitor. An interlayer insulating film 3392 is formed thereover. A source signal line 3304, a drain signal line 3305, and a capacitor electrode 3306 are formed of the same material in the same layer over the gate insulating film 3392. The storage capacitor is formed between the capacitor electrode 3306 and the capacitor line 3302. Note that as the electrode of the storage capacitor, an electrode in the same layer as the silicon 2203 may be used, and the storage capacitor may be formed between the electrode and the capacitor line 3302.

An interlayer insulating film 3393 is formed over the source signal line 3304, the drain signal line 3305, the capacitor electrode 3306, and the like. A plurality of contact holes are provided in the interlayer insulating film 3393. A reflection electrode 3313 can have unevenness by using the contact holes. The reflection electrode 3313 and a connection electrode 3214 are formed over the interlayer insulating film 3393 having the contact holes.

A cell gap adjusting film 3310 is formed over the reflection electrode 3213 and the connection electrode 3314. Note that the cell gap adjusting film 3310 is eliminated at least from the transmission region. The cell gap adjusting film 3310 may be eliminated from a region other than the reflection region.

A transparent electrode 3311 is formed over the cell gap adjusting film 3310. In order to be electrically connected to the transparent electrode 3311, a part of the reflection electrode 3313 is formed outside of the cell gap adjusting film 3310, at which it is connected to the transparent electrode 3311.

Note that as the electrode of the storage capacitor, the transparent electrode 3311 and the reflection electrode 3313 may be employed instead of the capacitor electrode 3306. At that time, a thick material is preferably eliminated because an insulating film between the electrodes is preferably as thin as possible in order to make a capacitance value large.

Note that in FIG. 33, although the reflection electrode 3313 is provided, it is not limited to this. The reflection electrode may be formed by sharing the drain electrode 3305, an electrode or a wire in the same layer thereof, the capacitor line 3302, or an electrode or a wire in the same layer thereof, or by forming a new electrode.

In this invention, various kinds of transistors can be applied such as a thin film transistor (TFT) using a non-monocrystalline semiconductor film typified by amorphous silicon or polycrystalline silicon, a MOS transistor which is formed by using a semiconductor substrate or an SOI substrate, a junction type transistor, a bipolar transistor, a transistor using an organic semiconductor or a carbon nanotube, or other transistors. In addition, a substrate over which a transistor is provided is not limited, and a monocrystalline substrate, an SOI substrate, a grass substrate, or the like can be employed.

Note that the thin film transistor is preferably used for a transistor which is employed in this invention. As using the thin film transistor, a grass substrate, which is inexpensive and transparent, can be used as a substrate.

Note that in the specification, a semiconductor device is a device including a circuit which has a semiconductor element (a transistor, a diode, or the like). A light emitting device is a device including a circuit which has a light emitting element (an organic EL element, an element used for FED, or the like). A display device is a device including a circuit which has a display element (an organic EL element, a liquid crystal element, a DMD, or the like).

Note that cross-sectional structures described in this specification are only examples, and it is not limited to these. Various structures can be obtained by combining the description in Embodiment Modes 1 to 8 freely. Description in this embodiment mode is a part of these combinations, and further, various combinations can be realized.

Embodiment Mode 10

A substrate over which the cell gap adjusting film is formed and an opposite substrate between which the liquid crystal is sandwiched are required to be maintained with a certain cell gap. Therefore, a spacer is required to be provided.

In that case, a method by which spacers of bead shape (spherical shape) are spread over a whole substrate and the liquid crystal is injected is used in general. However, in the case of the semi-transmission type liquid crystal including the vertically aligned liquid crystal in the invention, the spacers of bead shape (spherical shape) cannot maintain a cell gap well because cell gaps are different in the transmission region and in the reflection region.

Figure 34:
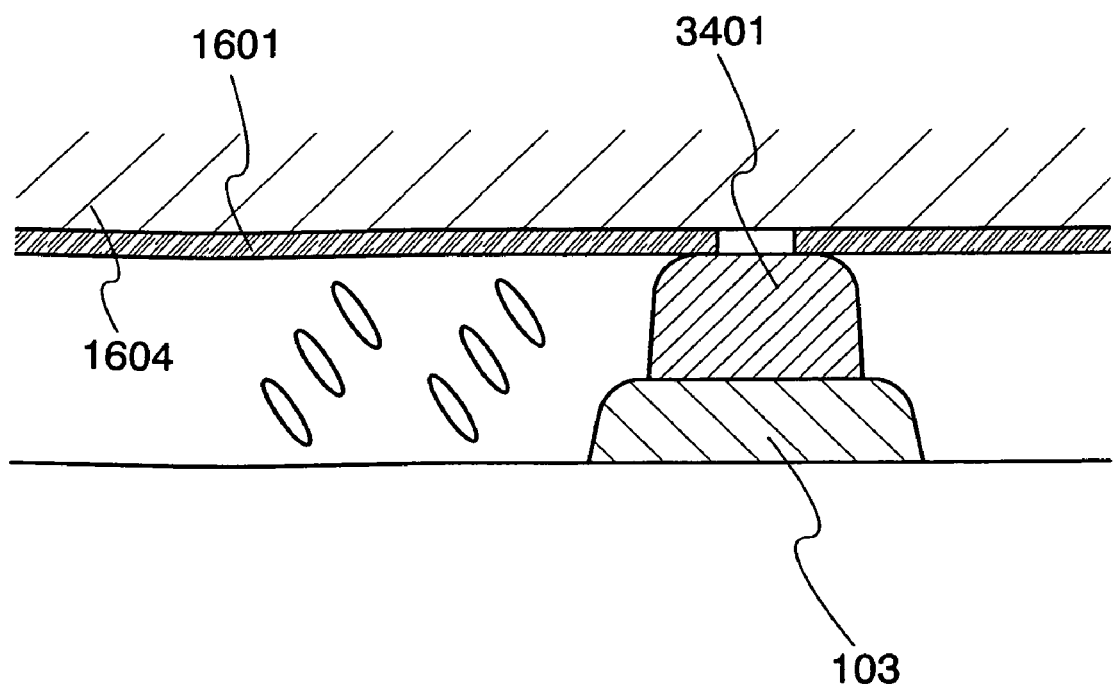
FIG. 34 is a cross sectional view showing a display device of the invention.
Figure 35:
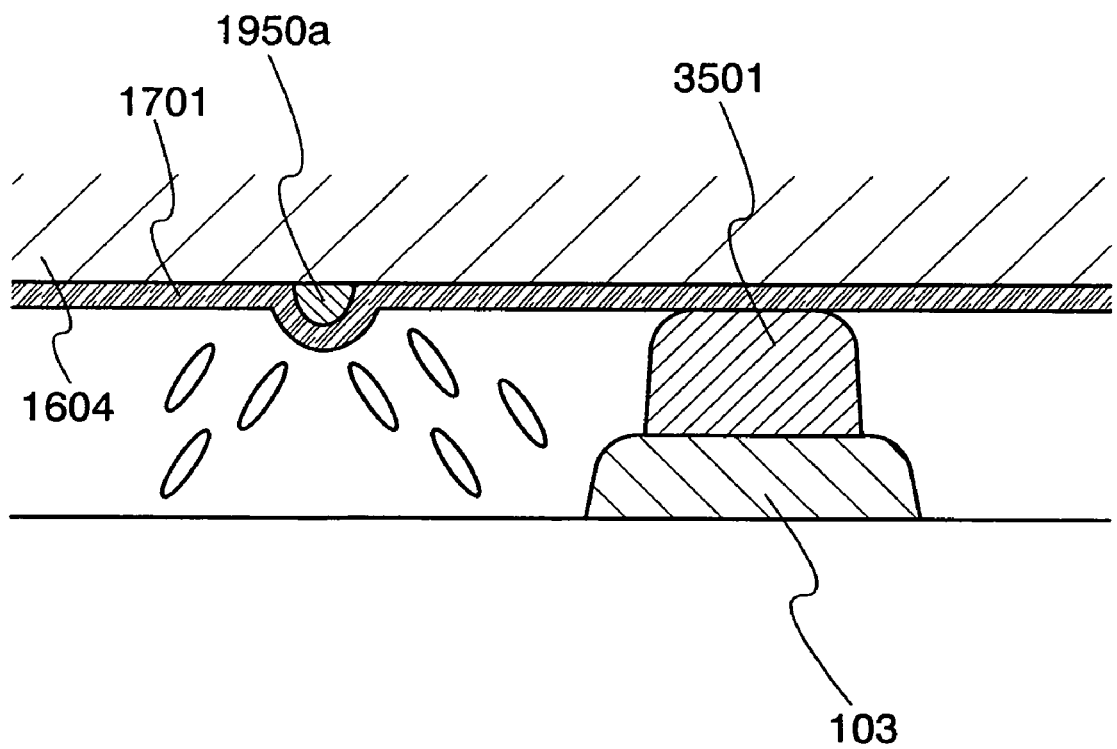
FIG. 35 is a cross sectional view showing a display device of the invention.

Therefore, as shown in FIGS. 34 and 35, a spacer 3401 and a spacer 3501 are preferably formed over the cell gap adjusting film 103 or a film which is formed of the same layer as the cell gap adjusting film 103. In that case, the spacer 3401 and the spacer 3501 contribute to inclining the liquid crystal molecules in a specific direction. Therefore, a slit (a gap, a space, or the like) of an electrode and the projection 1905a are preferably not provided near the spacer 3401 and the spacer 3501.

The spacer 3401 and the spacer 3501 are required to be thick films; therefore, preferably formed of a material containing an organic material. The material containing an organic material preferably includes acrylic, polyimide, polycarbonate, or the like, for example. In addition, the spacer may be formed of a material similarly to the cell gap adjusting film or by using a color filter or the like. That is, layers of each color which are used for a color filter or a protrusion are stacked appropriately to function as a spacer.

By such the spacer 3401 and the spacer 3501, a certain cell gap between the substrate over which the cell gap adjusting film is formed and the opposite substrate can be maintained. Note that in FIGS. 34 and 35, the transparent electrodes 1601 and 1701 are formed over the opposite substrate, respectively.

In addition, the spacer 3401 and the spacer 3501, which are provided other than minimum necessary spacers to maintain a cell gap, may be higher or lower than the spacers, which maintain the cell gap.

A liquid crystal material in the invention is not limited to the vertically aligned liquid crystal. A horizontally aligned liquid crystal, a TN liquid crystal, an IPS liquid crystal, or a ferroelectric liquid crystal may be employed.

Note that description in this embodiment mode can commonly used for the description in Embodiment Modes 1 to 9. Therefore, the description in Embodiment Modes 1 to 9 can be combined with the description in this embodiment mode.

Embodiment Mode 11

In this embodiment mode, description is made of a method for manufacturing a semiconductor device by using plasma treatment as for a method for manufacturing a semiconductor device including a transistor.

Figure 36A:
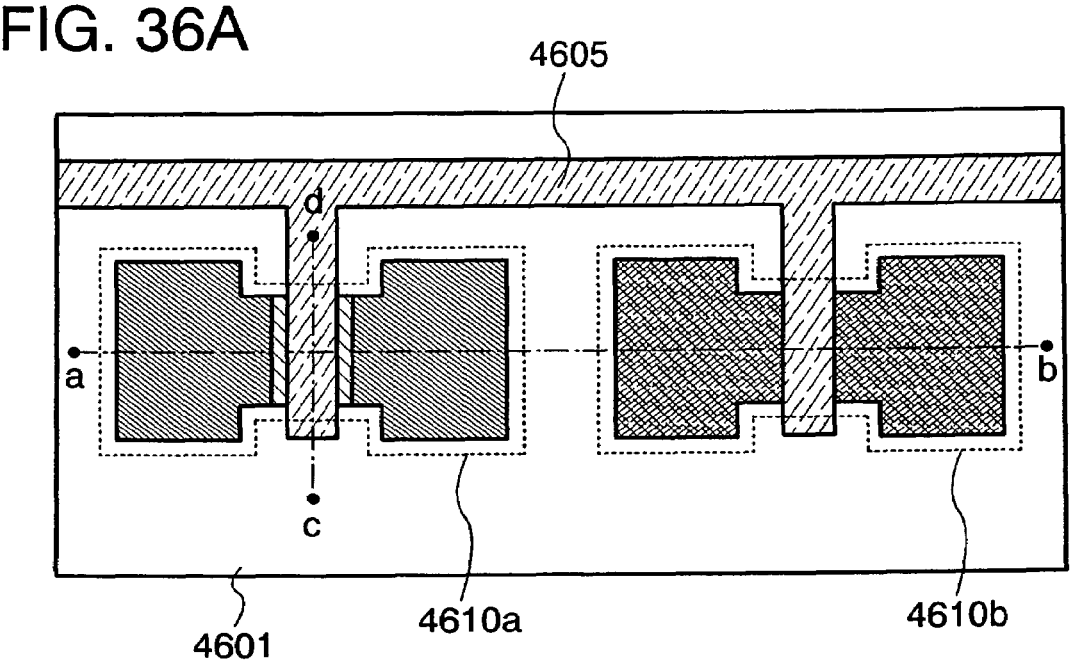
FIGS. 36A to 36C are diagrams showing a manufacturing flow of a display device of the invention.
Figure 36B:
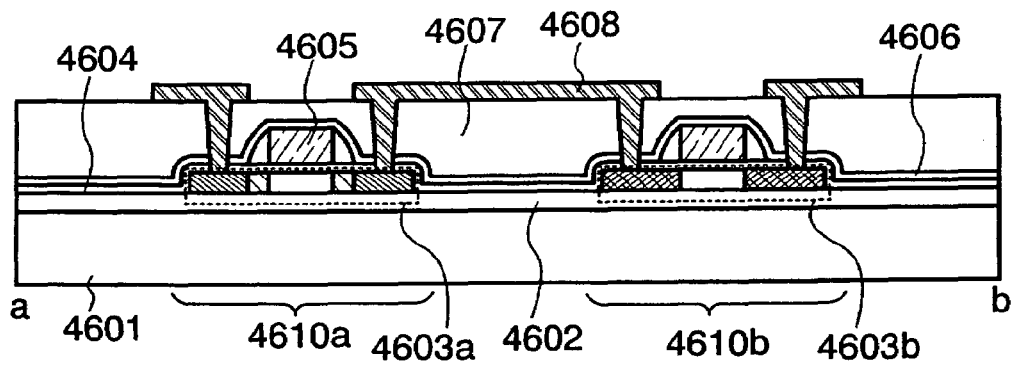
Figure 36C:
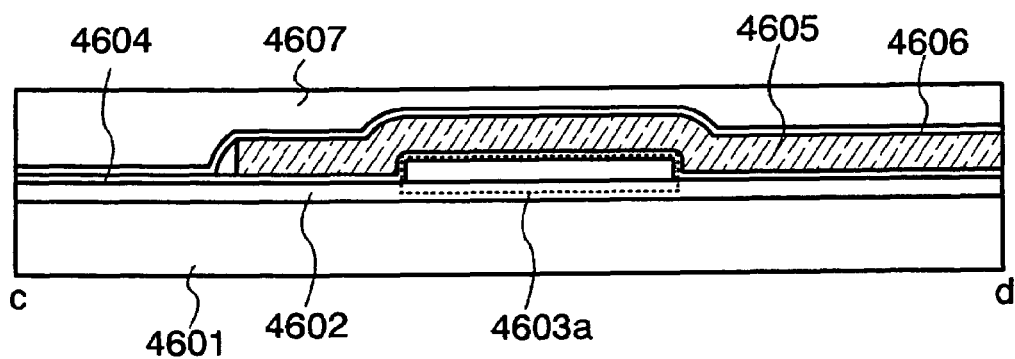

FIGS. 36A to 36C show views of a structural example of a semiconductor device including a transistor. Note that FIG. 36B corresponds to a cross sectional view taken a line a-b in FIG. 36A, and FIG. 36C corresponds to a cross-sectional view taken a line c-d in FIG. 36A.

A semiconductor device shown in FIG. 36A to 36C includes a semiconductor film 4603a and a semiconductor film 4603b which are formed over a substrate 4601 with an insulating film 4602 sandwiched therebetween, a gate electrode 4605 which is formed over the semiconductor film 4603a and the semiconductor film 4603b with an gate insulating film 4604 sandwiched therebetween, an insulating film 4606 and an insulating film 4607 which are formed to cover the gate electrode, a conductive film 4608 which is electrically connected to a source region or a drain region of the semiconductor film 4603a and the semiconductor film 4603b and formed over the insulating film 4607. Note that although FIGS. 36A to 36C show the case where an n-channel transistor 4610a which uses a part of the semiconductor film 4603a as a channel region and a p-channel transistor 4610b which uses a part of the semiconductor film 4603b as a channel region are provided, a structure is not limited to this. For example, in FIGS. 36A to 36C, although an LDD region is provided in the n-channel transistor 4610a and is not provided in the p-channel transistor 4610b, a structure in which LDD regions are provided in both transistors or a structure in which an LDD region is provided in neither of the transistors can be applied.

Note that in this embodiment mode, the semiconductor device shown in FIGS. 36A to 36C is manufactured by oxidizing or nitriding at least one layer of the substrate 4601, the insulating film 4602, the semiconductor film 4603a, the semiconductor film 4603b, the gate insulating film 4604, the insulating film 4606 and the insulating film 4607 by plasma treatment so as to oxidize or nitride a semiconductor film or an insulating film. By oxidizing or nitriding the semiconductor film or the insulating film by plasma treatment in such a manner, a surface of the semiconductor film or the insulating film is modified, and the insulating film can be formed to be denser than an insulating film formed by a CVD method or a sputtering method; therefore, a defect such as a pinhole can be reduced, and characteristics and the like of the semiconductor device can be improved.

Note that in this embodiment mode, description id made of a method for manufacturing a semiconductor device by performing plasma treatment on the semiconductor films 4603a and 4603b, or the gate insulating film 4604 in FIGS. 36A to 36C and oxidizing or nitriding the semiconductor films 4603a and 4603b, or the gate insulating film 4604, with reference to drawings.

As for an island-shaped semiconductor film which is formed over a substrate, description is made of the case where an edge portion of the island-shaped semiconductor film is provided with a shape close to a right-angled shape.

First, the island-shaped semiconductor films 4603a and 4603b are formed over the substrate 4601 (FIG. 37A). The island-shaped semiconductor films 4603a and 4603b can be provided by forming an amorphous semiconductor film, which is formed of a material including silicon (Si) as a main component (for example, $Si_xGe_{1-x}$, or the like) or the like, by using a sputtering method, an LPCVD method, a plasma CVD method, or the like over the insulating film 4602 which is formed in advance over the substrate 4601, by crystallizing the amorphous semiconductor film, and by etching a part of the semiconductor film. Note that crystallization of the amorphous semiconductor film can be performed by a crystallization method such as a laser crystallization method, a thermal crystallization method using RTA or an annealing furnace, a thermal crystallization method using a metal element which promotes crystallization, a method of a combination thereof, or the like. Note that in FIGS. 37A to 37D, edge portions of the island-shaped semiconductor films 4603a and 4603b are formed to have an angle of about 90 degrees (θ=85 to 100 degrees). Note that an angle θ denotes an angle of a semiconductor film side, which is formed by a side face of the island-shaped semiconductor film and the insulating film 4602.

Next, oxide films or nitride films 4621a and 4621b (hereinafter also referred to as an insulating film 4621a and an insulating film 4621b) are formed on surfaces of the semiconductor films 4603a and 4603b by oxidizing or nitriding the semiconductor films 4603a and 4603b by plasma treatment (FIG. 37B). For example, in the case where Si is used for the semiconductor films 4603a and 4603b, silicon oxide ($SiO_x$) or silicon nitride ($SiN_x$) is formed as the insulating film 4621a and the insulating film 4621b. In addition, the semiconductor films 4603a and 4603b may be oxidized by plasma treatment, and then may be nitrided by performing plasma treatment again. In that case, silicon oxide ($SiO_x$) is formed in contact with the semiconductor films 4603a and 4603b, and silicon nitride oxide ($SiN_xO_y$) (x>y) is formed on the surface of the silicon oxide. Note that in the case where the semiconductor film is oxidized by plasma treatment, the plasma treatment is performed in an oxygen atmosphere (for example, in an atmosphere of oxygen ($O_2$) and at least one of an inert gas (He, Ne, Ar, Kr, Xe), in an atmosphere of oxygen, hydrogen ($H_2$), and an inert gas, or in an atmosphere of dinitrogen mono-oxide and an inert gas). On the other hand, in the case the semiconductor film is nitrided by plasma treatment, the plasma treatment is performed in a nitrogen atmosphere (for example, in an atmosphere of nitrogen ($N_2$) and at least one of an inert gas (He, Ne, Ar, Kr, Xe), in an atmosphere of nitrogen, hydrogen, and an inert gas, or in an atmosphere of $NH_3$ and an inert gas). As an inert gas, Ar may be used, for example. Further, a gas mixed with Ar and Kr may be used. Therefore, the insulating films 4621a and 4621b include an inert gas (including as least one of He, Ne, Ar, Kr, Xe) which is used for plasma treatment. In the case where Ar is used, the insulating films 4621a and 4621b include Ar.

In addition, the plasma treatment is performed in the atmosphere containing the aforementioned gas, with conditions of a plasma electron density ranging from $1 \times 10^{11}$ to $1 \times 10^{13}$ $cm^{-3}$, and a plasma electron temperature ranging from 0.5 to 1.5 eV. Since the plasma electron density is high and the electron temperature in the vicinity of a treatment subject (here, the semiconductor films 4603a and 4603b) formed over the substrate 4601 is low, damage by plasma to the treatment subject can be prevented. In addition, since the plasma electron density is as high as $1 \times 10^{11}$ $cm^{-3}$ or more, an oxide film or a nitride film formed by oxidizing or nitriding the treatment subject by plasma treatment is superior in its uniformity of thickness and the like as well as being dense, as compared with a film formed by a CVD method, a sputtering method, or the like. Further, since the plasma electron temperature is as low as 1 eV or less, oxidation or nitridation can be performed at a lower temperature, compared with a conventional plasma treatment or thermal oxidation. For example, oxidation or nitridation can be performed sufficiently even when plasma treatment is performed at a temperature lower than a strain point of a glass substrate by 100 degrees or more. Note that as a frequency for generating plasma, a high frequency wave such as a microwave (2.45 GHz) can be used. Note that the plasma treatment is performed using the aforementioned conditions unless otherwise specified.

Next, the gate insulating film 4604 is formed so as to cover the insulating films 4621a and 4621b (FIG. 37C). The gate insulating film 4604 can be formed by a sputtering method, an LPCVD method, a plasma CVD method, or the like, and provided with a single-layer structure or a stacked-layer structure of an insulating film including oxygen or nitrogen, such as silicon oxide ($SiO_x$), silicon nitride ($SiN_x$), silicon oxynitride ($SiO_xN_y$) (x>y), or silicon nitride oxide ($SiN_xO_y$) (x>y). For example, in the case where Si is used for the semiconductor films 4603a and 4603b, and Si is oxidized by plasma treatment to form silicon oxide as the insulating films 4621a and 4621b on the surfaces of the semiconductor films 4603a and 4603b, silicon oxide ($SiO_x$) is formed as the gate insulating film over the insulating films 4621a and 4621b. In addition, in FIG. 37B, in the case where the insulating films 4621a and 4621b which are formed by oxidizing or nitriding the semiconductor films 4603a and 4603b by plasma treatment are sufficiently thick, the insulating films 4621a and 4621b can be used as gate insulating films.

Next, by forming the gate electrode 4605 and the like over the gate insulating film 4604, a semiconductor device including the n-channel transistor 4610a and the p-channel transistor 4610*b* which use the island-shaped semiconductor films 4603*a* and 4603*b* as channel regions can be manufactured (FIG. 37D).

In this manner, by oxidizing or nitriding the surfaces of the semiconductor films 4603*a* and 4603*b* by plasma treatment before providing the gate insulating film 4604 over the semiconductor films 4603*a* and 4603*b*, a short circuit between the gate electrode and the semiconductor films, which may be caused by a coverage defect of the gate insulating film 4604 at edge portions 4651*a* and 4651*b* of the channel regions, or the like can be prevented. That is, in the case where the edge portions of the island-shaped semiconductor films have an angle of about 90 degrees ($\theta$=85 to 100 degrees), the edges of the semiconductor films might not be properly covered with a gate insulating film when the gate insulating film is formed to cover the semiconductor film by a CVD method, a sputtering method, or the like. However, such a coverage defect and the like of the gate insulating film at the edges of the semiconductor films can be prevented by oxidizing or nitriding the surfaces of the semiconductor films by plasma treatment in advance.

In addition, in FIGS. 37A to 37D, the gate insulating film 4604 may be oxidized or nitrided by further performing plasma treatment after forming the gate insulating film 4604. In this case, an oxide film or a nitride film 4623 (hereinafter also referred to as an insulating film 4623) is formed on the surface of the gate insulating film 4604 (FIG. 38B) by oxidizing or nitriding the gate insulating film 4604 by performing plasma treatment to the gate insulating film 4604 which is formed to cover the semiconductor films 4603*a* and 4603*b* (FIG. 38A). The plasma treatment can be performed under similar conditions to those in FIG. 37B. In addition, the insulating film 4623 includes an inert gas which is used for the plasma treatment, and for example, includes Ar in the case where Ar is used for the plasma treatment.

In addition, in FIG. 38B, the gate insulating film 4604 is oxidized by performing plasma treatment in an oxygen atmosphere once, and after that, may be nitrided by plasma treatment in a nitrogen atmosphere. In this case, silicon oxide ($SiO_x$) or silicon oxynitride ($SiO_xN_y$) (x>y) is formed on the semiconductor films 4603*a* and 4603*b* side, and silicon nitride oxide ($SiN_xO_y$) (x>y) is formed to be in contact with the gate electrode 4605. Subsequently, by forming the gate electrode 4605 and the like over the insulating film 4623, a semiconductor device having the n-channel transistor 4610*a* and the p-channel transistor 4610*b* which have the island-shaped semiconductor films 4603*a* and 4603*b* as channel regions can be manufactured (FIG. 38C). In this manner, by oxidizing or nitriding the surface of the gate insulating film by plasma treatment, the surface of the gate insulating film can be modified to form a dense film. The insulating film obtained by plasma treatment is denser and has fewer defects such as a pinhole as compared with an insulating film formed by a CVD method or a sputtering method. Therefore, the characteristics of the transistors can be improved Note that although FIG. 38A to 38C show the case where the surfaces of the semiconductor films 4603*a* and 4603*b* are oxidized or nitrided by performing plasma treatment to the semiconductor films 4603*a* and 4603*b* in advance, a method where plasma treatment is performed after forming the gate insulating film 4604 without performing to the semiconductor films 4603*a* and 4603*b* may be employed. In this manner, by performing plasma treatment before forming the gate electrode, an exposed portion of the semiconductor film due to a coverage defect can be oxidized or nitrided even if a coverage defect such as breaking of a gate insulating film is caused at edge portions of the semiconductor film; therefore, a short circuit between the gate electrode and the semiconductor film, which is caused by a coverage defect of the gate insulating film at the edges of the semiconductor film, or the like can be prevented.

In this manner, even in the case where the island-shaped semiconductor films are formed to have edges with an angle of about 90 degrees, a short circuit between the gate electrodes and the semiconductor films, which is caused by a coverage defect of the gate insulating film at the edges of the semiconductor films, or the like can be prevented by oxidizing or nitriding the semiconductor films or the gate insulating film by plasma treatment.

Next, as for the island-shaped semiconductor films formed over the substrate, FIGS. 39A to 39D show the case where the edge portions of the island-shaped semiconductor films are provided with a tapered shape ($\theta$=30 to 85 degrees).

Figure 39A:
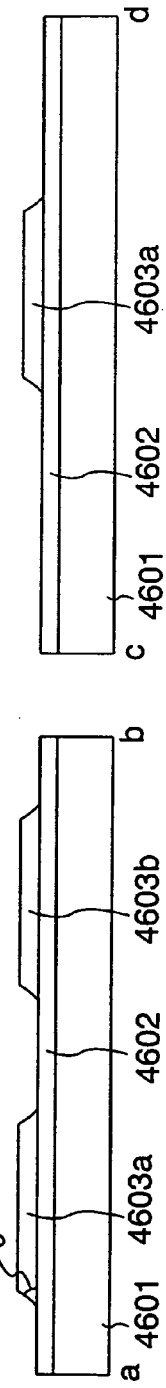
FIGS. 39A to 39D are diagrams showing a manufacturing flow of a display device of the invention.

First, the island-shaped semiconductor films 4603*a* and 4603*b* are formed over the substrate 4601 (FIG. 39A). The island-shaped semiconductor films 4603*a* and 4603*b* can be provided by forming an amorphous semiconductor film, which is formed of a material including silicon (Si) as a main component (for example, $Si_xGe_{1-x}$, or the like) and the like, by using a sputtering method, an LPCVD method, a plasma CVD method, or the like over the insulating film 4602 which is formed in advance over the substrate 4601, by crystallizing the amorphous semiconductor film by a crystallization method such as a laser crystallization method, a thermal crystallization method using RTA or an annealing furnace, a thermal crystallization method using a metal element which promotes crystallization, or a method of a combination thereof, and by etching and removing a part of the semiconductor film. Note that in FIGS. 39A to 39D, the edge portions of the island-shaped semiconductor films 4603*a* and 4603*b* are provided to have a tapered shape ($\theta$=30 to 85 degrees).

Figure 39B:
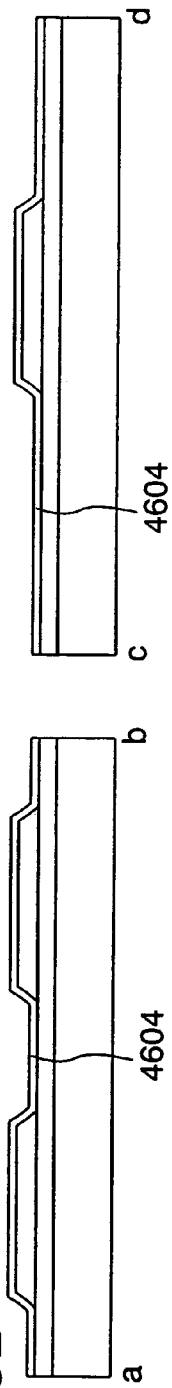

Next, the gate insulating film 4604 is formed so as to cover the semiconductor films 4603*a* and 4603*b* (FIG. 39B). The gate insulating film 4604 can be provided to have a single-layer structure or a stacked-layer structure of an insulating film containing oxygen or nitrogen, such as silicon oxide ($SiO_x$), silicon nitride ($SiN_x$), silicon oxynitride ($SiO_xN_y$) (x>y), or silicon nitride oxide ($SiN_xO_y$) (x>y) by a sputtering method, an LPCVD method, a plasma CVD method, or the like.

Figure 39C:
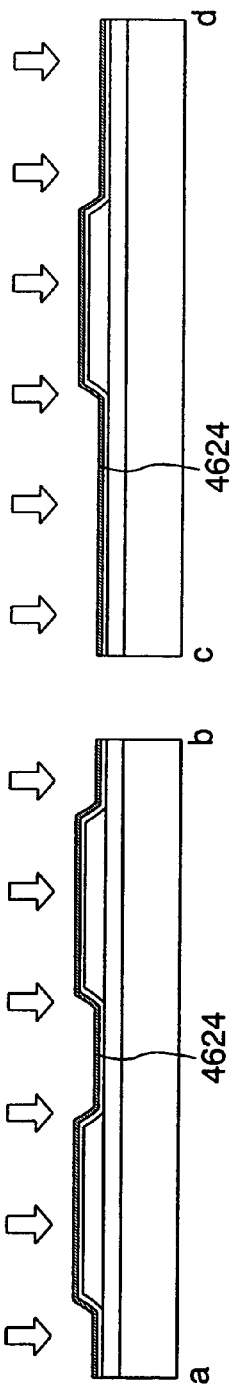

Next, an oxide film or a nitride film 4624 (hereinafter also referred to as an insulating film 4624) is formed on the surface of the gate insulating film 4604 by oxidizing or nitriding the gate insulating film 4604 by plasma treatment (FIG. 39C). The plasma treatment can be performed under similar conditions to the aforementioned description. For example, in the case where silicon oxide ($SiO_x$) or silicon oxynitride ($SiO_xN_y$) (x>y) is used as the gate insulating film 4604, the gate insulating film 4604 is oxidized by performing plasma treatment in an oxygen atmosphere, thereby a dense insulating film with few defects such as a pinhole can be formed on the surface of the gate insulating film in comparison with a gate insulating film formed by a CVD method, a sputtering method, or the like. On the other hand, if the gate insulating film 4604 is nitrided by plasma treatment in a nitrogen atmosphere, silicon nitride oxide ($SiN_xO_y$) (x>y) can be provided as the insulating film 4624 on the surface of the gate insulating film 4604. Further, the gate insulating film 4604 is oxidized by performing plasma treatment in an oxygen atmosphere once, and after that, may be nitrided by plasma treatment in a nitrogen atmosphere. In addition, the insulating film 4624 includes an inert gas which is used for the plasma treatment, and for example, includes Ar in the case where Ar is used.

Figure 39D:
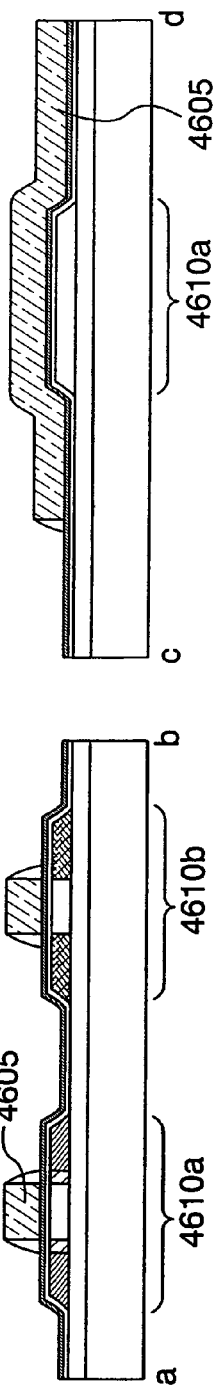

Next, by forming the gate electrode 4605 and the like over the gate insulating film 4604, a semiconductor device including the n-channel transistor 4610a and the p-channel transistor 4610b which use the island-shaped semiconductor films 4603a and 4603b as channel regions can be manufactured (FIG. 39D).

In this manner, by performing plasma treatment to the gate insulating film, the insulating film formed of an oxide film or a nitride film can be provided on the surface of the gate insulating film, and the surface of the gate insulating film can be modified. The insulating film obtained by oxidation or nitridation with plasma treatment is denser and has fewer defects such as a pinhole as compared with a gate insulating film formed by a CVD method or a sputtering method; therefore, the characteristics of the transistors can be improved. In addition, while a short circuit between the gate electrodes and the semiconductor films, which is caused by a coverage defect of the gate insulating film at the edges of the semiconductor films, or the like can be suppressed by forming the semiconductor films to have a tapered shape, a short circuit or the like between the gate electrodes and the semiconductor films can be prevented even more effectively by performing plasma treatment after forming the gate insulating film.

Next, description is made of a manufacturing method of a semiconductor device which is different from that in FIGS. 39A to 39D with reference to FIGS. 40A to 40D. Specifically, a case is shown where plasma treatment is selectively performed to semiconductor films having a tapered shape.

First, the island-shaped semiconductor films 4603a and 4603b are formed over the substrate 4601 (FIG. 40A). The island-shaped semiconductor films 4603a and 4603b can be provided by forming an amorphous semiconductor film over the insulating film 4602 which is formed over the substrate 4601 in advance, by a sputtering method, an LPCVD method, a plasma CVD method, or the like, using a material containing silicon (Si) as a main component (e.g., $Si_xGe_{1-x}$) or the like, crystallizing the amorphous semiconductor film and providing resists 4625a and 4625b used as masks for etching the semiconductor film selectively. Note that crystallization of the amorphous semiconductor film can be performed by a laser crystallization method, a thermal crystallization method using RTA or an annealing furnace, a thermal crystallization method using metal elements which promote crystallization, or a combination of these methods.

The edge portions of the island-shaped semiconductor films 4603a and 4603b are selectively oxidized or nitrided by plasma treatment before removing the resists 4625a and 4625b which are used for etching the semiconductor films, thereby an oxide film or a nitride film 4626 (hereinafter also referred to as an insulating film 4626) is formed on each edge portion of the semiconductor films 4603a and 4603b (FIG. 40B). The plasma treatment is performed under the aforementioned conditions. In addition, the insulating film 4626 contains an inert gas which is used for the plasma treatment.

The gate insulating film 4604 is formed to cover the semiconductor films 4603a and 4603b after the resist 4625a and 4625b are removed (FIG. 40C). The gate insulating film 4604 can be formed in a similar manner to the above description.

By forming the gate electrodes 4605 and the like over the gate insulating film 4604, a semiconductor device having the n-channel transistor 4610a and the p-channel transistor 4610b which have the island-shaped semiconductor films 4603a and 4603b as channel regions can be manufactured (FIG. 40D).

When the edge portions of the semiconductor films 4603a and 4603b have tapered shapes, edge portions 4652a and 4652b of the channel regions which are formed in a part of the semiconductor films 4603a and 4603b are also tapered, thereby the thickness of the semiconductor films and the gate insulating film in that portion are different from that in a central portion, which may adversely affect the characteristics of the transistors. However, such an effect on the transistors due to the edge portions of the channel regions can be reduced by forming insulating films on the edge portions of the semiconductor films, which are formed by selectively oxidizing or nitriding the edge portions of the channel regions by plasma treatment here.

Although FIGS. 40A to 40D show an example where only the edge portions of the semiconductor films 4603a and 4603b are oxidized or nitrided by plasma treatment, the gate insulating film 4604 can also be oxidized or nitrided by plasma treatment as shown in FIGS. 39A to 39D (FIG. 42A).

Next, description is made of a manufacturing method of a semiconductor device which is different from the aforementioned manufacturing method with reference to FIGS. 41A to 41D. Specifically, a case is shown where plasma treatment is performed to semiconductor films with tapered shapes.

Figure 41A:
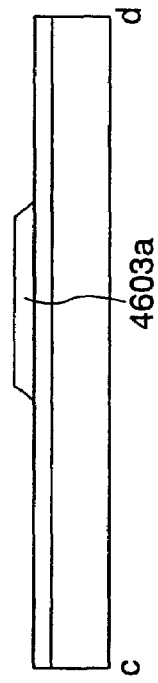
FIGS. 41A to 41D are diagrams showing a manufacturing flow of a display device of the invention.

First, the island-shaped semiconductor films 4603a and 4603b are formed over the substrate 4601 in a similar manner to the above description (FIG. 41A).

Figure 41B:
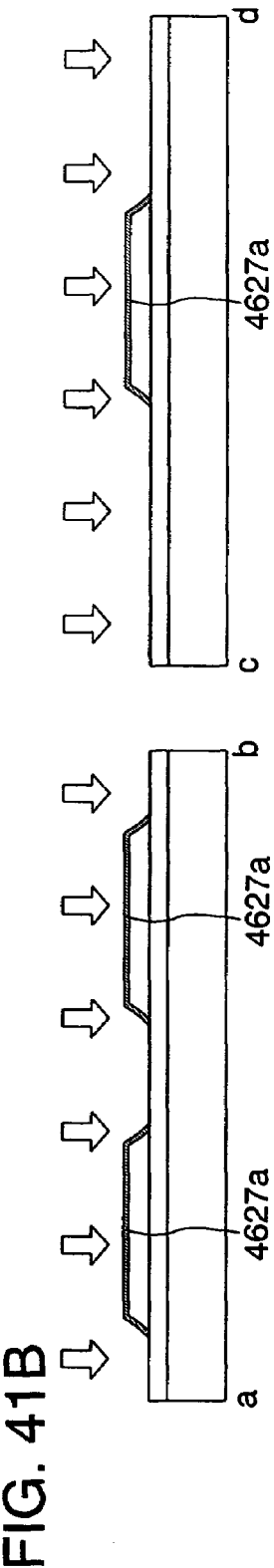

The semiconductor films 4603a and 4603b are oxidized or nitrided by plasma treatment, thereby forming oxide films or nitride films (hereinafter also referred to as insulating films 4627a and 4627b) on the surfaces of the semiconductor films 4603a and 4603b respectively (FIG. 41B). The plasma treatment can be similarly performed under the aforementioned conditions. For example, when Si is used for the semiconductor films 4603a and 4603b, silicon oxide ($SiO_x$) or silicon nitride ($SiN_x$) is formed as the insulating films 4627a and 4627b. In addition, after oxidizing the semiconductor films 4603a and 4603b by plasma treatment, plasma treatment may be performed again to the semiconductor films 4603a and 4603b, so as to be nitrided. In this case, silicon oxide ($SiO_x$) or silicon oxynitride ($SiO_xN_y$) (x>y) is formed on the semiconductor films 4603a and 4603b, and silicon nitride oxide ($SiN_xO_y$) (x>y) is formed on the surface of the silicon oxide. Therefore, the insulating films. 4627a and 4627b contain an inert gas which is used for the plasma treatment. Note that the edge portions of the semiconductor films 4603a and 4603b are simultaneously oxidized or nitrided by performing plasma treatment.

Figure 41C:
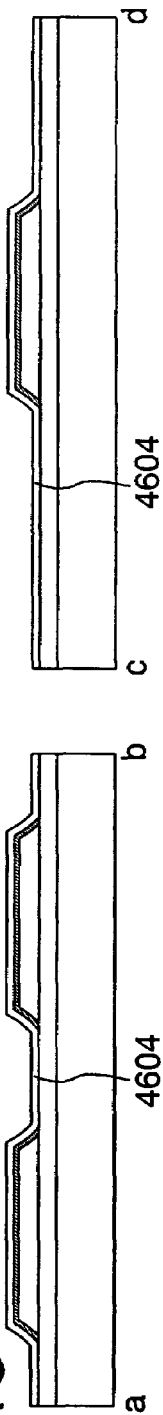

The gate insulating film 4604 is formed to cover the insulating films 4627a and 4627b (FIG. 41C). The gate insulating film 4604 can be formed to have a single-layer structure or a stacked-layer structure of an insulating film containing oxygen or nitrogen, such as silicon oxide ($SiO_x$), silicon nitride ($SiN_x$), silicon oxynitride ($SiO_xN_y$) (x>y), or silicon nitride oxide ($SiN_xO_y$) (x>y) by a sputtering method, an LPCVD method, a plasma CVD method, or the like. For example, when Si is used for the semiconductor films 4603a and 4603b, and the surfaces of the semiconductor films 4603a and 4603b are oxidized by plasma treatment to form silicon oxide as the insulating films 4627a and 4627b, silicon oxide ($SiO_x$) is formed as a gate insulating film over the insulating films 4627a and 4627b.

Figure 41D:
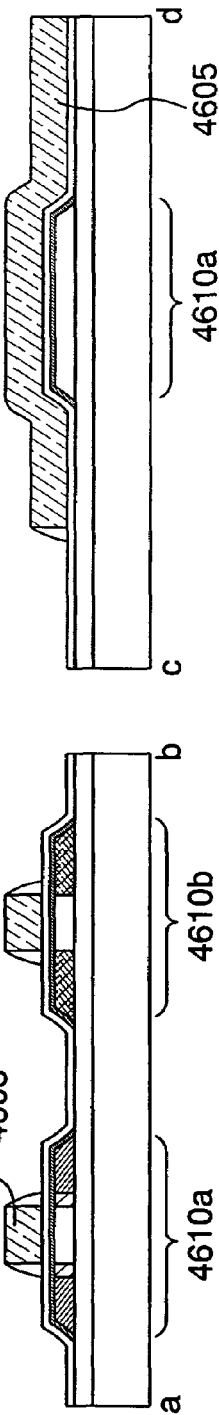

By forming the gate electrodes 4605 and the like over the gate insulating film 4604, a semiconductor device having the n-channel transistor 4610a and the p-channel transistor 4610b which have the island-shaped semiconductor films 4603a and 4603b as channel regions can be manufactured (FIG. 41D).

When the edge portions of the semiconductor films have tapered shape, edge portions 4653a and 4653b of the channel regions which are formed in a part of the semiconductor films are also tapered, which may adversely affect the characteristics of the semiconductor elements. The semiconductor films are oxidized or nitrided by plasma treatment, and accordingly the edge portions of the channel regions are also oxidized or nitrided; therefore, such an effect on the semiconductor elements can be reduced.

Although FIGS. 41A to 41D show an example where only the semiconductor films 4603a and 4603b are oxidized or nitrided by plasma treatment, it is needless to say that the gate insulating film 4604 can be oxidized or nitrided by plasma treatment as shown in FIGS. 39A to 39D (FIG. 42B). In this case, after oxidizing the gate insulating film 4604 by plasma treatment under an oxygen atmosphere, plasma treatment may be performed again to the gate insulating film 4604 so as to be nitrided. In such a case, silicon oxide ($SiO_x$) or silicon oxynitride ($SiO_xN_y$) (x>y) is formed on the semiconductor films 4603a and 4603b, and silicon nitride oxide ($SiN_xO_y$) (x>y) is formed to be in contact with the gate electrodes 4605.

Figure 43A:
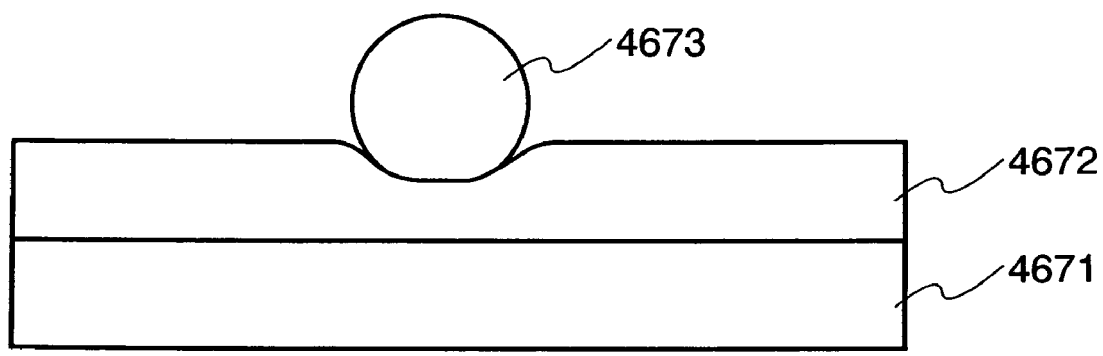
FIGS. 43A and 43B are cross sectional views showing a display device of the invention.
Figure 43B:
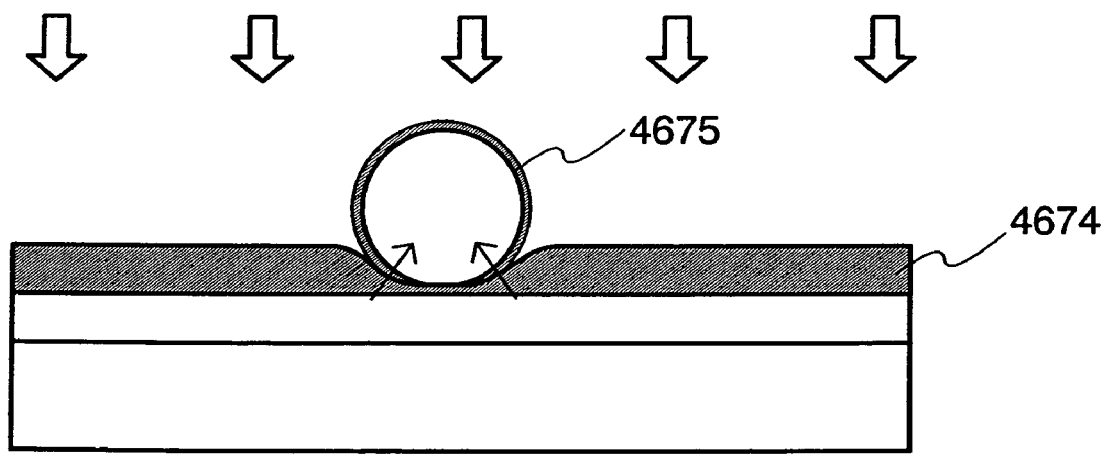

In addition, by performing plasma treatment in the aforementioned manner, impurities such as dust attached to the semiconductor film and the insulating film can be easily removed. In general, dust (also referred to as a particle) is sometimes attached to the film formed by a CVD method, a sputtering method, or the like. For example, as shown in FIG. 43A, dust 4673 is sometimes formed over an insulating film 4672 formed by a CVD method, a sputtering method, or the like, which is formed over a film 4671 such as an insulating film, a conductive film, or a semiconductor film. Even in such a case, the insulating film 4672 is oxidized or nitrided by the plasma treatment and an oxide film or a nitride film 4674 (hereinafter also referred to as an insulating film 4674) is formed over the surface of the insulating film 4672. As for the insulating film 4674, a portion under the dust 4673 as well as a portion in which the dust 4673 does not exist is oxidized or nitrided, and thus the volume of the insulating film 4674 is increased. The surface of the dust 4673 is also oxidized or nitrided by the plasma treatment to form an insulating film 4675, and as a result, the volume of the dust 4673 is also increased (FIG. 43B).

At this time, the dust 4673 can be easily removed from the surface of the insulating film 4674 by simple cleaning such as brush cleaning. In this manner, by performing plasma treatment, even minute dust attached to the insulating film or a semiconductor film can be removed easily. Note that this effect is obtained by performing plasma treatment, and can be applied to other embodiment modes as well as this embodiment mode.

As described above, by modifying the surface of the semiconductor film or the gate insulating film by oxidizing or nitriding by plasma treatment, a dense insulating film with good film quality can be formed. In addition, dust and the like attached to the surface of the insulating film can be removed easily by cleaning. Consequently, even when the insulating film is formed to be thinner, a defect such as a pinhole can be avoided, and miniaturization and higher performance of a semiconductor element such as a transistor can be realized.

Although this embodiment mode shows an example where plasma treatment is performed to the semiconductor films 4603a and 4603b, or the gate insulating film 4604 shown in FIGS. 36A to 36C so as to oxidize or nitride the semiconductor films 4603a and 4603b, or the gate insulating film 4604, a layer to be oxidized or nitrided by plasma treatment is not limited to these. For example, plasma treatment may be performed to the substrate 4601 or the insulating film 4602, or to the insulating film 4606 or the insulating film 4607.

Note that description in this embodiment can be implemented freely in combination with those in Embodiment Modes 1 to 10.

Embodiment Mode 12

In this embodiment mode, description is made of a pixel structure included in a display device with reference to FIGS. 49A to 49F. Each of pixels shown in FIGS. 49A to 49F includes a transistor 490, a liquid crystal element 491, and a storage capacitor 492. A first electrode (one of a source electrode and a drain electrode) of the transistor 490 is connected to a source signal line 500. A second electrode (the other of the source electrode and the drain electrode) thereof is connected to a pixel electrode of the liquid crystal element 491 and a first electrode of the storage capacitor 492. A gate electrode of the transistor 490 is connected to a gate line 501. A second electrode of the storage capacitor 492 is connected to a capacitor line 502. Note that the liquid crystal element includes the pixel electrode, a liquid crystal layer, an opposite electrode 493 and a cell gap adjusting film.

An analog voltage signal (video signal) is supplied to the source signal line 500. Note that the video signal may be a digital voltage signal or a current signal.

An H-level or L-level voltage signal (video signal) is supplied to the gate line 501. Note that in the case of using an n-channel transistor as the transistor 490, the H level voltage signal is a voltage which can turn on the transistor 490, and the L level voltage signal is a voltage which can turn off the transistor 490. On the other hand, in the case of using a p-channel transistor as the transistor 490, the L level voltage signal is a voltage which can turn on the transistor 490, and the H level voltage signal is a voltage which can turn off the transistor 490.

Note that a certain power supply voltage is applied to the capacitor line 502. Note that a pulsing signal may be supplied to the capacitor line 502.

Figure 49C:
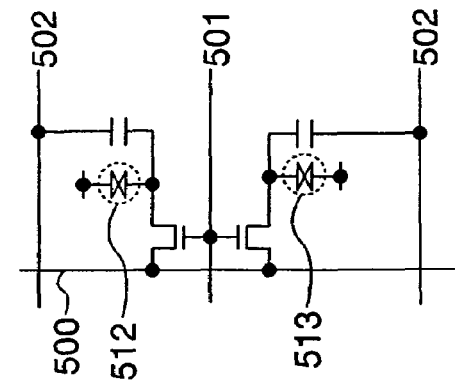
FIGS. 49A to 49F are diagrams showing a structure example of a pixel to which the invention is applied.
Figure 49B:
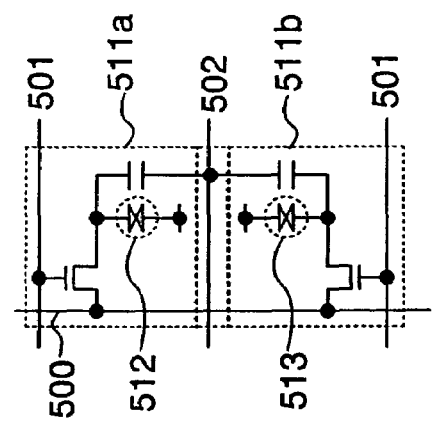
Figure 49A:
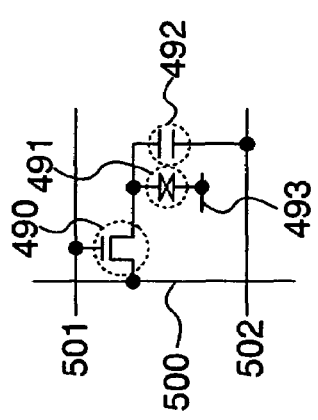

Description is made of an operation of a pixel in FIG. 49A. Here, description is made of the case using an n-channel transistor as the transistor 490. First, when the gate line 501 becomes H level, the transistor 490 is turned on, and the video signal is supplied to a first electrode of the liquid crystal element 491 and the first electrode of the storage capacitor 492 from the source signal line 500 thorough the transistor 490 which is in an on state. A potential difference between a potential of the capacitor line 502 and a potential of the video signal is held by the storage capacitor 492.

Next, when the gate line 501 becomes L level, the transistor 490 is turned off, and the source signal line 500 and the first electrode of the liquid crystal element 491 and the first electrode of the storage capacitor 492 are electrically disconnected. However, the potential difference between the potential of the capacitor line 502 and the potential of the video signal is held by the storage capacitor 492; therefore, a potential of the first electrode of the storage capacitor 492 can be held as similar potential as the video signal. Therefore, a potential of the first electrode of the liquid crystal electrode 491 can be held to be equal to that of the video signal.

As described above, luminance can be controlled depending on transmittance of the liquid crystal element 491 in accordance with the video signal.

Note that although not shown in the drawings, the storage capacitor 492 is not necessarily required if the liquid crystal element 491 includes a capacitance component enough to hold the video signal.

In addition, the liquid crystal element 491 is a semi-transmission type liquid crystal element including the reflection region and the transmission region. In the reflection region and the transmission region, cell gaps are different depending on a cell gap adjusting film. By using the cell gap adjusting film, a viewing angle can be increased when displaying an image and deterioration of image quality due to disorder of orientation of the liquid crystal can be controlled; therefore, a semi-transmission type liquid crystal display device with high display quality can be obtained.

In addition, as shown in FIG. 49B, one pixel may be formed by two sub-pixels 511a and 511b. Here, the capacitor line 502 is commonly used by the sub-pixel 511a and the sub-pixel 511b. Further, both a liquid crystal element 512 and a liquid crystal element 513 may be the aforementioned liquid crystal elements 491, that is, the semi-transmission type liquid crystal elements including the reflection region and the transmission region, or either one may be.

As described above, by dividing one pixel into sub-pixels, a different voltage can be applied to each sub-pixel. Therefore, area gray scale display can be performed, and a viewing angle can be further increased by using a difference of orientation of the liquid crystal in each sub-pixel.

In addition, the gate line 501 may be used as a common wire as shown in FIG. 49C instead of using the capacitor line 502 as a common wire between sub-pixels as shown in FIG. 49B. Further, the gate line 501 and the capacitor line 502 may be used as common wires between the sub-pixels, and the source signal lines 500a and 500b may be provided in each sub-pixel.

Figure 49F:
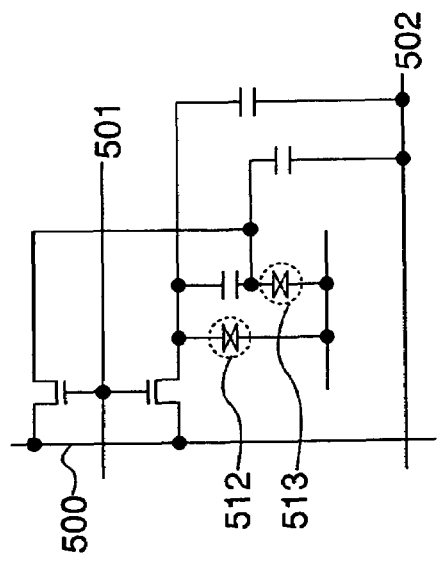
Figure 49E:
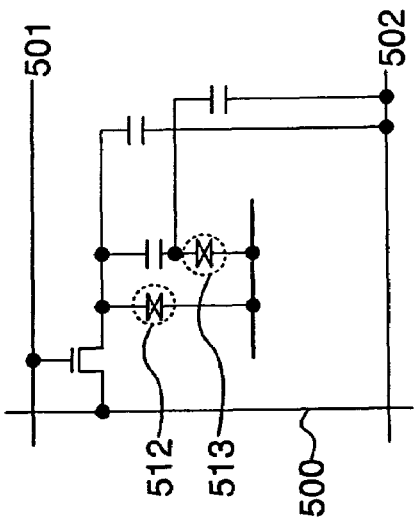
Figure 49D:
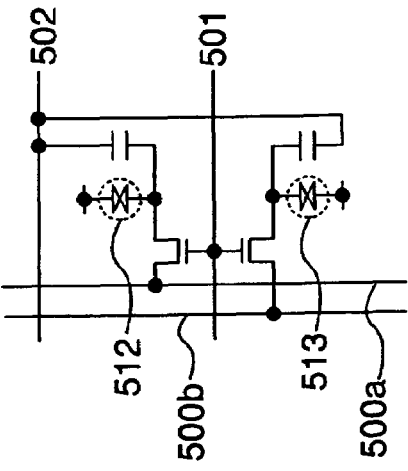

In addition, a structure where a pixel includes two liquid crystal elements 512 and 513 as shown in FIGS. 49E and 49F instead of dividing one pixel into a plurality of sub-pixels may be used.

Note that description in this embodiment can be implemented freely in combination with those in Embodiment Modes 1 to 11. In addition, a pixel structure of a display device of the invention is not limited to those described above.

Embodiment Mode 13

Figure 44:
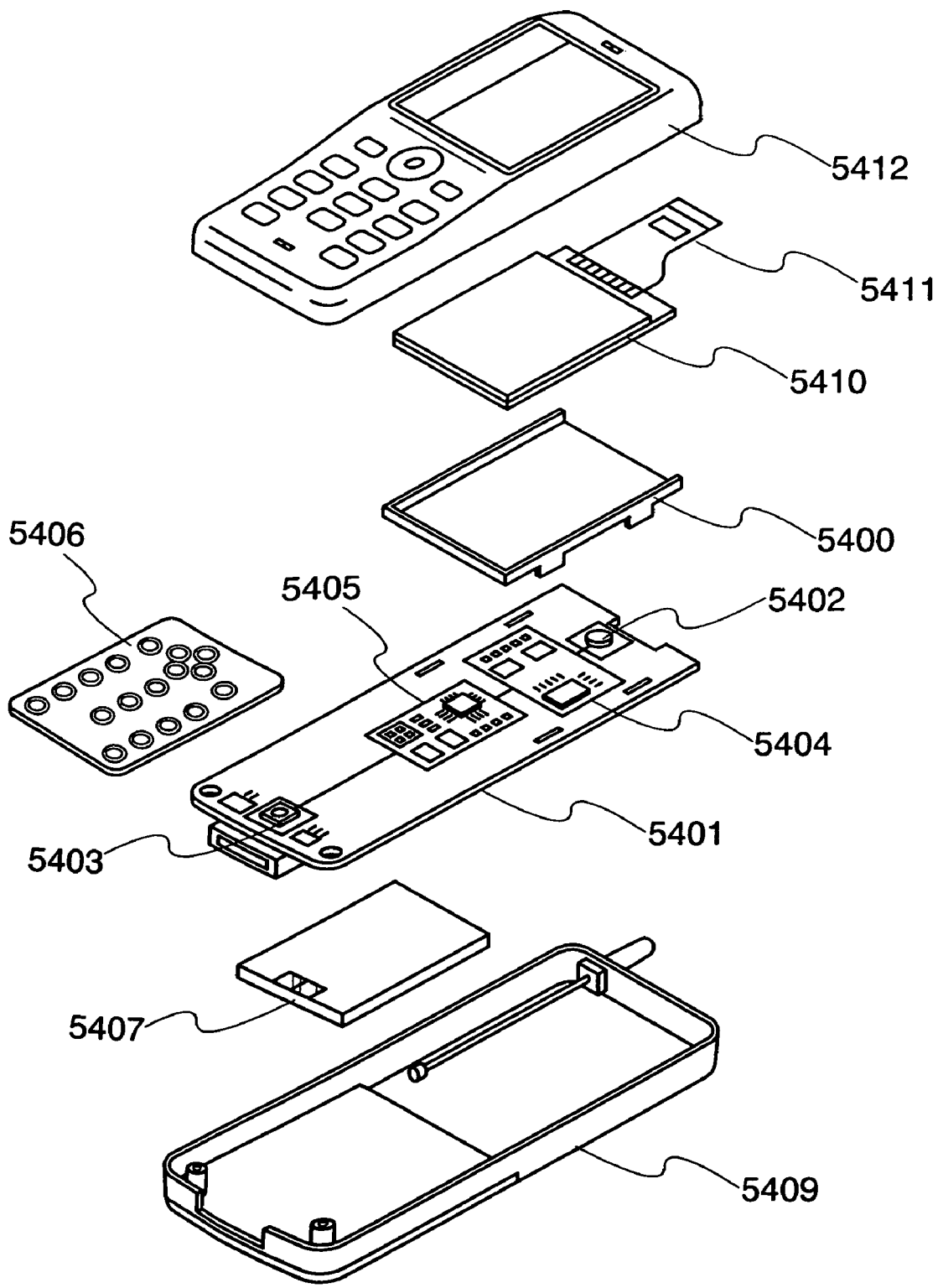
FIG. 44 is a diagram showing an electronic apparatus to which the invention is applied.

FIG. 44 shows a structural example of a portable phone including a display portion for which a display device of the invention and the display device using the driving method thereof are employed.

A display panel 5410 is detachably incorporated into a housing 5400. A shape and size of the housing 5400 can be appropriately changed in accordance with a size of the display panel 5410. The housing 5400 which fixes the display panel 5410 is fit into a printed board 5401 and assembled as a module.

The display panel 5410 is connected to the printed board 5401 through an FPC 5411. A speaker 5402, a microphone 5403, a transmission/reception circuit 5404, and a signal processing circuit 5405 including a CPU, a controller and the like are formed over the printed board 5401. Such a module is combined with an input unit 5406 and a battery 5407, and stored using a chassis 5409 and a chassis 5412. A pixel portion of the display panel 5410 is provided so as to be seen from an open window formed in the housing 5412.

The display panel 5410 may be formed in such a manner that a pixel portion and a part of peripheral driver circuits (a driver circuit with a low operating frequency among a plurality of driver circuits) are formed over a substrate by using TFTs, while another part of the peripheral driver circuits (a driver circuit with a high operating frequency among the plurality of driver circuits) is formed over an IC chip, which may be mounted on the display panel 5410 by COG (Chip On Glass). Alternatively, the IC chip may be connected to a glass substrate by TAB (Tape Automated Bonding) or by using a printed board. Note that FIGS. 45A and 45B show examples of a structure of a display panel, in which a part of peripheral driver circuits and a pixel portion are formed over a substrate, while another part of the peripheral driver circuits is formed in an IC chip to be mounted on the substrate by COG or the like.

Figure 45A:
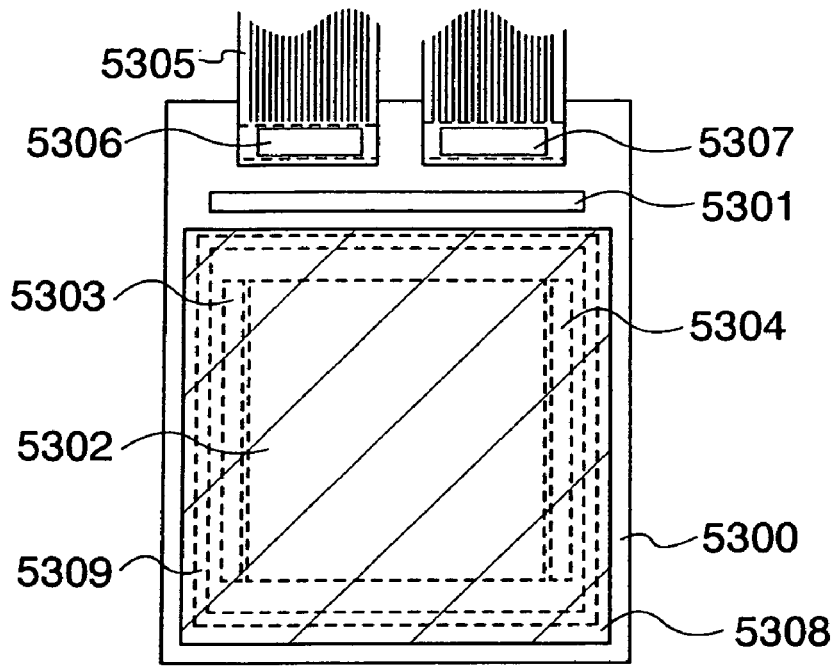
FIGS. 45A and 45B are diagrams showing an electronic apparatus to which the invention is applied.
Figure 45B:
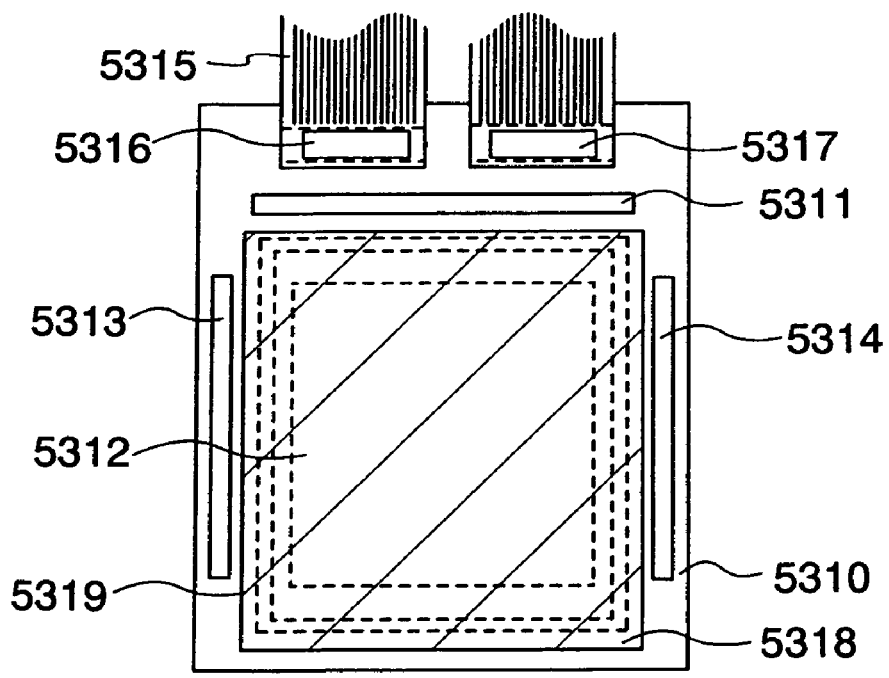

In FIG. 45A, a pixel portion 5302 and peripheral driver circuits (a first scan line driver circuit 5303 and a second scan line driver circuit 5304) may be formed over a substrate 5300 of a display panel, and a signal line driver circuit 5301 may be formed over the IC chip and mounted on the display panel by COG or the like. Note that the pixel portion 5302 and the peripheral driver circuits which are formed integrally over the substrate are sealed by using a sealing member 5309 to bond a sealing substrate 5308 and the substrate 5300 together. In addition, IC chips (semiconductor chips formed of a memory circuit, a buffer circuit, and the like) 5306 and 5307 may be mounted over a connection portion of an FPC 5305 and the display panel by COG or the like. Note that although only an FPC is shown in the drawings, a printed wiring board (PWB) may be mounted on the FPC.

As described above, only a signal line driver circuit, which is required to operate with high speed, is formed over an IC chip by using a CMOS or the like; therefore, a reduction in power consumption can be achieved. In addition, by using a semiconductor chip such as a silicon wafer as an IC chip, higher-speed operation and lower power consumption can be achieved. Further, the first scan line driver circuit 5303 and the second scan line driver circuit 5304 are formed integrally with the pixel portion 5302, and thereby cost reduction can be achieved. In addition, an IC chip formed by a functional circuit (a memory and a buffer) is mounted on a connection portion of the FPC 5305 and the substrate 5300, and thereby an area of the substrate can be used effectively.

In order to further reduce power consumption, all peripheral driver circuits may be formed over an IC chip, and the IC chip may be mounted on the display panel by COG or the like. For example, as shown in FIG. 45B, a pixel portion 5312 may be formed over a substrate 5310. A signal line driver circuit 5311, a first scan line driver circuit 5313 and a second scan line driver circuit 5314 may be formed over an IC chip and mounted on the display panel by COG or the like. Note that an FPC 5315, an IC chip 5316, an IC chip 5317, a sealing substrate 5318, and a sealing member 5319 in FIG. 45B correspond to the FPC 5305, the IC chip 5306, the IC chip 5307, the sealing substrate 5308, and the sealing member 5309, respectively.

By using such a structure, power consumption of the display device can be reduced, and operation time of a portable phone per charge can be extended. In addition, cost reduction of a portable phone can be achieved.

In addition, by converting an impedance of a signal set to a scan line or a signal line by a buffer, time for writing a signal to pixels in one row can be shortened. Therefore, a high-definition display device can be provided.

In addition, in order to further reduce power consumption, a pixel portion is formed over a substrate with TFTs, and all the peripheral circuits are formed over an IC chip, which may be mounted on the display panel by COG (Chip On Glass) or the like.

By using the display device of the invention, a clear and high-contrast image can be provided.

Note that the structure shown in this embodiment mode is an example of a mobile phone; therefore, the display device of the invention is not limited to the mobile phone with the aforementioned structure, and can be applied to mobile phones with various structures.

Note that description in this embodiment mode can be implemented freely in combination with those in Embodiment Modes 1 to 12.

Embodiment Mode 14

Figure 46:
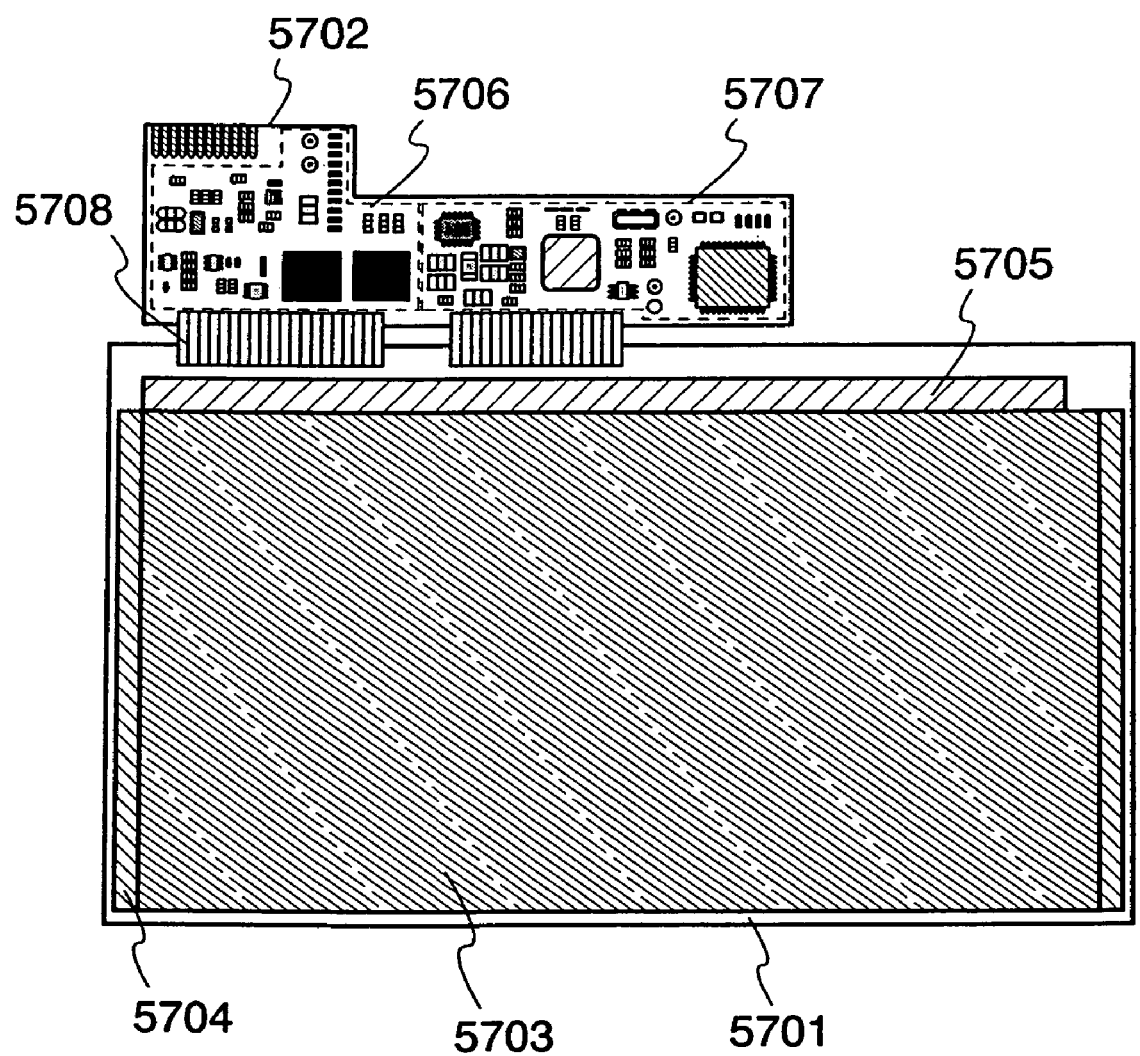
FIG. 46 is a diagram showing an electronic apparatus to which the invention is applied.

FIG. 46 shows a liquid crystal module combined with a display panel 5701 and a circuit substrate 5702. The display panel 5701 includes a pixel portion 5703, a scan line driver circuit 5704 and a signal line driver circuit 5705. A control circuit 5706, a signal dividing circuit 5707, and the like are formed over the circuit substrate 5702, for example. The display panel 5701 and the circuit substrate 5702 are connected by a connection wire 5708. An FPC or the like can be used for the connection wire.

The order of appearance of subframes and the like are controlled by mainly the control circuit 5706.

The display panel 5701 may be formed in such a manner that a pixel portion and a part of peripheral driver circuits (a driver circuit with a low operating frequency among a plurality of driver circuits) are formed over a substrate by using TFTs, while another part of the peripheral driver circuits (a driver circuit with a high operating frequency among the plurality of driver circuits) is formed over an IC chip, which may be mounted on the display panel 5701 by COG (Chip On Glass) or the like. Alternatively, the IC chip may be mounted on the display panel 5701 by TAB (Tape Automated Bonding) or by using a printed board. Note that FIG. 45A shows an example of a structure in which a part of peripheral driver circuits and a pixel portion are formed over a substrate, while another part of the peripheral driver circuits is formed in an IC chip to be mounted on the substrate by COG or the like. By using such a structure, power consumption of the display device can be reduced, and operation time of a portable phone per charge can be extended. In addition, cost reduction of a portable phone can be achieved.

In addition, by converting an impedance of a signal set to a scan line or a signal line by a buffer, time for writing a signal to pixels in one row can be shortened. Therefore, a high-definition display device can be provided.

In addition, in order to further reduce power consumption, a pixel portion is formed over a glass substrate with TFTs, and all the signal line driver circuits are formed over an IC chip, which is mounted on the display panel by COG (Chip On Glass).

Note that it is preferable that a pixel portion is formed over a substrate by using TFTs, and all the peripheral driver circuits are formed over an IC chip, which may be mounted on the display panel by COG (Chip On Glass). Note that FIG. 45B shows an example of a structure in which a pixel portion is formed over a substrate, and an IC chip over which signal line driver circuit is formed is mounted on the substrate by COG or the like.

Figure 47:
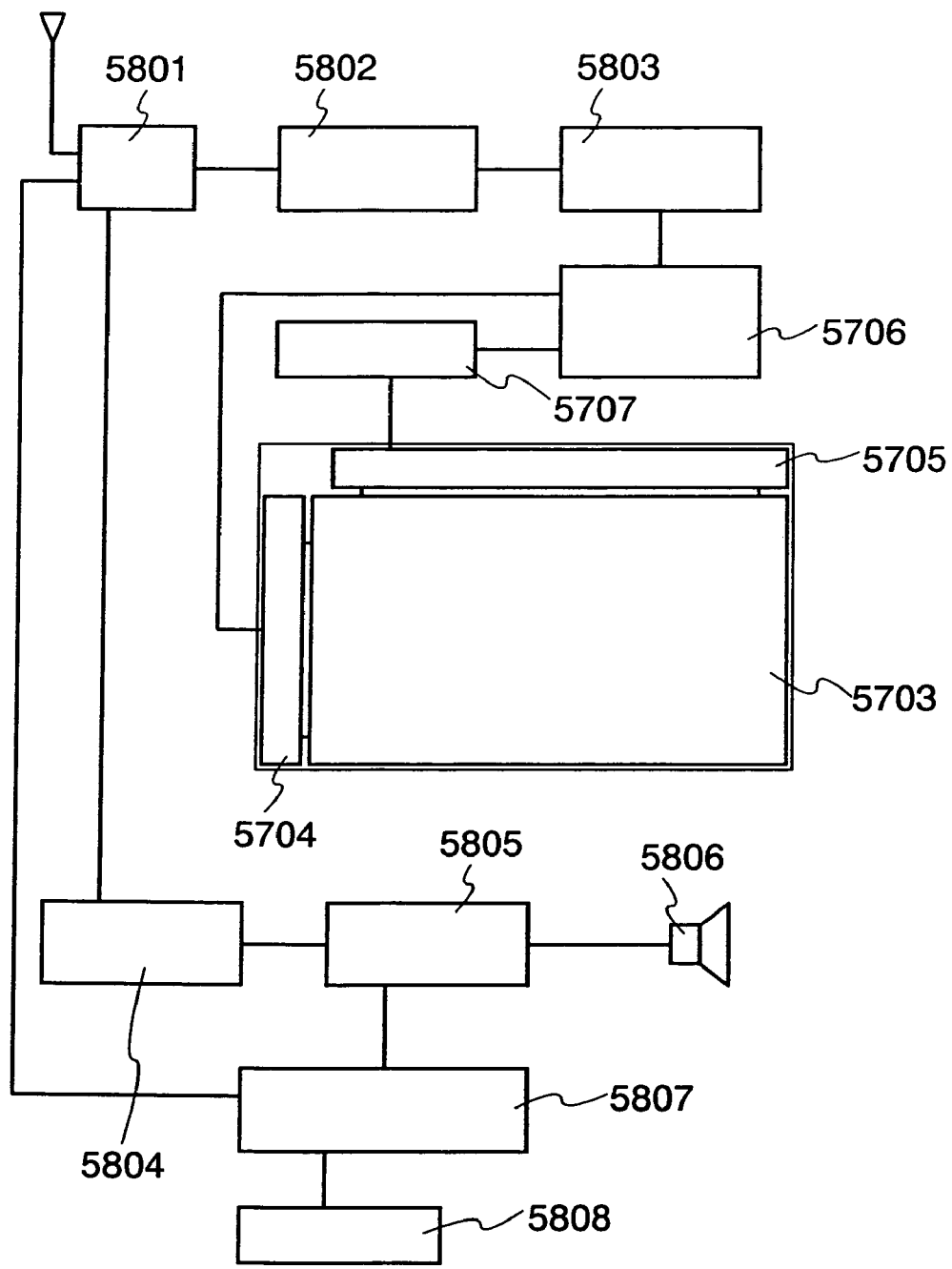
FIG. 47 is a diagram showing an electronic apparatus to which the invention is applied.

A liquid crystal television receiver can be completed with the liquid crystal module. FIG. 47 is a block diagram showing a main structure of the liquid crystal television receiver. A tuner 5801 receives a video signal and an audio signal. The video signal is processed by a video signal amplifier circuit 5802, a video signal processing circuit 5803, which converts a signal outputted from the video signal amplifier circuit 5802 to a color signal corresponding to each color of red, green and blue, and a control circuit 5706 which converts the video signal to input specifications of a driver circuit. The control circuit 5706 outputs signals to each of a scan line side and a signal line side. When performing digital drive, the signal dividing circuit 5707 may be provided on the signal line side so that the inputted digital signal is divided into m signals to be supplied.

Among the signals received by the tuner 5801, an audio signal is transmitted to an audio signal amplifier circuit 5804, and an output thereof is supplied to a speaker 5806 through the audio signal processing circuit 5805. A control circuit 5807 receives control data on a receiving station (receive frequency) and volume from an input portion 5808, and transmits the signal to the tuner 5801 and the audio signal processing circuit 5805.

A television receiver can be completed by incorporating a liquid crystal module into a housing. A display portion is formed by the liquid crystal module. In addition, a speaker, a video input terminal, and the like are provided appropriately.

It is needless to say that the invention is not limited to a television receiver, and can be applied to various uses such as a monitor of a personal computer, an information display board at a train station or an airport, and an advertising display board on the street, specifically as a large-area display medium.

As described above, by using the display device of the invention, a clear and high-contrast image can be provided.

Note that description in this embodiment mode can be implemented freely in combination with those in Embodiment Modes 1 to 13.

Embodiment Mode 15

The invention can be applied to various electronic apparatuses, and specifically to a display portion of an electronic apparatus. As for such an electronic apparatus, a camera such as a video camera and a digital camera, a goggle type display, a navigation system, an audio reproducing device (a car audio, an audio component stereo, and the like), a computer, a game machine, a portable information terminal (a mobile computer, a portable phone, a portable game machine, an electronic book, and the like), an image reproducing device provided with a recording medium (specifically, a device for reproducing a recording medium such as a digital versatile disc (DVD) and having a display for displaying the reproduced image), and the like are taken for example.

Figure 48A:
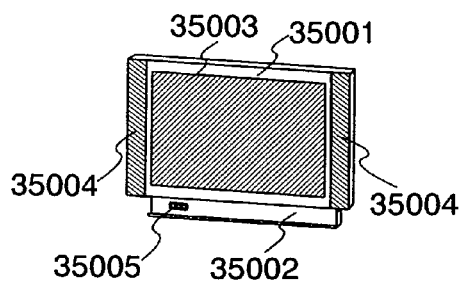
FIGS. 48A to 48H are diagrams showing an electronic apparatus to which the invention is applied.
Figure 48B:
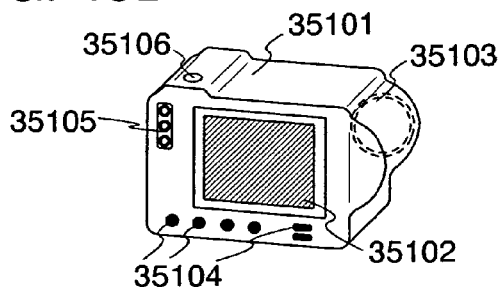

FIG. 48A shows a display device, which includes a chassis 35001, a supporting base 35002, a display portion 35003, speaker portions 35004, a video input terminal 35005, and the like. The display device of the invention can be applied to the display portion 35003. Note that the display device includes all information display devices such as those for a personal computer, TV broadcasting reception, and advertisement display. A display device which uses the display device of the invention for the display portion 35003 can provide a clear and high-contrast image FIG. 48B shows a camera, which includes a main body 35101, a display portion 35102, an image receiving portion 35103, operating keys 35104, an external connecting port 35105, a shutter 35106, and the like.

A digital camera in which the invention is applied to the display portion 35102 can be obtained a clear and high-contrast image.

Figure 48C:
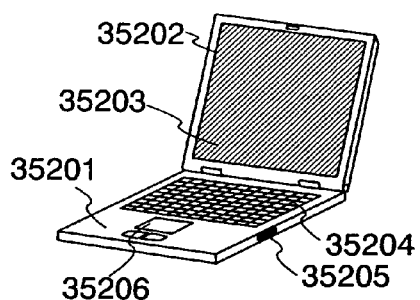

FIG. 48C shows a computer, which includes a main body 35201, a chassis 35202, a display portion 35203, a keyboard 35204, an external connecting port 35205, a pointing mouse 35206, and the like. A computer in which the invention is applied to the display portion 35203 can provide a clear and high-contrast image.

Figure 48D:
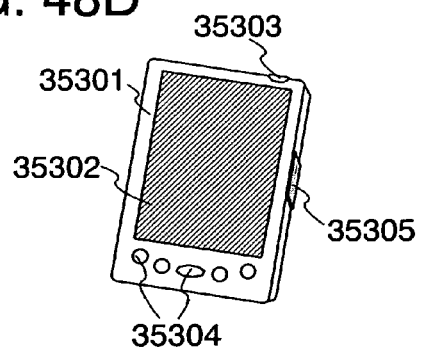

FIG. 48D shows a mobile computer, which includes a main body 35301, a display portion 35302, a switch 35303, operating keys 35304, an infrared port 35305, and the like. A mobile computer in which the invention is applied to the display portion 35302 can provide a clear and high-contrast image.

Figure 48E:
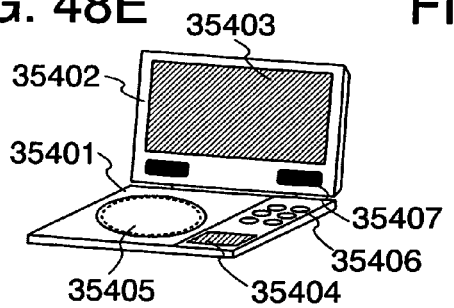

FIG. 48E is a portable image reproducing device provided with a recording medium (specifically, a DVD player), which includes a main body 35401, a chassis 35402, a display portion A 35403, a display portion B 35404, a recording medium (DVD and the like) reading portion 35405, an operating key 35406, a speaker portion 35407, and the like. The display portion A 35403 mainly displays image data, while the display portion B 35404 mainly displays text data. An image reproducing device in which the invention is applied to the display portions A 35403 and B 35404 can provide a clear and high-contrast image can be obtained.

Figure 48F:
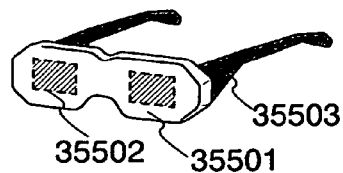

FIG. 48F shows a goggle type display, which includes a main body 35501, a display portion 35502, an arm portion 35503, and the like. A goggle type display in which the invention is applied to the display portion 35502 can provide a clear and high-contrast image.

Figure 48G:
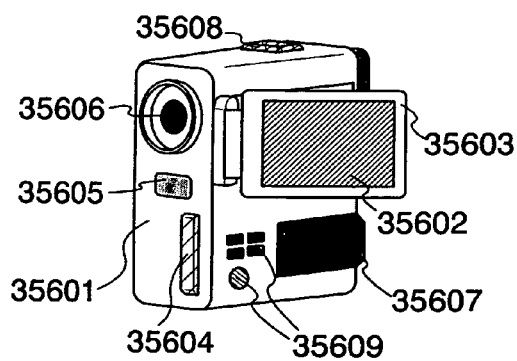

FIG. 48G shows a video camera, which includes a main body 35601, a display portion 35602, a chassis 35603, an external connecting port 35604, a remote controller receiving portion 35605, an image receiving portion 35606, a battery 35607, an audio input portion 35608, operating keys 35609, , and the like. A video camera in which the invention is applied to the display portion 35602 can provide a clear and high-contrast image.

Figure 48H:
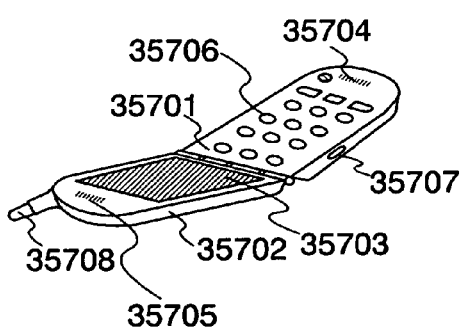

FIG. 48H shows a portable phone, which includes a main body 35701, a chassis 35702, a display portion 35703, an audio input portion 35704, an audio output portion 35705, an operating key 35706, an external connecting port 35707, an antenna 35708, and the like. A mobile phone in which the invention is applied to the display portion 35703 can provide a clear and high-contrast image.

As described above, the applicable range of the invention is so wide that the invention can be applied to electronic apparatuses of various fields. In addition, the electronic apparatuses in this embodiment mode may use a display device manufactured with any of the structures in Embodiment Modes 1 to 14.

This application is based on Japanese Patent Application serial No. 2005-303766 filed in Japan Patent Office on Oct. 18, 2005, the entire contents of which are hereby incorporated by reference.

What is claimed is:

1. A liquid crystal display device comprising:
    a liquid crystal layer disposed between a first substrate and a second substrate;
    a pixel electrode in a reflection region and a transmission region over the first substrate;
    a film for adjusting a cell gap in the reflection region over the first substrate;
    an opposite electrode in the reflection region and the transmission region under the second substrate; and
    a projection in the reflection region and the transmission region disposed between the opposite electrode and the second substrate,
    wherein:
    the pixel electrode in the reflection region is provided over the film and reflects light,
    the pixel electrode in the transmission region transmits light,
    the pixel electrode in the reflection region and the transmission region includes a slit,
    the slit is overlapped with at least a part of a step portion which is provided between the reflection region and the transmission region by the film, and
    the opposite electrode has an uneven surface.

2. The liquid crystal display device according to claim 1, wherein the liquid crystal display performs a display of vertical alignment mode.

3. The liquid crystal display device according to claim 1, wherein the pixel electrode in the reflection region has an uneven surface.

4. The liquid crystal display device according to claim 1, wherein a distance between a boundary portion of the film and the pixel electrode in the reflection region is larger than a distance between the boundary portion of the film and the pixel electrode in the transmission region.

5. The liquid crystal display device according to claim 1, wherein a width of the slit of the pixel electrode in the reflection region is larger than that of the slit of the pixel electrode in the transmission region.

6. The liquid crystal display device according to claim 1, wherein a width of the slit of the pixel electrode in a boundary portion between the reflection region and the transmission region is larger than that of the slit of the pixel electrode in the reflection region.

7. An electronic apparatus using the liquid crystal display device according to claim 1.

8. A liquid crystal display device comprising:
    a liquid crystal layer disposed between a first substrate and a second substrate;
    a pixel electrode in a reflection region and a transmission region over the first substrate;
    a film for adjusting a cell gap in the reflection region over the first substrate; and
    an opposite electrode in the reflection region and the transmission region under the second substrate;
    a projection in the reflection region and the transmission region disposed between the opposite electrode and the second substrate,
    wherein:
    the pixel electrode in the reflection region is provided over the film and reflects light,
    the pixel electrode in the transmission region transmits light,
    the pixel electrode in the reflection region and the transmission region includes a slit,
    the slit is overlapped with at least a part of a step portion which is provided between the reflection region and the transmission region by the film,
    the opposite electrode has an uneven surface, and
    a width of the projection in the reflection region is larger than that of the projection in the transmission region.

9. The liquid crystal display device according to claim 8, wherein the liquid crystal display performs a display of vertical alignment mode.

10. The liquid crystal display device according to claim 8, wherein the pixel electrode in the reflection region has an uneven surface.

11. The liquid crystal display device according to claim 8, wherein a distance between a boundary portion of the film and the pixel electrode in the reflection region is larger than a distance between the boundary portion of the film and the pixel electrode in the transmission region.

12. The liquid crystal display device according to claim 8, wherein a width of the slit of the pixel electrode in the reflection region is larger than that of the slit of the pixel electrode in the transmission region.

13. The liquid crystal display device according to claim 8, wherein a width of the slit of the pixel electrode in a boundary portion between the reflection region and the transmission region is larger than that of the slit of the pixel electrode in the reflection region.

14. An electronic apparatus using the liquid crystal display device according to claim 8.

15. A liquid crystal display device comprising:
a liquid crystal layer disposed between a first substrate and a second substrate;
a pixel electrode in a reflection region and a transmission region over the first substrate;
a film for adjusting a cell gap in the reflection region over the first substrate;
an opposite electrode in the reflection region and the transmission region under the second substrate;
a conductive film in the reflection region below the film; and
a projection in the reflection region and the transmission region disposed between the opposite electrode and the second substrate,
wherein:
the pixel electrode in the reflection region is provided over the film and transmits light,
the pixel electrode in the transmission region transmits light,
the pixel electrode in the reflection region and the transmission region includes a slit,
the slit is overlapped with at least a part of a step portion which is provided between the reflection region and the transmission region by the film,
the conductive film reflects light, and
the opposite electrode has an uneven surface.

16. The liquid crystal display device according to claim 15, wherein the liquid crystal display performs a display of vertical alignment mode.

17. The liquid crystal display device according to claim 15, wherein the pixel electrode in the reflection region has an uneven surface.

18. The liquid crystal display device according to claim 15, wherein a distance between a boundary portion of the film and the pixel electrode in the reflection region is larger than a distance between the boundary portion of the film and the pixel electrode in the transmission region.

19. The liquid crystal display device according to claim 15, wherein a width of the slit of the pixel electrode in the reflection region is larger than that of the slit of the pixel electrode in the transmission region.

20. The liquid crystal display device according to claim 15, wherein a width of the slit of the pixel electrode in a boundary portion between the reflection region and the transmission region is larger than that of the slit of the pixel electrode in the reflection region.

21. The liquid crystal display device according to claim 15, wherein the conductive film has an uneven surface.

22. The liquid crystal display device according to claim 15, wherein the pixel electrode is electrically connected to the conductive film.

23. The liquid crystal display device according to claim 15, wherein a distance between a boundary portion of the film and the conductive film is larger than a distance between the boundary portion of the film and the pixel electrode in the reflection region.

24. An electronic apparatus using the liquid crystal display device according to claim 15.

25. A liquid crystal display device comprising:
a liquid crystal layer disposed between a first substrate and a second substrate;
a pixel electrode in a reflection region and a transmission region over the first substrate;
a film for adjusting a cell gap in the reflection region over the first substrate;
an opposite electrode in the reflection region and the transmission region under the second substrate;
a conductive film in the reflection region below the film; and
a projection in the reflection region and the transmission region disposed between the opposite electrode and the second substrate,
wherein:
the pixel electrode in the reflection region is provided over the film and transmits light,
the pixel electrode in the transmission region transmits light,
the pixel electrode in the reflection region and the transmission region includes a slit,
the slit is overlapped with at least a part of a step portion which is provided between the reflection region and the transmission region by the film,
the conductive film reflects light, and
the opposite electrode has an uneven surface,
a width of the projection in the reflection region is larger than that of the projection in the transmission region.

26. The liquid crystal display device according to claim 25, wherein the liquid crystal display performs a display of vertical alignment mode.

27. The liquid crystal display device according to claim 25, wherein the pixel electrode in the reflection region has an uneven surface.

28. The liquid crystal display device according to claim 25, wherein a distance between a boundary portion of the film and the pixel electrode in the reflection region is larger than a distance between the boundary portion of the film and the pixel electrode in the transmission region.

29. The liquid crystal display device according to claim 25, wherein a width of the slit of the pixel electrode in the reflection region is larger than that of the slit of the pixel electrode in the transmission region.

30. The liquid crystal display device according to claim 25, wherein a width of the slit of the pixel electrode in a boundary portion between the reflection region and the transmission region is larger than that of the slit of the pixel electrode in the reflection region.

31. The liquid crystal display device according to claim 25, wherein the conductive film has an uneven surface.

32. The liquid crystal display device according to claim 25, wherein the pixel electrode is electrically connected to the conductive film.

33. The liquid crystal display device according to claim 25, wherein a distance between a boundary portion of the film and the conductive film is larger than a distance between the boundary portion of the film and the pixel electrode in the reflection region.

34. The liquid crystal display device according to claim 25, wherein a thickness of the projection is smaller than that of the film.

35. An electronic apparatus using the liquid crystal display device according to claim 25.

* * * * *